United States Patent
Muck et al.

(10) Patent No.: US 10,597,264 B1
(45) Date of Patent: Mar. 24, 2020

(54) SEMI-AUTONOMOUS SYSTEM FOR CARRYING AND PLACING ELONGATE OBJECTS

(71) Applicant: ADVANCED CONSTRUCTION ROBOTICS, INC., Saxonburg, PA (US)

(72) Inventors: Stephen M. Muck, Butler, PA (US); Andrew M. Hetrick, Gibsonia, PA (US); Donald R. Crouse, Hookstown, PA (US); Patrick A. Weber, Wexford, PA (US); Jeremy L. Searock, Glenshaw, PA (US); Justin C. Scheifflee, Pittsburgh, PA (US); Jay W. Gowdy, Pittsburgh, PA (US); John P. Stewart, Butler, PA (US); Matthew Q. Shaffer, Zelienople, PA (US); Joseph E. Chabala, Bridgeville, PA (US)

(73) Assignee: Advanced Construction Robotics, Inc., Saxonburg, PA (US)

( * ) Notice: Subject to any disclaimer, the term of this patent is extended or adjusted under 35 U.S.C. 154(b) by 0 days.

(21) Appl. No.: 16/226,821

(22) Filed: Dec. 20, 2018

(51) Int. Cl.
*G06F 7/00* (2006.01)
*B66C 19/00* (2006.01)
(Continued)

(52) U.S. Cl.
CPC ............... *B66C 19/00* (2013.01); *B25J 9/026* (2013.01); *B25J 9/1615* (2013.01)

(58) Field of Classification Search
None
See application file for complete search history.

(56) References Cited

U.S. PATENT DOCUMENTS

| 3,069,654 A | 12/1962 | Hough |
| 3,329,073 A | 7/1967 | Devereaux |

(Continued)

FOREIGN PATENT DOCUMENTS

| CN | 204826674 | 6/2015 |
| JP | 2755332 | 9/1989 |

(Continued)

OTHER PUBLICATIONS

Richard O. Duda, et al., Use of the Hough Transformation to Detect Lines and Curves in Pictures, Stanford Research Institute, Menlo Park, CA, 1972, Assoc. for Computing Machinery, Inc., pp. 11-15.
(Continued)

*Primary Examiner* — Yolanda R Cumbess
(74) *Attorney, Agent, or Firm* — Eckert Seamans Cherin & Mellott, LLC

(57) ABSTRACT

An improvement to a semi-autonomous apparatus is described herein. In an apparatus having a gantry subassembly, a tram subassembly movably mounted on the gantry subassembly, and an actuation subassembly mounted on the tram subassembly, the improvement includes a gripper subassembly operatively connected to the actuation subassembly. The movement of the subassemblies is controlled in part by a control system that controls drive systems associated with one or more of the subassemblies. The gantry subassembly includes a bridge member for laterally spanning a selected section of a work site. The tram subassembly includes a tram that travels laterally along to the bridge member. The actuation subassembly includes at least one motion actuator for controlling the movement of the gripper subassembly in a generally vertical direction and may include an additional motion actuator for movement in a generally horizontal direction. The gripper subassembly includes passively actuated grippers for lifting, transporting (Continued)

and placing objects, and particularly, elongate objects such as reinforcing bars used in road and other cementitious surface construction.

37 Claims, 45 Drawing Sheets

(51) Int. Cl.
*B25J 9/02* (2006.01)
*B25J 9/16* (2006.01)

(56) References Cited

U.S. PATENT DOCUMENTS

| | | |
|---|---|---|
| 3,477,351 A | 11/1969 | Funk et al. |
| 5,944,064 A | 8/1999 | Saito et al. |
| 6,100,517 A | 8/2000 | Yahav et al. |
| 6,695,120 B1 | 2/2004 | Trammell |
| 7,423,734 B1 | 9/2008 | Luik |
| 8,029,710 B2 | 10/2011 | Khoshnevis |
| 10,061,323 B2 | 8/2018 | Muck et al. |
| 2009/0261230 A1 | 10/2009 | Imhof |
| 2015/0266147 A1* | 9/2015 | Reid .................. B23P 21/004 29/525.01 |
| 2016/0227193 A1* | 8/2016 | Osterwood ............ G01S 17/42 |
| 2018/0086489 A1* | 3/2018 | Rogers .................. B25J 9/042 |

FOREIGN PATENT DOCUMENTS

| | | |
|---|---|---|
| JP | 2558980 Y | 3/1991 |
| JP | 06023684 | 7/1992 |
| JP | 2005188064 | 12/2003 |
| WO | WO2008024049 A1 | 2/2008 |

OTHER PUBLICATIONS

D. H. Ballard, Generalizing the Hough Transform to Detect Arbitrary Shapes, Computer Science Department, Univ. of Rochester, Rochester, NY, 1980, pp. 111-122.

* cited by examiner

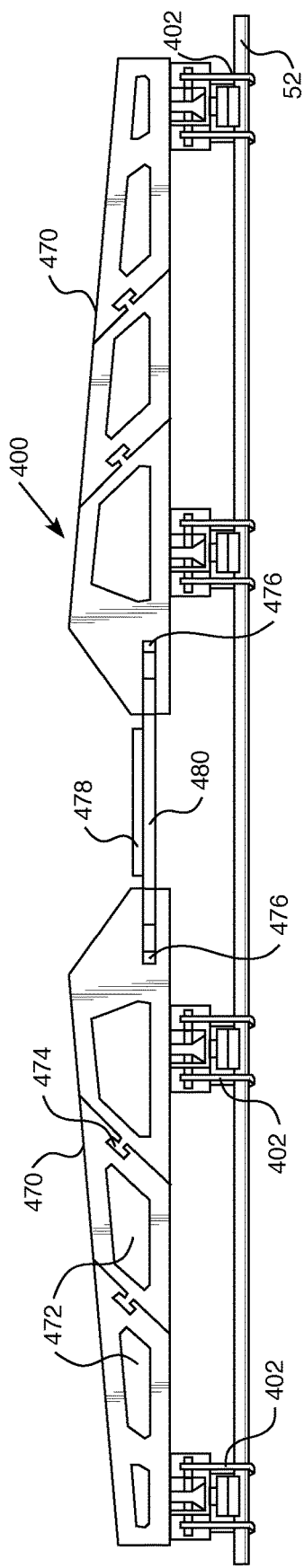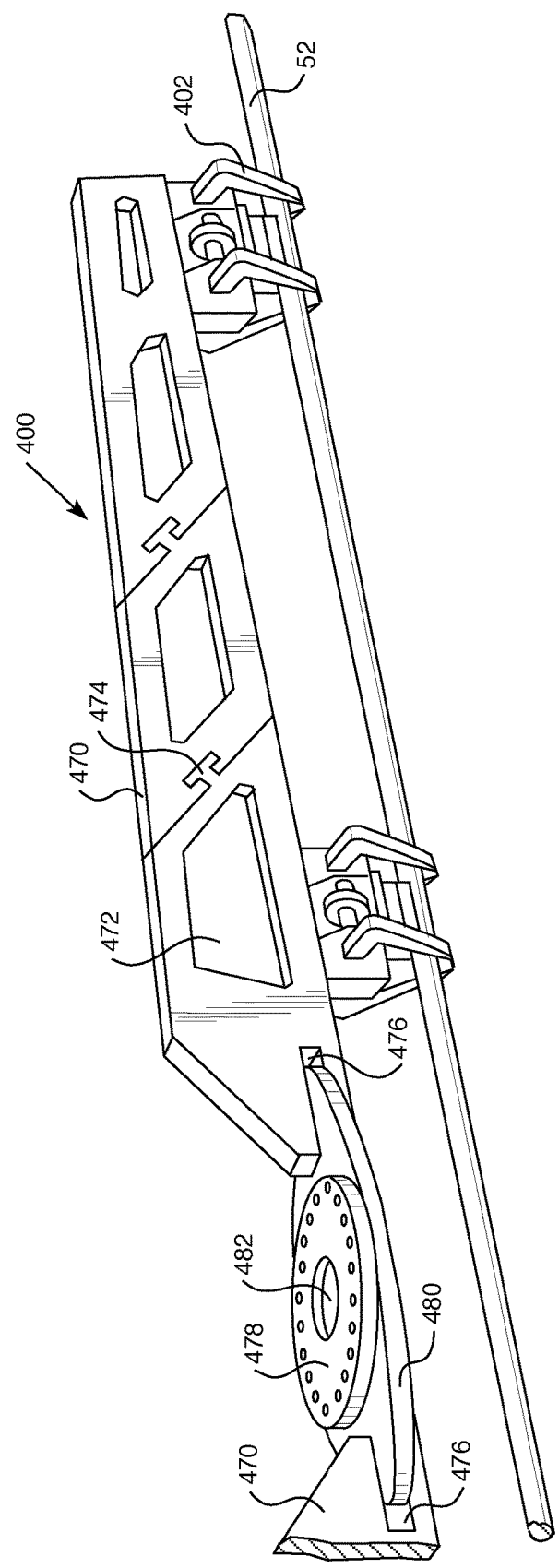
FIG. 17
FIG. 18

| Bar Size | B (inches) | A,C Avg. |
|---|---|---|
| #4 | 3 | 19 |
| #5 | 2 | 15 |
| #6 | 2 | 14 |
| #8 | 1 | 10 |

Droop in Inches

Sag Testing Results

| Bar Size | 2' | 4' | 6' | 8' | 10' | 12' | 14' | 16' |
|---|---|---|---|---|---|---|---|---|
| 3 | 0 | 1.25 | 7.5 | 18.75 | X | X | X | X |
| 4 | 0.875 | 2.875 | 6.125 | 13.5 | 30 | X | X | X |
| 5 | 0 | 1.875 | 4.75 | 10.375 | 19.125 | X | X | X |
| 6 | 0 | 0.875 | 2.375 | 6.25 | 10.875 | 23.5 | X | X |
| 7 | 0 | 0.5 | 1.75 | 4 | 9.25 | 17.5 | 30.25 | X |
| 8 | 0 | 0.5 | 1.875 | 4 | 7.75 | 15.125 | 26.5 | X |

FIG. 48

SEMI-AUTONOMOUS SYSTEM FOR CARRYING AND PLACING ELONGATE OBJECTS

BACKGROUND OF THE INVENTION

1. Field of the Invention

The present invention relates to construction equipment, and more particularly to a semi-autonomous assembly for transporting and placing objects according to a plan at a work site.

2. Description of the Prior Art

Construction is a labor intensive and time consuming undertaking. Concrete slabs, such as those made for road, bridge, floor, wall panels, tunnels, viaducts, pre-fabricated building elements, and other outdoor and indoor surfaces, are made of reinforced concrete, with a reinforcing material, typically in the form of reinforcing bars, or rebar, placed in a pre-planned grid pattern. Rebar is placed along the length and width of sites in the construction of surfaces, such as road, runway and bridge surfaces, tunnels, wall panels, prefabricated building elements, and flooring. Roads, for example, typically range from 35 feet to many hundreds of feet wide and miles in length. Bridge decks are typically not as long but often match the roadway in width. Bridges and roadways, especially on and off-ramps, curve. Concrete road and bridge surfaces require typically two layers of rebar in a grid pattern referred to as a grid mat, with bar running along the length and width of the surface intersecting as they cross. A standard length of rebar is 40-50 feet, up to a typical maximum of 60 feet. Grid spacing for transverse lengths of rebar positioned generally parallel to each other across the width of a roadway or bridge deck are between four to fourteen inches apart, and more often between five to twelve inches apart. The spacing between layers of grid mats is usually between two and eight inches. Where lengths of rebar meet, rather than place them end to end or leave a gap between the ends, the sections are placed to overlap each other in a lap joint by several inches or several feet to create a continuous length of reinforcement. The rebar grid adds structural and tensile integrity to the concrete structure. Rebar is made from carbon steel, stainless steel or fiberglass and may be bare, plated or epoxy coated.

Currently, rebar is placed manually. Bundles of rebar are pre-cut to desired lengths. The formed rebar is delivered to a job site typically by truck, then moved by a crane closer to the active work site. Construction workers then must themselves individually lift, move and place each length of rebar where needed according to a construction plan. The bars are heavy and at times unwieldy, particularly after many hours of labor involving walking over often uneven surfaces.

Manually carrying and placing rebar and other elongate objects in the course of a construction project poses a significant risk of injury to workers due to twisted ankles, strained backs, falls, and other joint and muscle injuries. The physical toll such work imposes on workers coupled with changing demographics has in recent years reduced the number of workers entering the construction field. There is a need therefore for alternative ways to perform labor intensive tasks.

SUMMARY OF THE INVENTION

The problem associated with physically demanding tasks in, for example, any of the many construction projects requiring reinforced concrete slabs is addressed by the system and apparatus described herein.

A semi-autonomous apparatus has been developed to lift, transport, and place elongate objects in pre-planned positions at a work site. The apparatus includes generally, a gantry subassembly comprising a bridge member for laterally spanning, in use, a selected section of a work site and a gantry drive system; a tram subassembly movably mounted on the gantry subassembly and comprising at least one tram and a tram drive system; an actuation subassembly mounted on the tram subassembly comprising a motion actuator and an actuator drive system; a gripper subassembly operatively connected to the motion actuator; and a control system.

The apparatus provides an improvement to semi-autonomous assemblies and apparatuses which include a gantry subassembly comprising a bridge member for laterally spanning, in use, a selected section of a work site, and a gantry drive system for effecting travel of the gantry subassembly along a first path of the selected section of the work site, a tram subassembly movably mounted on the gantry subassembly and comprising a tram and a tram drive system for effecting travel of the tram along a second path along the span of the bridge member, and an actuation subassembly mounted on the tram subassembly comprising a motion actuator and an actuator drive system for effecting travel along a third path generally perpendicular to the second path. The improvement includes in various aspects, a gripper subassembly suspended from, and movable with, the motion actuator of the actuation subassembly, wherein the gripper subassembly includes at least one gripper for gripping and releasing an object, and a control system. The control system includes a sensing function, a modeling function and an execution function. The sensing function receives sensory signals and communicates the sensory signals to at least the modeling function. The modeling function dynamically calculates the pose of at least the gripper relative to the work site, coordinates the pose calculations with a plan for placement of a plurality of the objects on the work site to generate coordination calculations, and communicates the coordination calculations to the execution function. The execution function communicates motion signals to one or more of the gantry drive system, the tram drive system, and the actuator drive system for coordinated movement along one or more of the first, second, and third paths, respectively, to position the gripper subassembly for one or more of lifting, transporting and placing the plurality of objects.

The gripper subassembly may include an arm suspended from the motion actuator and a plurality of grippers suspended from the arm. In certain aspects, there may be a connector from which the arm is suspended from the motion actuator and a motor for rotating the connector about the axis of the third path.

In certain aspects, each gripper may include at least one pair of articulatable fingers biased towards each other in a partially closed spaced relationship and a finger actuation member for opening and closing the at least one pair of fingers. Each finger of the pair of fingers may include a base portion and a flipper portion pivotally connected to each other, wherein the base portion is operatively connected to the finger actuation member and the flipper portion has tapered ends for initial engagement with the object. Each finger may also include at least one spring member for biasing the flipper portion towards the base portion. The finger actuation member may include a base plate having an upper surface and a lower surface, the lower surface being configured for contact with the object, a set of driven gears operatively connected to the pair of fingers such that movement of the set of driven gears in a first direction closes the pair of fingers and movement of the set of driven gears in a second direction opens the pair of fingers, a driving gear operatively connected to the set of driven gears such that movement of the driving gear is translated to movement of the set of driven gears, wherein the driving gear has a bottom portion connected to the upper surface of the base plate, a top portion, and a locking portion positioned between the top and bottom portions of the driving gear, and the driving gear is biased toward an unlocked position wherein the pair of fingers are open. The finger actuation member may also include an actuator having a locking member biased for passive locking engagement with the locking portion of the driving gear upon application of force in the direction of the third path against the lower surface of the base plate sufficient to move the locking portion of the driving gear into alignment with the locking member of the actuator and a locked position wherein the pair of fingers are closed. The actuator is preferably responsive to signals from the control system to actively withdraw the locking member from engagement with the locking portion to free the driving gear to move towards the unlocked position.

In various aspects, the actuator may be a solenoid having a cavity and the locking member may be a plunger slidably mounted in the cavity. The locking portion of the driving gear may be in the form of an opening for receiving the plunger. The finger actuation member may further include a gear case for housing the set of driven gears and at least the locking portion of the driving gear. The gear case may have a top plate having a passage through which the top portion of the driving gear passes as the locking portion of the driving gear is moved into alignment with the locking member of the actuator, and a stop for limiting the distance the driving gear can travel out of the gear case. The actuator may further include a first shaft and a second shaft in a parallel spaced relationship relative to each other, wherein a first gear of the set of driven gears is mounted on the first shaft and a second gear of the set of driven gears is mounted on the second shaft. A first finger may be mounted on the first shaft and a second finger may be mounted on the second shaft. The driving gear may have a first edge in movable engagement with the first gear and a second edge in movable engagement with the second gear. In this configuration, upward movement of the driving gear in the plane of third path rotates the first and second gears and the first and second shafts in the first direction to close the first and second fingers of the pair and downward movement of the driving gear in the plane of third path rotates the first and second gears and the first and second shafts in the second direction to open the first and second fingers. In various aspects, there may be two pair of fingers, each pair having a first finger mounted on the first shaft on opposite sides of the driving gear and the first driven gear and a second finger mounted on the second shaft on opposite sides of the driving gear and the second driven gear.

In various aspects, the motion actuator of the actuation subassembly has an axle operatively connected to the actuator drive system for effecting movement of the ale relative to the third path and the gripper subassembly may further include a connector mounted to the axle, two arm sections extending laterally from opposite sides of the connector plate, and at least one gripper suspended from each arm section. In this configuration, the motion actuator of the actuator drive system effects linear and rotational movement of the axle. The axle may also be pivotally connected to the motion actuator for effecting one or more of linear, rotational and pivotal movement of the axle. In certain aspects, the motion actuator of the actuator drive system effects linear movement of the axle and the connector is mounted for rotation about the axle. In certain aspects, rotational movement may be effected manually. In alternative aspects, rotational movement may be effected by a gripper drive motor.

In various aspects, each gripper may have at least one pair of articulatable fingers biased towards each other in a partially closed spaced relationship and a finger actuation member for opening and closing the at least one pair of fingers. The finger actuation member may include a base plate having an upper surface and a lower surface, the lower surface configured for contact with the object, a set of driven gears operatively connected to the pair of fingers such that movement of the set of driven gears in a first direction closes the pair of fingers and movement of the set of driven gears in a second direction opens the pair of fingers, a driving gear operatively connected to the set of driven gears such that movement of the driving gear is translated to movement of the set of driven gears, the driving gear having a bottom portion connected to the upper surface of the base plate, a top portion, and a locking portion positioned between the top and bottom portions of the driving gear, the driving gear biased toward an unlocked position wherein the pair of fingers are open, and an actuator having a locking member biased for passive locking engagement with the locking portion of the driving gear upon application of force in the direction of the third path against the lower surface of the base plate sufficient to move the locking portion of the driving gear into alignment with the locking member of the actuator and a locked position wherein the pair of fingers are closed, the actuator being responsive to signals from the control system to actively withdraw the locking member from engagement with the locking portion to free the driving gear to move towards the unlocked position.

The apparatus may include at least one pair of stereo cameras for sensing and mapping three dimensional poses of pertinent objects in and near the work site, without requiring pre-measuring of the work site.

The control system's sensing function may receive sensory signals from image data sources to find markers prepositioned at the work site and on portions of one or more of the gantry, tram, actuation and gripper subassemblies to generate the sensing data. The sensing function may receive sensory signals from sources selected from the group consisting of image data sources, pulsed laser sensors, human operator control inputs, and combinations thereof.

The modeling function may use the sensing data for one or more of localization and mapping to define a sensed model of the work site, for estimating the pose of one or more of the grippers, gripper arm, tram, and gantry bridge member components relative to the work site, and for fault monitoring to detect differences between observed obstacles from expectations based on the plan.

The execution function may include an executor module that combines the sensed model of the work site and the sensed relationship of one or more of the grippers, gripper arm, tram, and gantry bridge member component poses to the work site with the strategic intentions of the plan to tactically determine and direct the motion signals for carrying out the plan. The execution function may include a placement planning module to assist the executor module in determining the object required for successive placements and determining the optimal location for placement of the object to progress according to the plan and an obstacle avoidance module that uses three dimensional maps of the work site generated by the modeling function to detect the presence of obstacles on the work site. The obstacle avoidance module responds to obstacle detection by changing the trajectory of a given motion for one or more of the grippers, gripper arm, tram, and gantry bridge member components. The obstacle avoidance module may in addition, or in the alternative, respond to obstacle detection by stopping apparatus motion.

In various applications, there may be two assemblies positioned in a substantially adjacent parallel spaced relationship relative to each other on a work site, each assembly comprising the gantry subassembly, the tram subassembly, the actuation subassembly, the gripper subassembly, and the control system, operatively linked by one of a wired or a wireless connection to synchronize the coordinated movement of each assembly along one or more of the first, second, and third paths, respectively, to position the gripper subassembly for one or more of lifting, transporting and placing the plurality of objects.

In certain applications, the assembly may include at least two tram subassemblies mounted on the bridge member of the gantry subassembly, each tram subassembly having one actuation subassembly mounted thereon and each actuation subassembly having one gripper subassembly suspended therefrom, wherein the control system coordinates movement of each tram subassembly along the second path and coordinates movement of each actuation subassembly along the third path to position each gripper subassembly for one or more of the coordinated lifting, transporting and placing the plurality of objects.

BRIEF DESCRIPTION OF THE DRAWINGS

The characteristics and advantages of the present disclosure may be better understood by reference to the accompanying figures

FIG. 17 is a front view of an embodiment of a gripper subassembly of the apparatus of FIG. 1.

FIG. 18 is a partial perspective view of an embodiment of grippers on the gripper subassembly of FIG. 17 gripping a length of an elongate object, such as rebar.

FIG. 48 shows the results of additional sag testing.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated. "Operatively connected" as used herein means that two or more components or features may be directly or indirectly connected to each other or may be wirelessly connected, in each case such that the operation or actuation of one component or feature affects the operation or actuation of the operatively connected component or feature.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
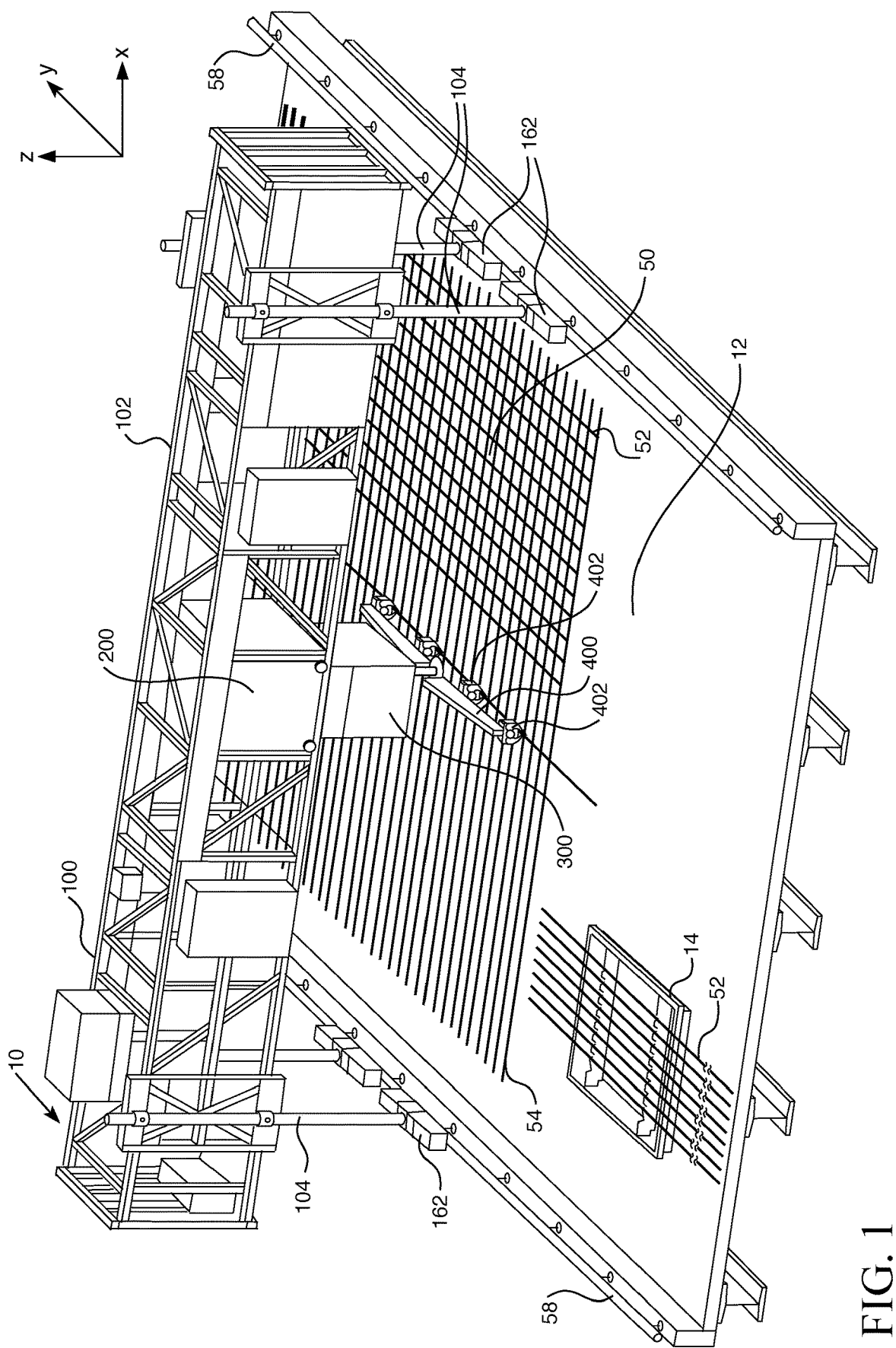
FIG. 1 is a perspective view of an embodiment of a semi-autonomous transport and placement apparatus in use at an exemplary construction site.

FIG. 1 illustrates an embodiment of the semi-autonomous transport and placement apparatus 10 placing elongate objects 52, 54, such as rebar to form a rebar mat 50 for a work site 12, such as a road, bridge, floor, wall panels, tunnels, viaducts, pre-fabricated building elements, and other large reinforced concrete surfaces under construction. In general, rebar 52, 54 is lifted from a magazine 14 or other suitable container by a set of grippers 402 on a gripper subassembly 400. The rebar is then transported by the apparatus 10 to a designated location and placed in the designated location according to a construction plan to form a rebar mat 50. Determination of the designated location may be done in advance in accordance with a pre-planned construction plan, or may be a location determined relative to the location of existing rebar, or relative to two or more marked points, or may be dynamic in that the designated location will change as the project moves forward, or as different stages of the project are completed.

The apparatus 10 described herein generally comprises at least four subassemblies that together provide motion in at least three primary directions: the gantry axis subassembly 100 effects motion along a first, longitudinal path (Y axis) of the work site 12; the tram axis subassembly 200 effects motion along a second path in the lateral direction (X axis), generally transverse to the first, longitudinal path; an actuator axis subassembly 300 effects motion along a third path, in the vertical direction (Z axis); and a gripper subassembly 400 operatively connected to the actuator subassembly 300 engages, holds, and when signaled to do so, releases the elongate objects in the designated location. In certain aspects, the apparatus 10 may provide motion along a fourth major axis, by movement of the actuator subassembly 300 along the Y axis relative to the tram subassembly 200. In certain aspects, the gripper subassembly 400 may be equipped for rotational motion about the Z axis. The gripper subassembly 400 may be positioned to place elongate objects 52, 54 along the first path, in a longitudinal direction, or along the second path, in a transverse direction, or may be rotated through one or more planes about a vertical Z axis at any angle and/or slope for positioning elongate objects in a skewed position relative to the first, second or third paths to accommodate plans for sloped and curved concrete surfaces.

For ease of reference, the paths of motion may be referred to, respectively, as motion through planes in or along the Y-axis (gantry axis), planes in or along the X-axis (tram axis), and planes in or along the Z-axis (actuation axis). Those skilled in the art will appreciate that the "planes" and the paths of motion discussed herein, and in particular, the longitudinal or Y-axis plane, will not typically be mathematically planar or linear because surfaces, whether on the ground or especially on a bridge deck, will not typically be precisely planar, straight, or even static. Both during construction and in use after construction, bridge decks, for example, vibrate and flex in response to the weight of vehicles and ground surfaces are uneven. Prior to pouring the concrete, the rebar mat 50 flexes as the work crew walks on it and may be intentionally sloped to accommodate planned grading of the roadway. When the Y axis plane is skewed, the X axis and Z axis planes may also be skewed. Therefore, the longitudinal, transverse and vertical paths or directions, as used herein refers to the paths and directions of the work site, such as a roadway, and is understood to include one or any combination of linear, non-linear, planar, non-planar, straight, curved and angular paths or directions. The apparatus 10 addresses those variables with a perception system and software to recognize changes in the longitudinal path and variations in the construction plan for laying the rebar mat 50.

Exemplary gantry and associated subassemblies for operating a tool along similar pathways, having an exemplary perception system and associated software are disclosed in U.S. Pat. No. 10,061,323, the relevant portions of which are hereby incorporated herein by reference. The apparatus described herein differs in several respects from the assembly described in U.S. Pat. No. 10,061,323; primarily in improvements to the tram and actuator subassemblies 200 and 300, respectively, and the development of the gripper subassembly 400 for passively gripping elongate objects such as rebar to transport and place the objects according to a construction plan for the given work site 12. While the apparatus 10 can be used to lift, transport and place a variety of objects, it is well suited for lifting, transporting and placing elongate objects. While not limited to lifting, transporting or placing rebar, for ease of the description, the apparatus described herein will be described with reference to moving rebar. Those skilled in the art will appreciate that any elongate object and a variety of other objects may be lifted, transported and/or placed by the apparatus 10, and in particular, the gripper subassembly 400 described herein.

Because the gripper subassembly 400 is integral to the primary function of the apparatus 10 and improved subassemblies, the details of the gripper subassembly will be described first.

Gripper Subassembly

Figure 19:
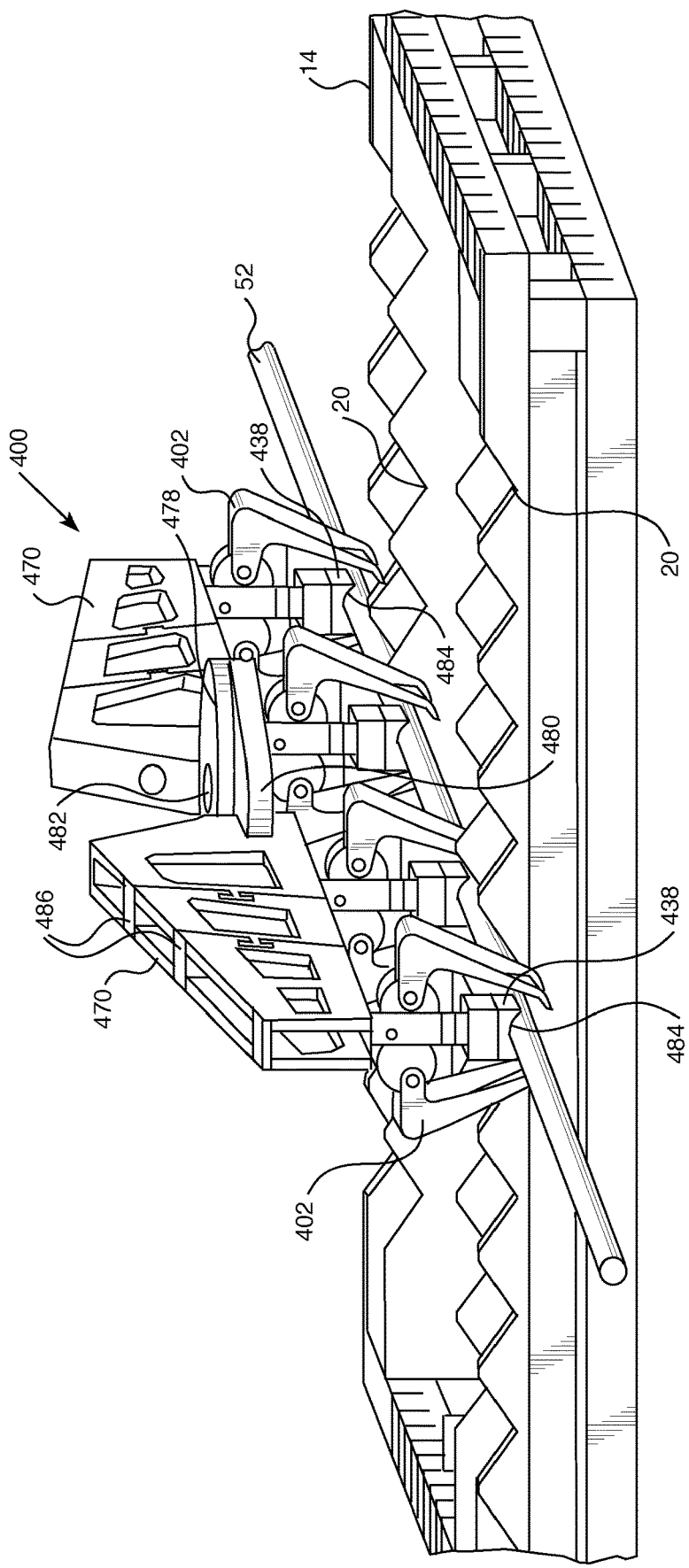
FIG. 19 illustrates an embodiment of the gripper subassembly of FIG. 1 lifting an elongate object from a magazine configured to hold multiples of such objects.

Referring to FIGS. 17-19, the gripper subassembly includes generally at least one gripper arm 470, a plurality of grippers 402, and a connector 480 for connecting the gripper arm 470 to axle 358 of the actuation subassembly 300. In various aspects, depending on the type and length of the elongate objects to be lifted, transported and placed, the gripper subassembly 400 may have at least two grippers 402. In the embodiment shown in FIGS. 17-19, four grippers 402 are attached to two sections of an arm 470, with two grippers on each arm section.

Figure 15:
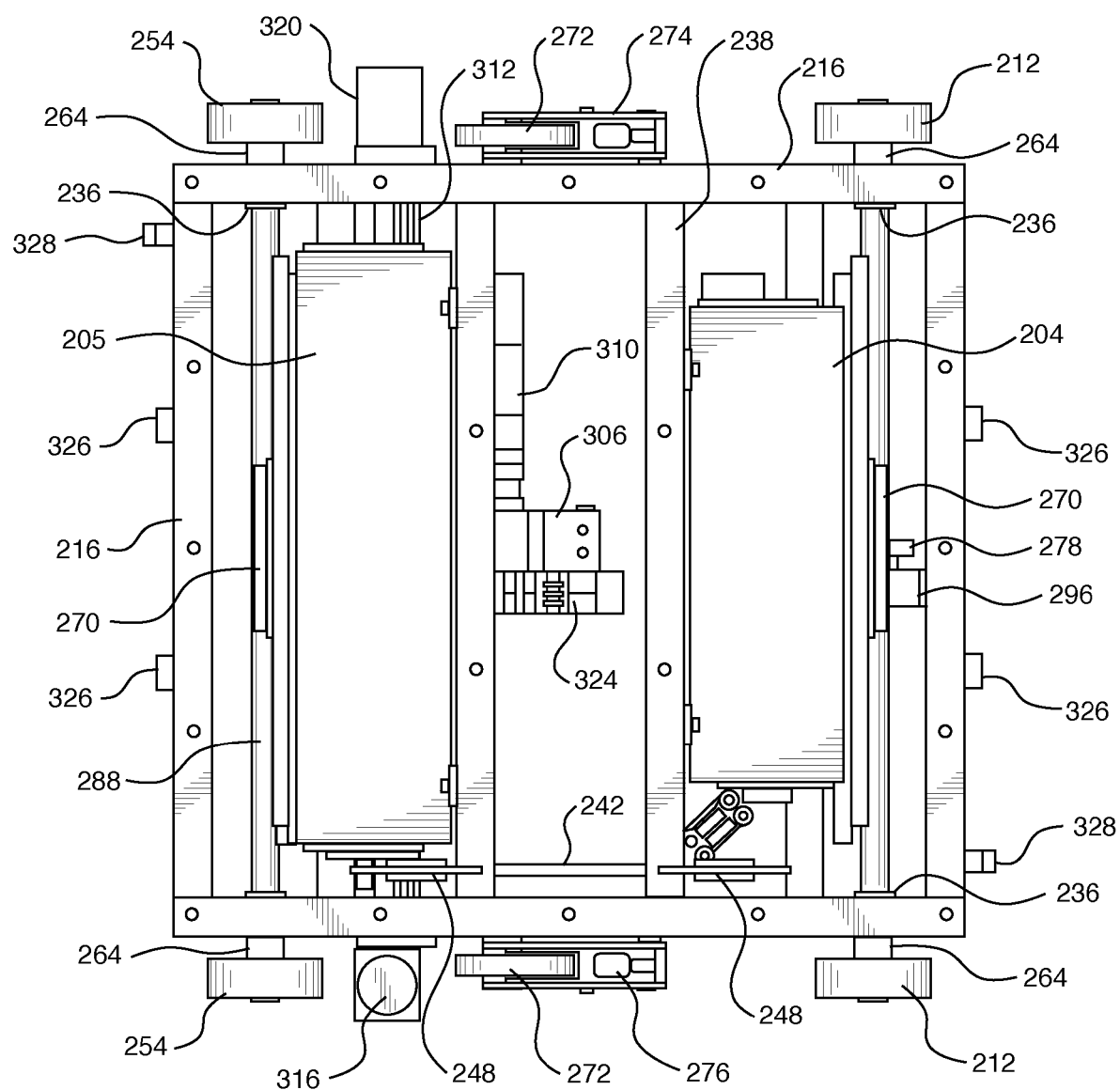
FIG. 15 is a top plan view of the tram and actuator subassemblies of FIG. 11.

The connector 480 includes a rotatable upper plate 478 that may be integrally connected to connector 480 or may be a separate plate rigidly or releasably connected to connector 480. Upper plate 478 has a central opening 482 for engaging an axle 358 (See FIGS. 15 and 16), such that linear movement of axle 358 along the Z axis and any rotation of axle 358 about the Z axis is translated to commensurate movement and rotation of plate 478 and connector 480. A motor mounted in the actuation subassembly 300 effects linear movement of axle 358 and, in various aspects may effect rotation of axle 358 of at least 90°, and preferably 180°, and more preferably 360°. Markings may be provided on the surface of plate 478 as visual indicators of the angle or rotation, or to allow manual adjustment of the angle of rotation. In various aspects, the axle 358 may also be connected to the actuation subassembly 300 by a pivoting joint that allows it to tilt relative to the Z axis. Base connector plate 480 has opposing end sections that fit within slots 476 in the inner side of each arm section 470 so that linear movement, rotation, and tilting of axle 358 and plate 478 causes linear movement, rotation, and tilting of the arm sections 470. The arm sections 470 and grippers 402 of gripper subassembly 400 may thereby be rotated 360° and tilted at an angle relative to the horizontal plane (typically an acute angle less than 90°, and more likely less than 45°, and most likely less than 30°) to position the grippers 402 and an elongate object, such as rebar 52, 54 held by the grippers 402 at any desired angle within at least two degrees of freedom. In addition, or alternatively, in various aspects, each gripper 402 may be individually mounted for rotation.

Each arm section 470 may, in various aspects, may include multiple sections joined by keyed tabs 474 to form a rigid connection and, as shown in FIG. 19, may further be comprised of two or more arm sections, spaced from each other and positioned side-by-side, connected by keyed tabs 486. To make the arm sections lighter in weight, cut-outs 472 may be formed in the arm 470. The arm sections may also be formed from a rigid bar or another configuration on which the grippers 402 may be mounted or suspended.

Figure 20:
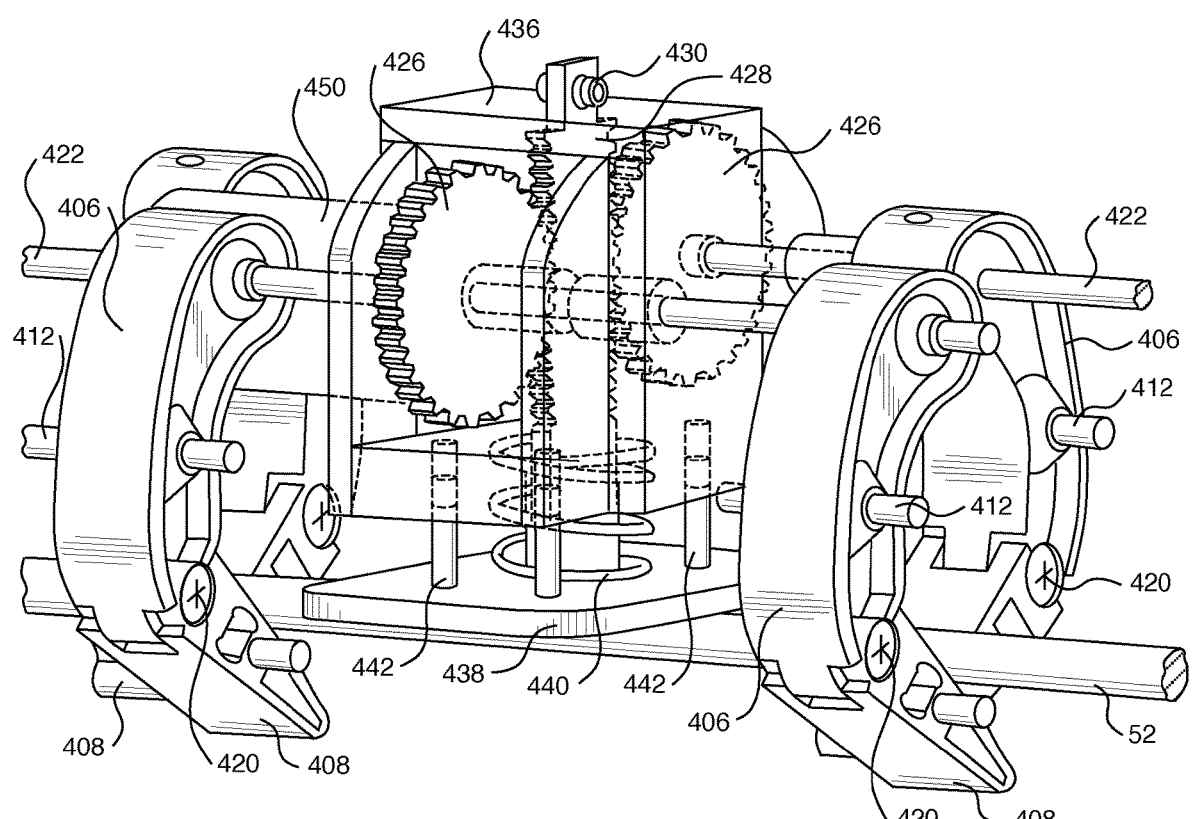
FIG. 20 is a view of portions of an embodiment of a gripper showing in phantom the internal gear arrangement.
Figure 21:
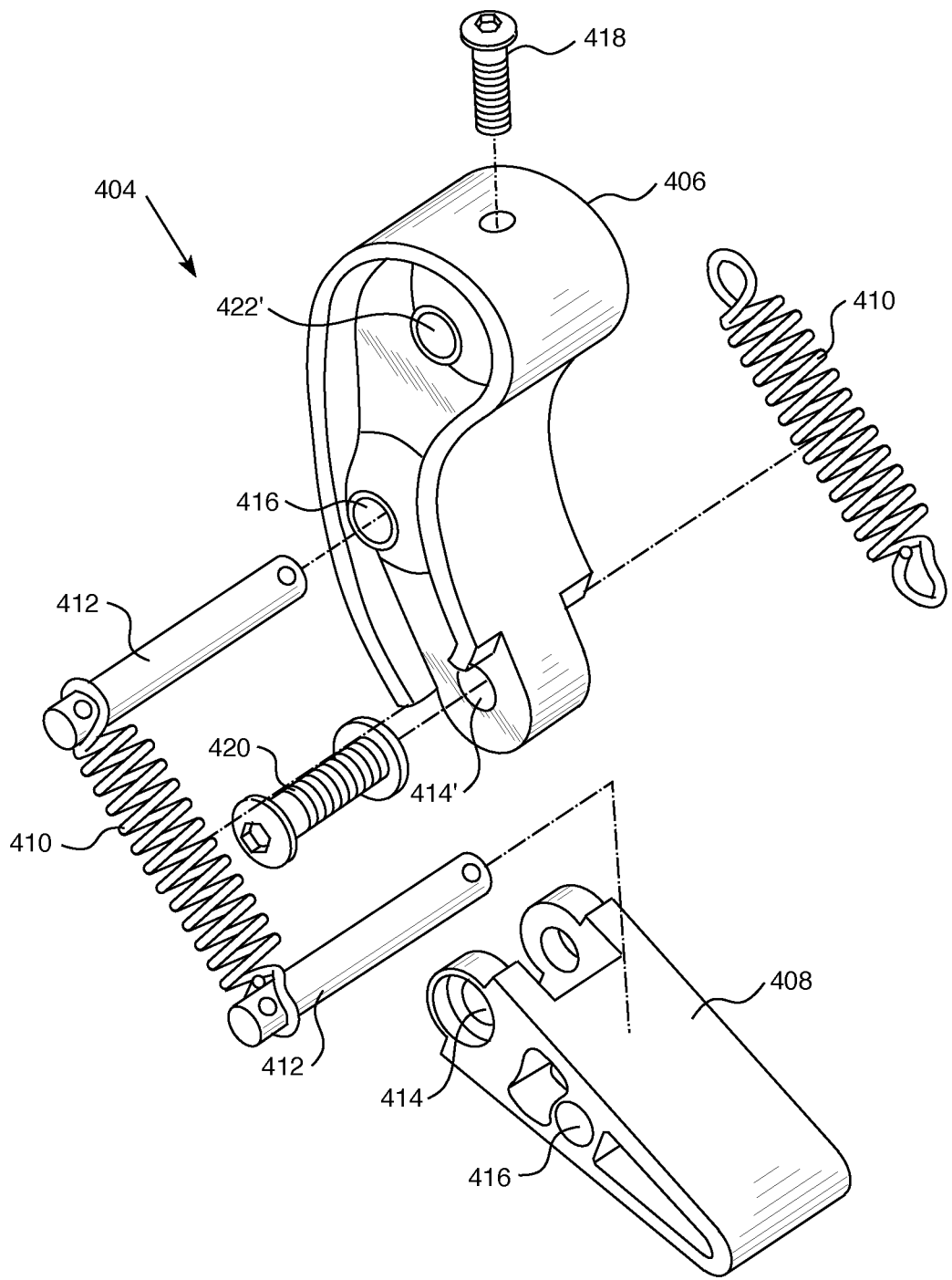
FIG. 21 is an exploded view of the finger portion of the embodiment of the gripper of FIG. 20.

An exemplary gripper 402 is shown in FIG. 20. The gripper 402 shown includes two pair, or four fingers 404. The gripper 402 is not limited to having four fingers. Any number of fingers will suffice provided the mechanism can grasp and hold the elongate objects. An exemplary finger 404 is shown in FIG. 21. Each finger 404 includes a finger base 406 and a finger flipper 408 pivotally connected by a connector 420 passing through openings 414 and 414' in the finger flipper and finger base, respectively. Connector 420 may be any suitable pin, bolt or the like that joins the base and flipper finger pieces and allows them to pivot relative to each other. The free end of each finger flipper 408 is tapered for ease of maneuvering the fingers 404 around and under elongate objects, such as rebar 52, 54, when lifting them from grooves 20 in a magazine 14. Each finger 404 may also include at least one and in certain aspects, two extension springs 410 on each side thereof connected at one end to the finger base 406 and at the other end to the finger flipper 408 by pins 412 mounted in holes 416. The extension springs 410 bias the finger flippers 408 inwardly, towards its paired finger 404. The end of each finger base 406 that is not connected to the finger flipper 408 includes a hole 422' for pivotally mounting the finger 404 on a shaft 422. Each gripper 402 has two parallel spaced shafts 422. Each pair of fingers 404 is mounted on a different one of the two shafts facing and off-set from the other member of the pair so that the tapered ends of the finger flippers 408 of each paired finger 404 are biased towards the other for side to side rather than end-to-end contact, as shown in FIG. 20.

The extension springs 410 may be replaced with a leaf spring or any other suitable means for biasing the gripper fingers in a closed position. For example, a leaf spring (not shown) may be encapsulated inside the finger base 406 and finger flipper 408 placing the flipper 408 in tension in a closed position until forced open by pressure from the rebar sections as the gripper is lowered down to the rebar.

Figure 22:
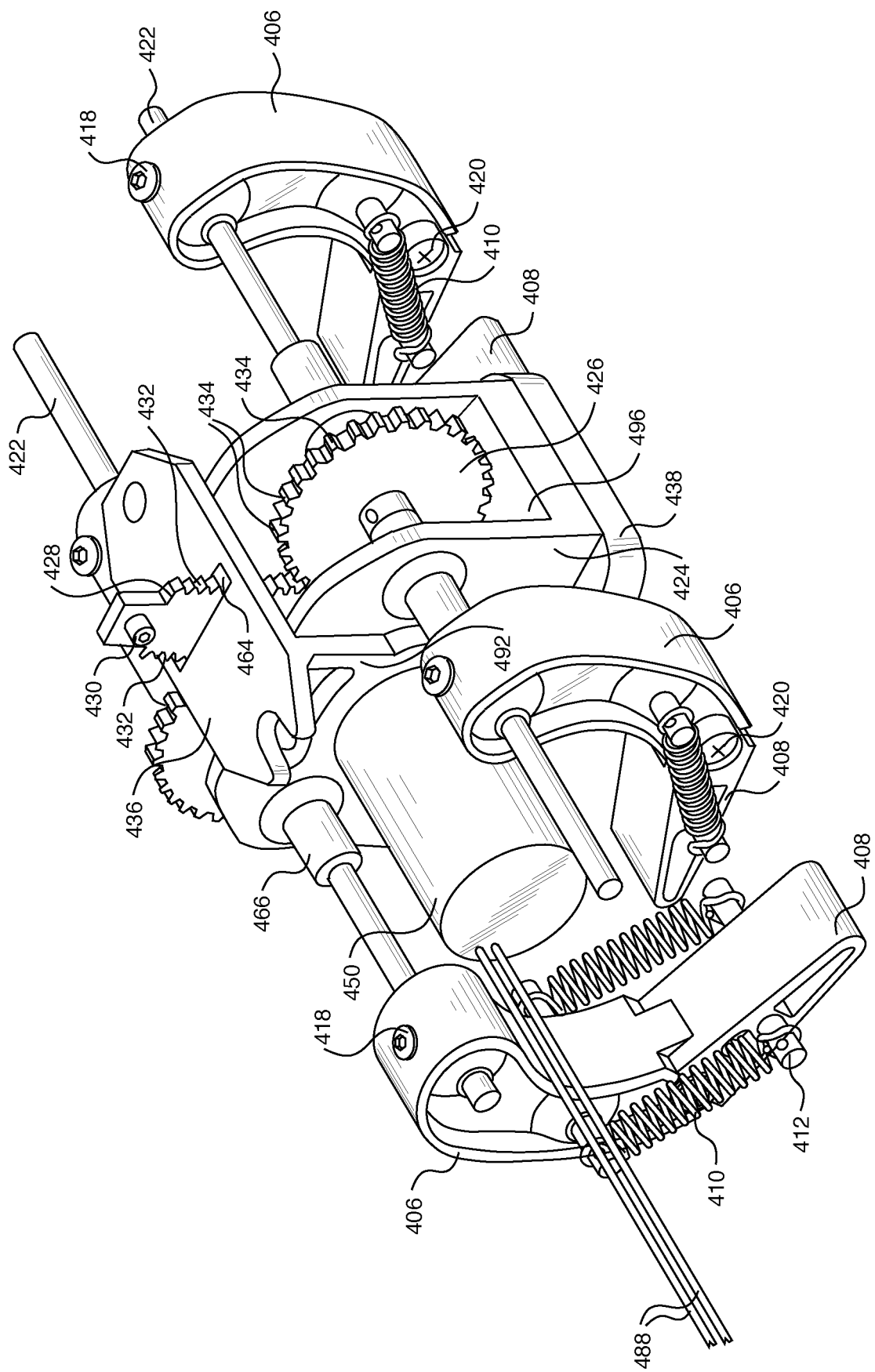
FIG. 22 is a perspective view of the components of the gripper of FIG. 20.
Figure 23:
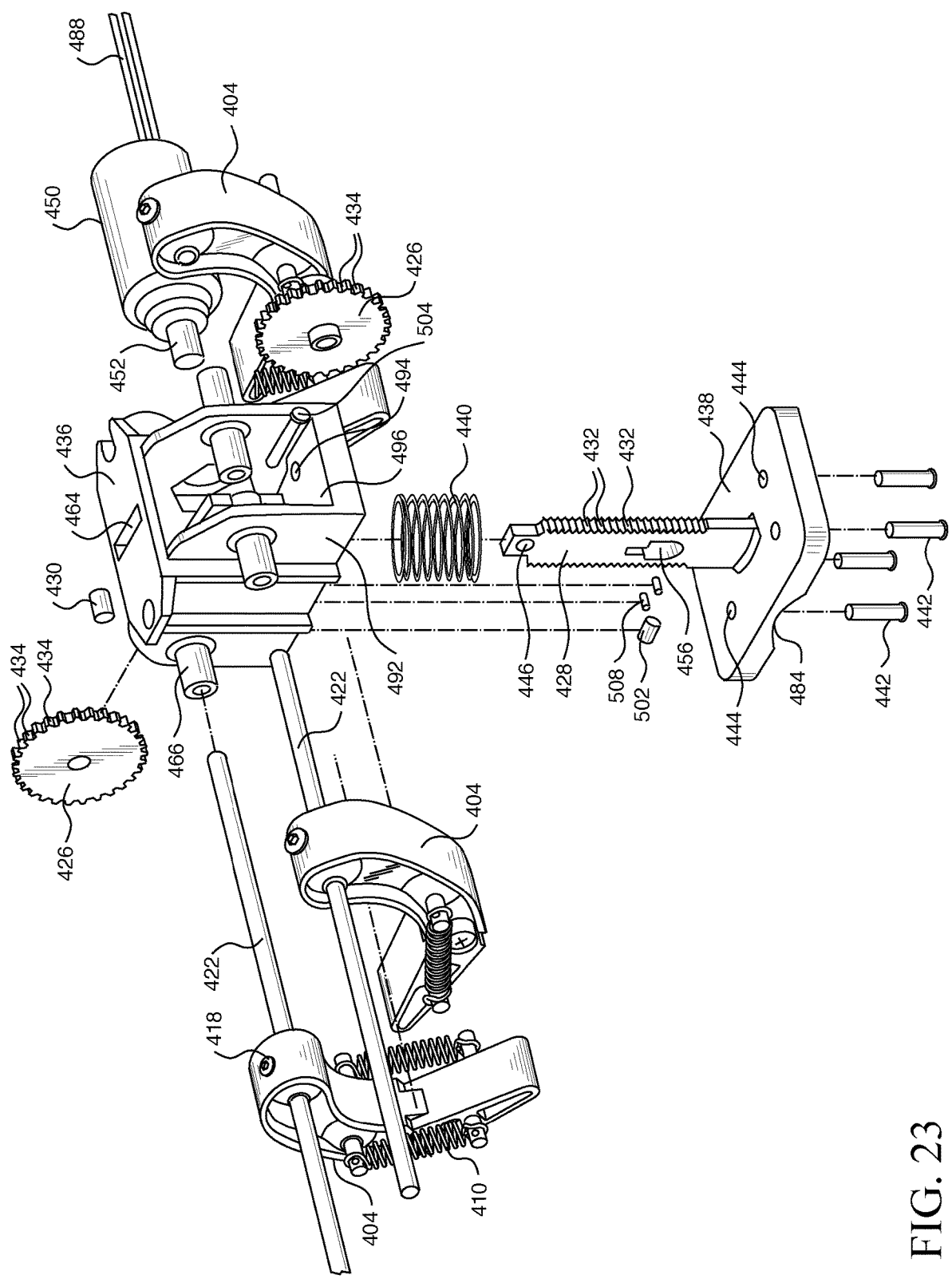
FIG. 23 is an exploded view of the components of the gripper of FIG. 22.

Each gripper 402 includes a finger actuation member for opening and closing the pairs of fingers 404 for grasping and releasing a targeted elongate object. In the embodiment shown in FIGS. 20, 22 and 23, the finger actuation member includes a rack 428 positioned between and configured for engagement with two gears 426. The rack 428 may be in the form of a rectangular plate having teeth 432 along each edge of a mid-section thereof, an opening in an upper portion thereof for receiving a stop pin 430, and a solid lower section, wider than the toothed mid-section, connected to and extending upwardly from, and generally perpendicular to, a base plate 438. Each of the two gears 426 is mounted on a different one of the parallel shafts 422 and positioned between fingers 404 mounted on the same shaft 422. Each gear 426 includes gear teeth 434 that mesh with or engage rack teeth 432, with one gear 426 engaging rack teeth 432 on one edge and the other gear 426 engaging rack teeth 432 on the opposite edge of the rack 428. Referring to FIG. 20, there are two gears 426, one on each toothed side of rack 428, each gear 426 mounted on a separate shaft 422 that passes through holes 422' on finger bases 406.

The gears 426 are contained in gear case 424. Gear case 424 has a top portion 436, sides 492, and bottom surface 496, which includes a slot 498 through which the solid lower section of rack 428 passes and a cavity 500 for receiving at least a portion of spring 440. Holes with sleeves 466 extend through each side of gear case 424 through which shafts 422 pass gear case 424 provides a housing for the finger actuation member. Top portion 436 includes a slot 464 in alignment with rack 428. A spring 440, such as a wave spring, is positioned around the lower section of rack 428 between base plate 438 and the outer cavity 500 in the bottom surface 496 of gear case 424. The spring 440 exerts a downward force against the base plate 438 of rack 428, thereby keeping base plate 438 fully extended from the housing and rack 428 within the gear case 424 when the finger actuation member is at rest and no other force is exerted to compress the spring 440. Stop pin 430 at the top of rack 428 and above top portion 436 prevents rack 428 from sliding out of gear case 426. Alignment pins 442 extend through holes 444 in base plate 438 up through and in sliding engagement with holes 494 in the bottom 496 of gear case 424.

A solenoid 450 is positioned on one side 492 of the cap and connected to side 492 and gear case 424 through a threaded end section 460 and threaded nut 506. Solenoid 450 includes a plunger 452 that can slide into and out of a cavity 454 in solenoid 450. Plunger 452 is spring-loaded (spring 510, shown in FIG. 28) so that it will push out of cavity 454 when not blocked by rack 428. Spring 510 causes the solenoid to lock without any electrical engagement of the solenoid. On a closed end of solenoid 450, wires 488 extend to an electrical circuit, for example in actuator subassembly 300, and are engaged as needed to unlock the solenoid plunger 452 in rack lock hole 456. On the other end of solenoid 450, there is an opening through end section 454 that leads to cavity 454. The exterior end 458 of plunger 452 extends through the opening. Rack 428 includes a lock hole 456 sized to receive end 458 of plunger 452 to lock gripper fingers 404 about rebar 52, 54. In various aspects, a roller bearing 502 is embedded in the middle of rack 428 to reduce friction of the exterior end 458 of plunger 452. In various aspects, roller bearing 502 may be inserted in rack 428 during assembly via a track 468. A second roller bearing 504 and a guide 512 are positioned within gear case 424 to at least partially engage plunger end 458 to reduce any friction and align plunger end 458 as it travels back and forth between solenoid 450 through gear case 424 and lock hole 456 of rack 428. One or more locking pins 508 hold roller bearing 502 in place adjacent lock hole 456. An annular stop ring 490 is position around plunger 452 to prevent the plunger from moving too far out of solenoid 450. The stop ring 490 blocks travel of plunger 452, for example, when stop ring 490 abuts guide 512.

Figure 44:
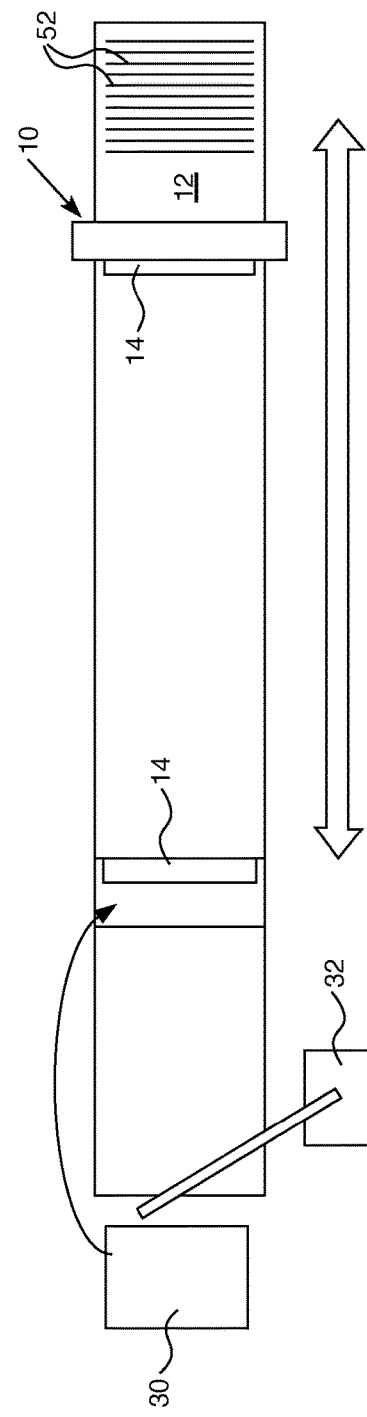
FIG. 44 is a schematic illustration of the relative positioning of a stockpile of elongate objects, a crane for moving the objects to a magazine or other container closer to the work site, and the movement of the semi-autonomous transport and placement apparatus to position the magazine and place the objects on the work site.

As shown in FIG. 44, bulk stocks of rebar 52, 54 will be moved from a stockpile 30, typically manually, and placed in a magazine 14. The magazine filled with the appropriately sized rebar required for the job is moved by the apparatus 10 closer to the work site 12. Magazine 14 may include elongate handles along the middle, sides or corners of the magazine that the grippers can grasp in the same way they grasp rebar. Alternatively, the apparatus 10 may move the magazine by one or more lift arms 514.

Figure 50:
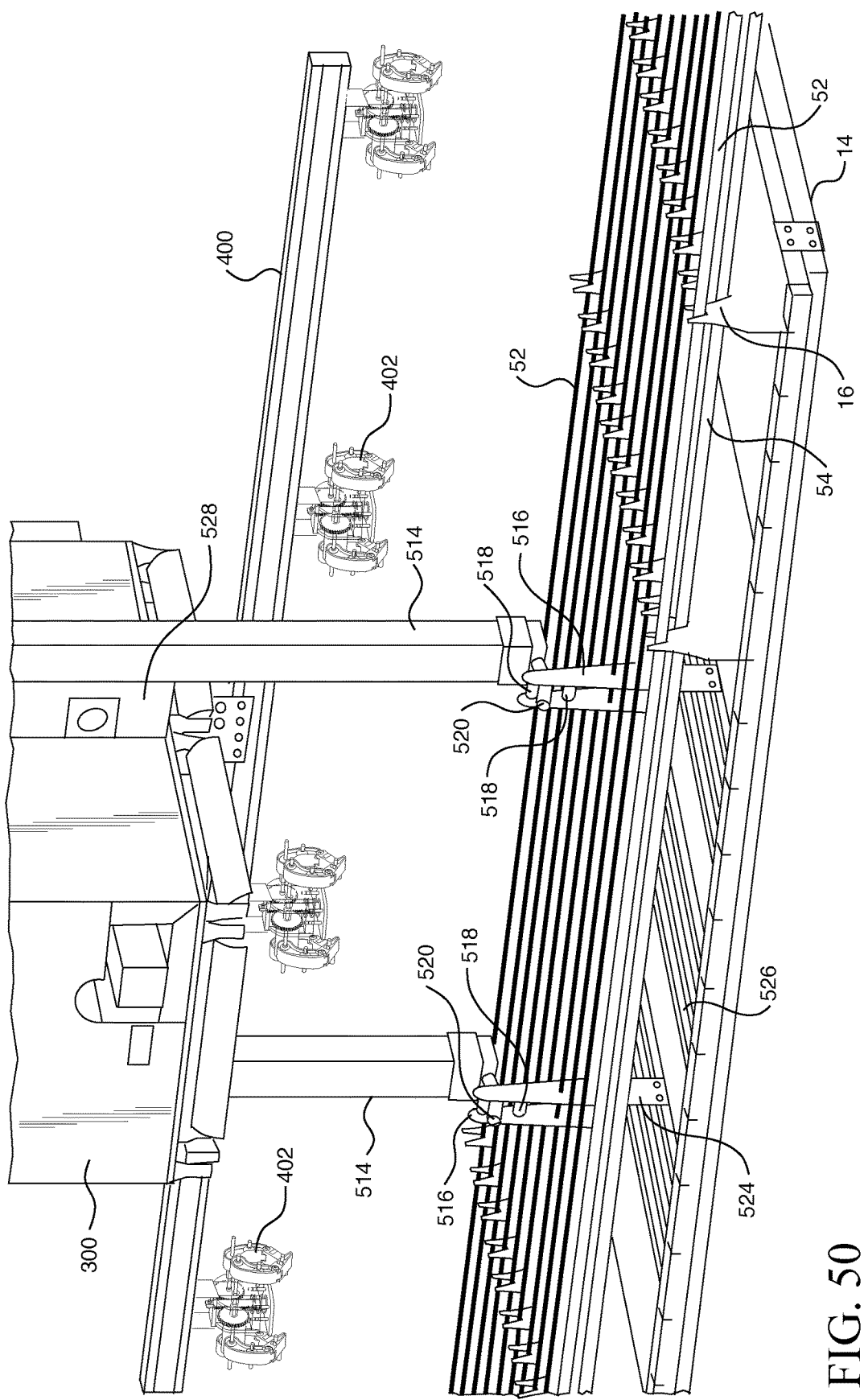
FIG. 50 is a perspective view of a portion of an embodiment of the transport and placement apparatus described herein showing a pair of magazine lifting arms engaged with handles on an exemplary rebar magazine.

An embodiment of apparatus 10, shown in FIG. 50, may include a pair of lift arms 514, one on each side of the actuation subassembly 300. Each lift arm 514 has a hook 520 or any suitable engagement member for engagement with rungs 518, or any suitable complementary engagement members, on handles 516 attached, for example, by a bracket 526 on a cross-bar 524 of magazine 14. Each lift arm 514, in various aspects, may be connected to a motorized gear set 528 on actuation subassembly 300 or on the gantry truss 102 to facilitate upward and downward movement along a Z axis. To lift magazine 14, lift arms 514 would be lowered by actuation of gear set 528 and apparatus 10 moved close enough to magazine 14 until hooks 520 are under rungs 518. The arms 514 would then be raised until hooks 520 engage rungs 518, then lifted more to lift magazine 14 from the ground. Apparatus 10 would then be moved to the work site 12 and the magazine 14 would be lowered and released. Lift arms 514 would them be moved away from rungs 518 and raised out of the operational path of the gripper subassembly 400.

Motorized gear set 528 may include any suitable gear arrangement and power source known to those skilled in the art. Those skilled in the art will appreciate that movement of the lift arms 514 along a Z axis to lift and lower a magazine 14 or other container may be done by means other than a motorized gear set, such as hydraulic, pneumatic, or any other linear actuation effectors.

Figure 31:
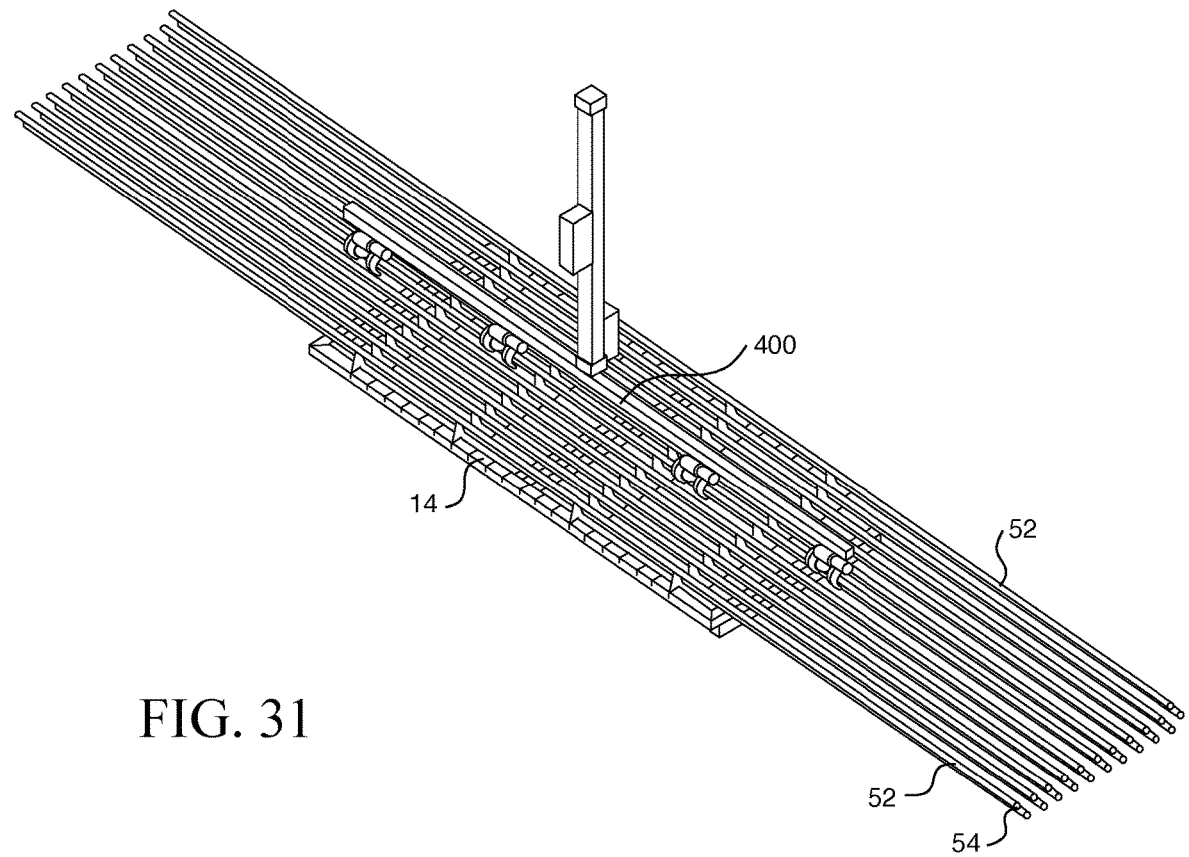
FIG. 31 is a perspective view of a gripper subassembly lifting an elongate object from a magazine of such objects.
Figure 32:
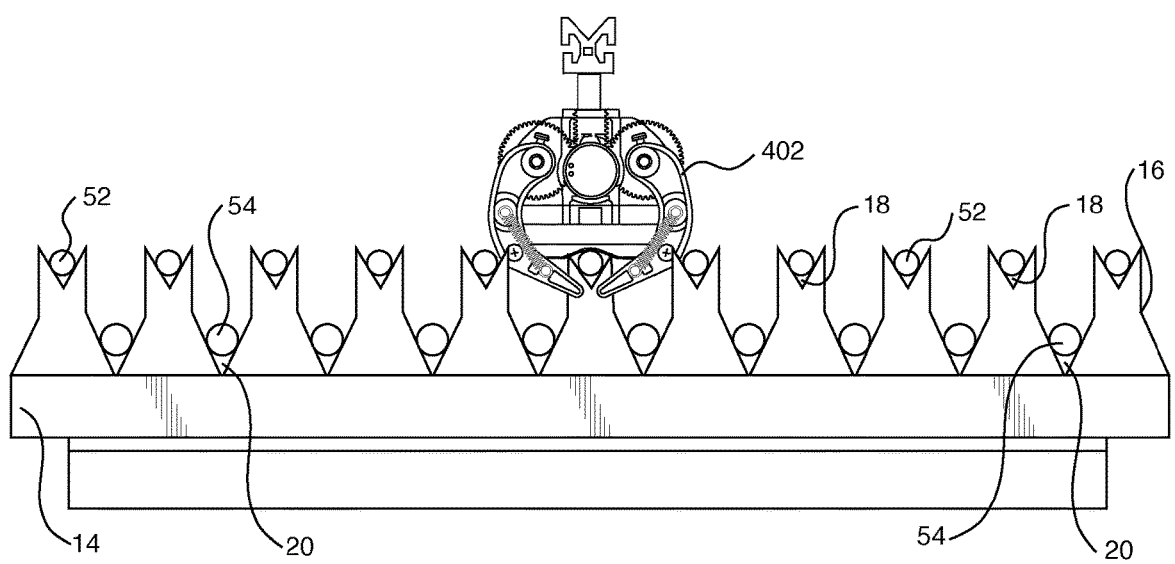
FIG. 32 is a side view of a gripper assembly grasping an elongate object from a magazine.

As shown in FIGS. 31 and 32, lengths of rebar 52, 54 ready for use at a work site 12 are positioned in grooves 18 elevated by posts 16 and in lower grooves 20 of a magazine 14. The elevated and lower level grooves maximize the capacity of the magazine 14 while keeping the spacing necessary between bars for the gripper engagement. Typically, both grooves 18 and 20 will hold the same type of rebar. In various aspects, however, rebar of different types, such as those of different lengths, diameters, or coatings, may be positioned in the different grooves 18 or 20. The apparatus 10 positions the gripper subassembly 400 over the rebar magazine 14 and the fingers 404 of each of the plurality (four are shown) of grippers 402 close around a length of rebar 52 or 54. At the work site, the apparatus 10 orients the gripper subassembly 400 in the Y or X direction, or at a desired angle or slope relative to the X, Y, and Z planes according to the pre-installed construction plan, to lift and transport single pieces of rebar 52 or 54 for placement to form the rebar mat 50, according to the sequence shown in FIGS. 24, 25 A-G, and 27-30.

Figure 24:
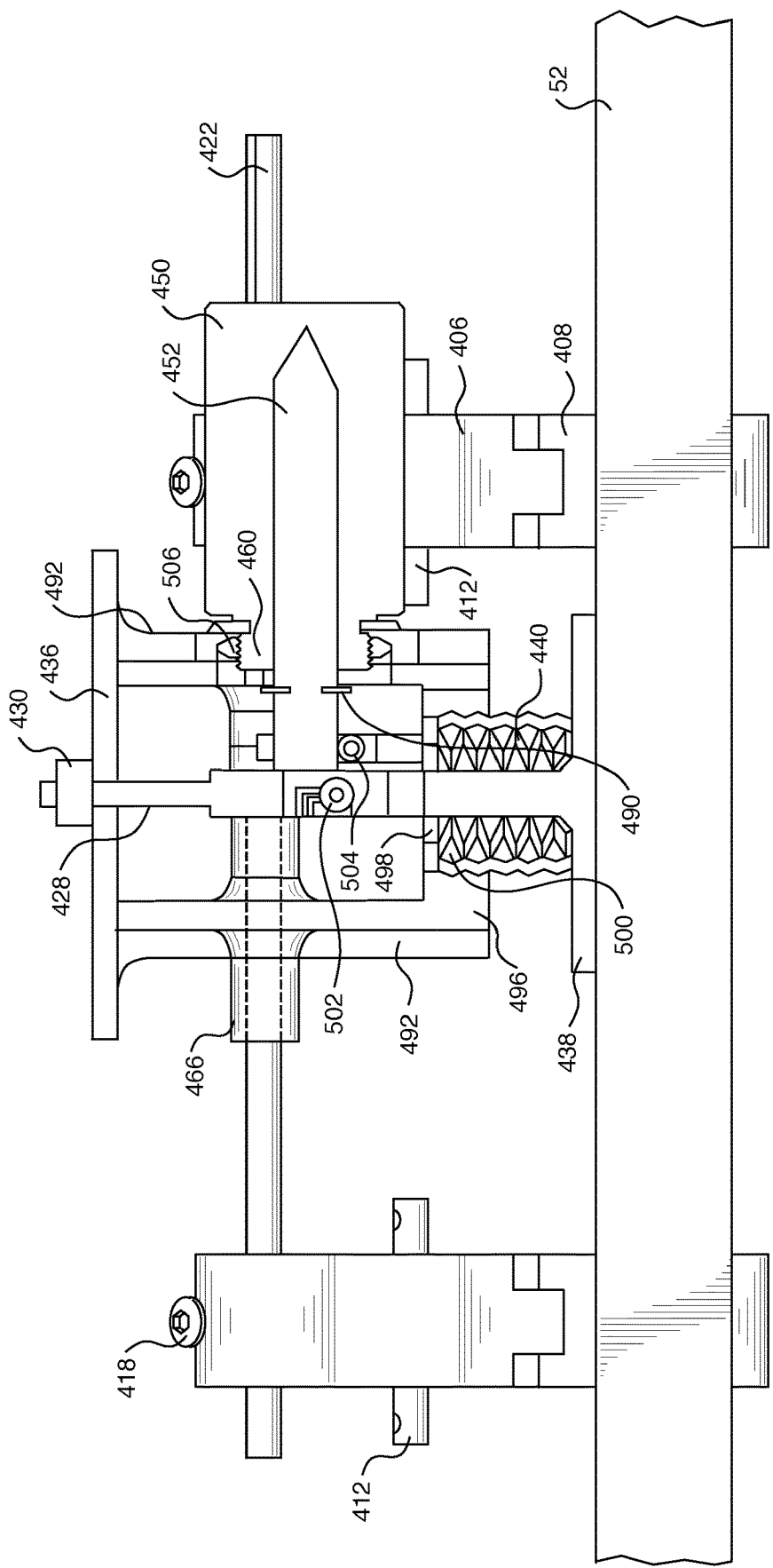
FIG. 24 is a section view of a portion of the gripper of FIG. 20 showing the plunger fully seated in the solenoid chamber and the gripper in an unlocked position, representative of the gripper of FIGS. 25 A-D and G.
Figure 25A:
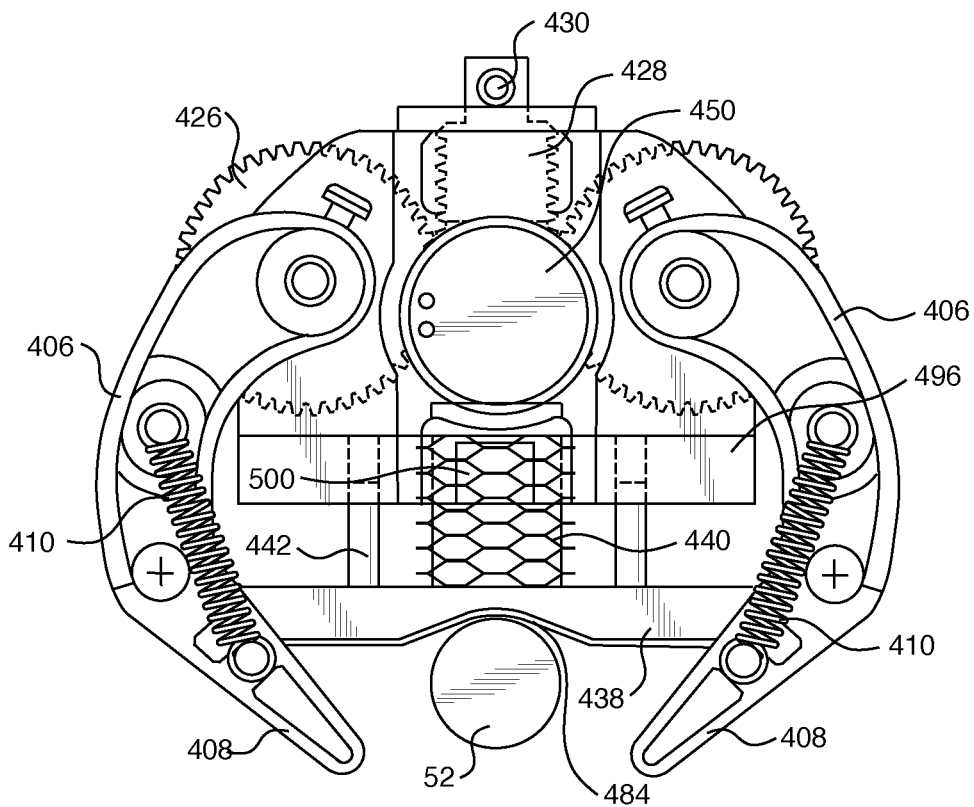
FIGS. 25 A-G show front and back views of a gripper moving from an unlocked open position (front, A) as it picks up an elongate object (front, B, front C, back D) and moves to a closed, locked position (front E, back F) and to an unlocked position (front G) to release the object.
Figure 25B:
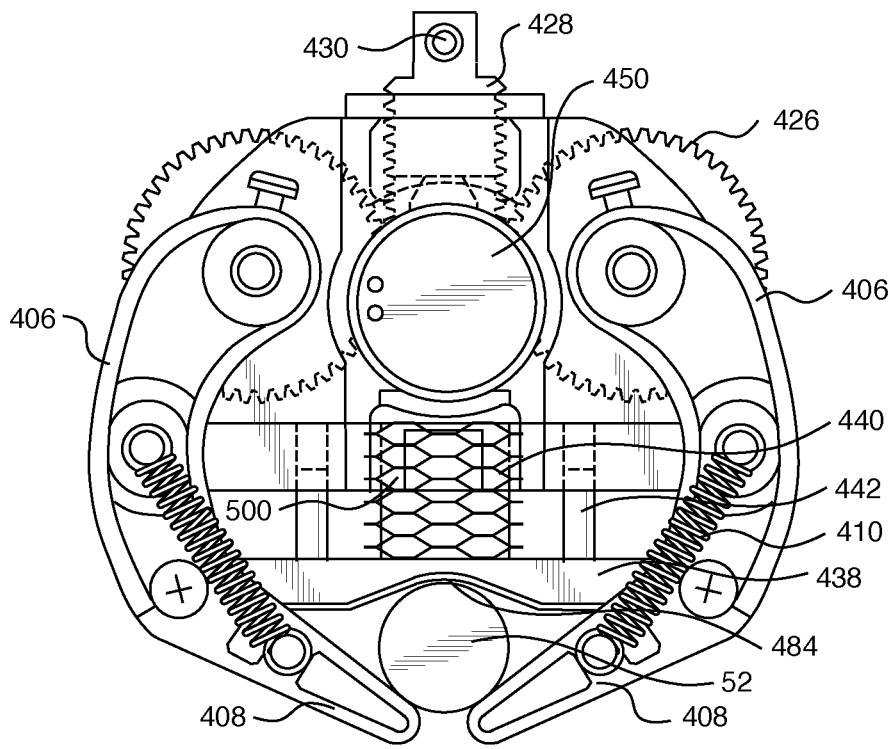
Figure 25C:
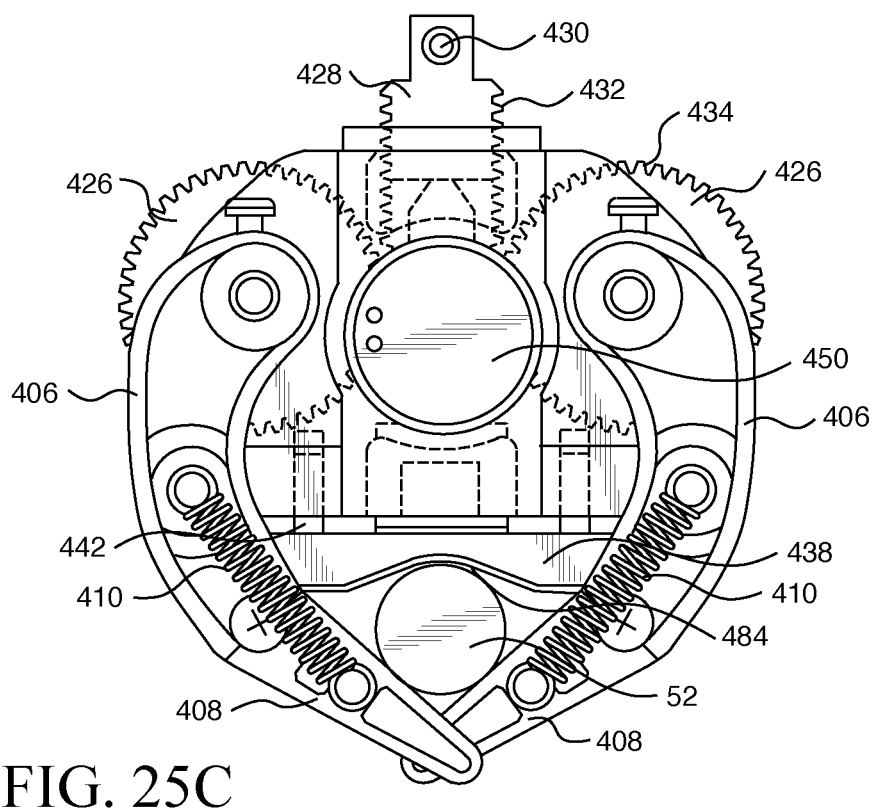
Figure 25D:
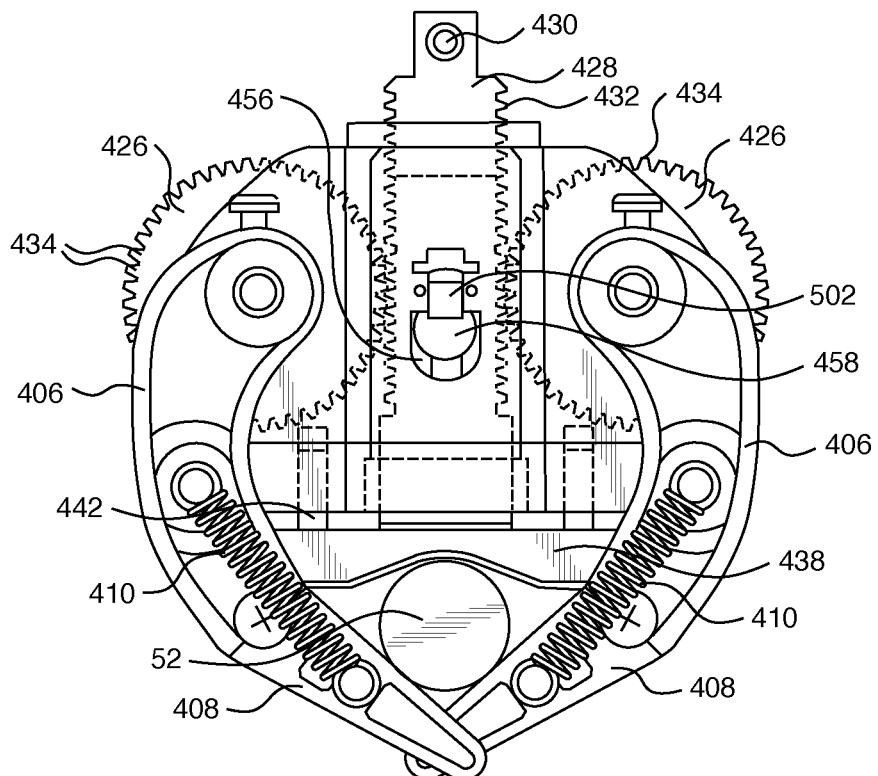
Figure 25E:
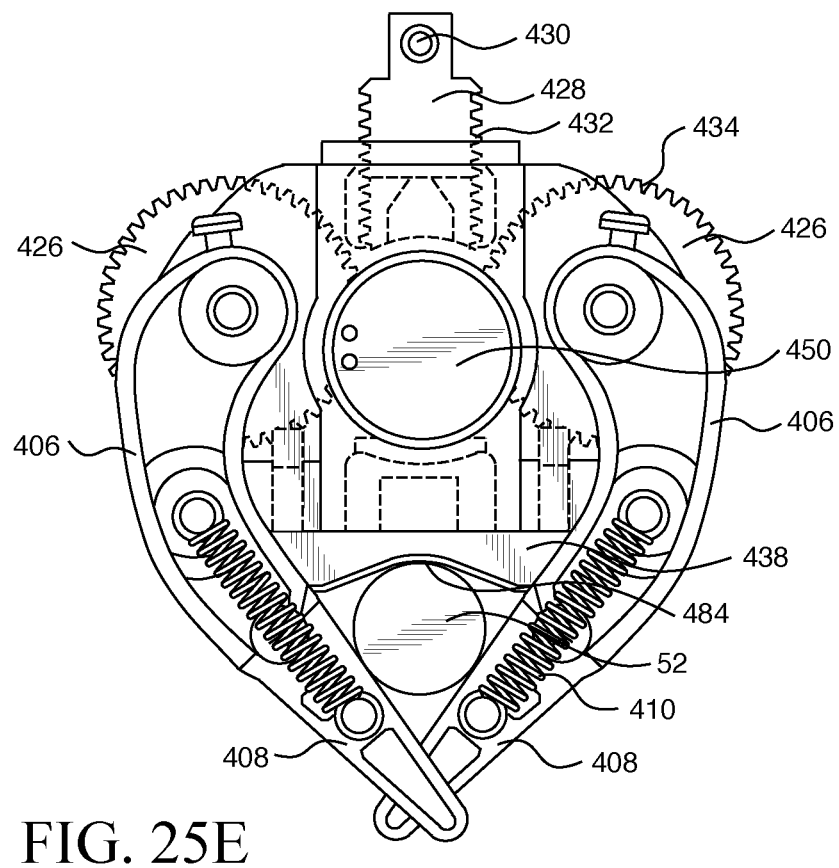
Figure 25F:
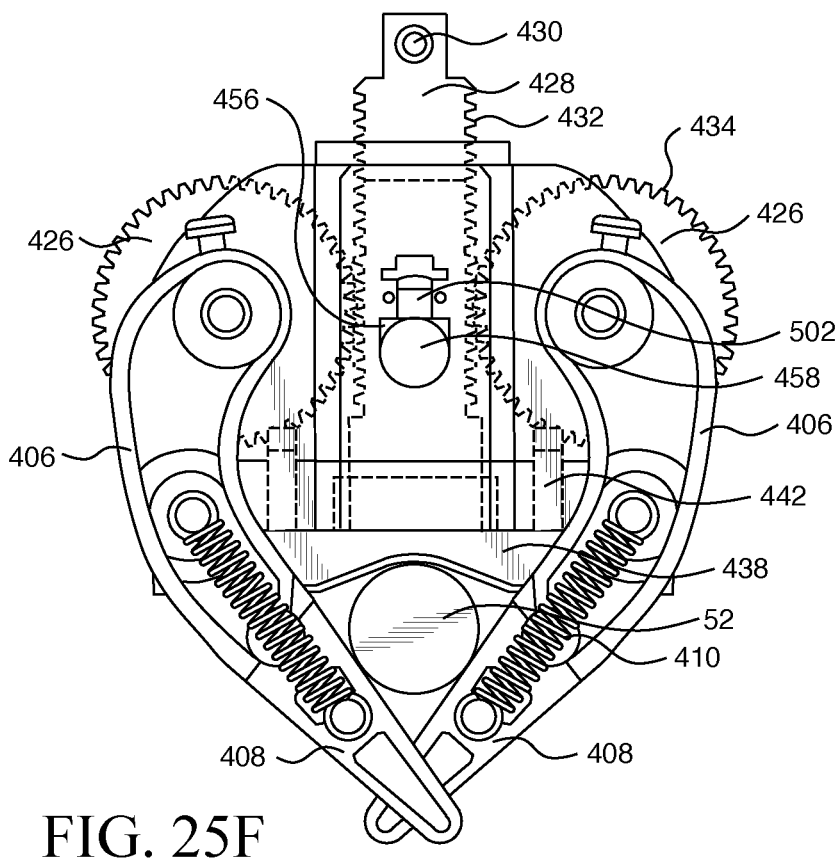
Figure 25G:
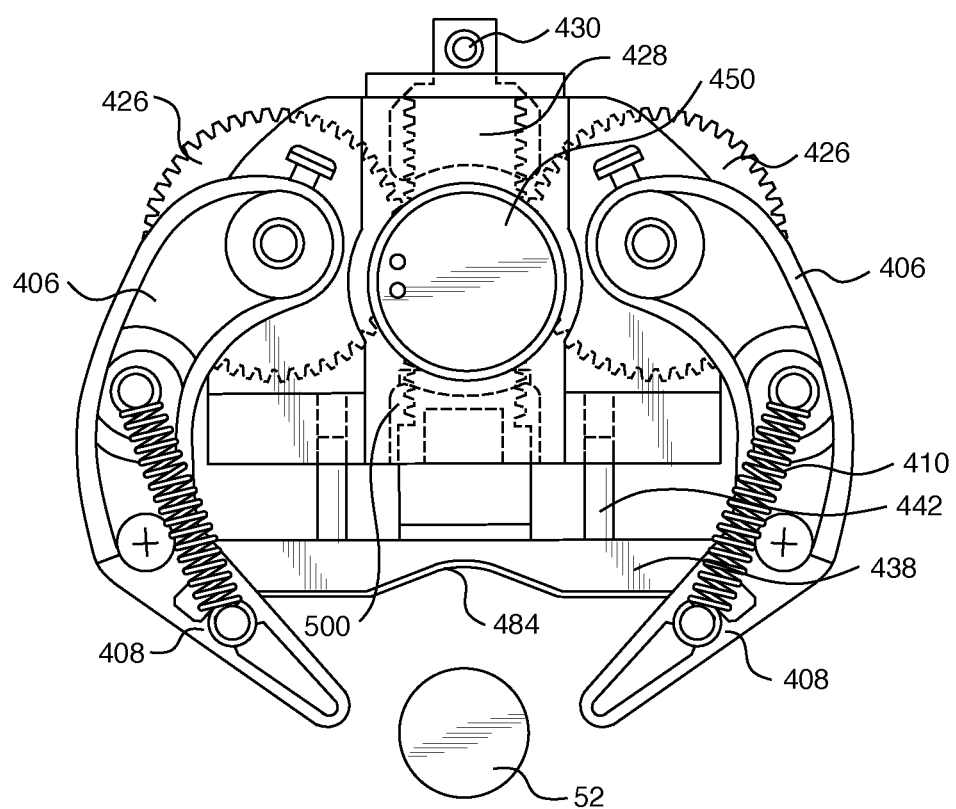

At the start of the sequence, the gripper 402 is open and ready to be lowered by the actuation subassembly 300 along the Z axis to approach a single length of rebar 52 or 54 to be picked up. As shown in FIG. 24, the plunger 452 of solenoid 450 is pressing against the side of the rack 428 and base plate 438 is fully extended from the gear case. Rack 428 (excluding the stop pin 430) is positioned within the gear case 424. The stop pin 430 is in contact with top portion 436 and spring 440 is only slightly compressed, or at rest, as described above. The gripper fingers 404 are fully "closed" and held in that position by the extension springs 410. In this unlocked position, the solenoid plunger 452 is retracted, freeing the rack lock hole 456. A spring 510 on the solenoid plunger 452 pushes the plunger 452 against the rack 428.

Figure 27:
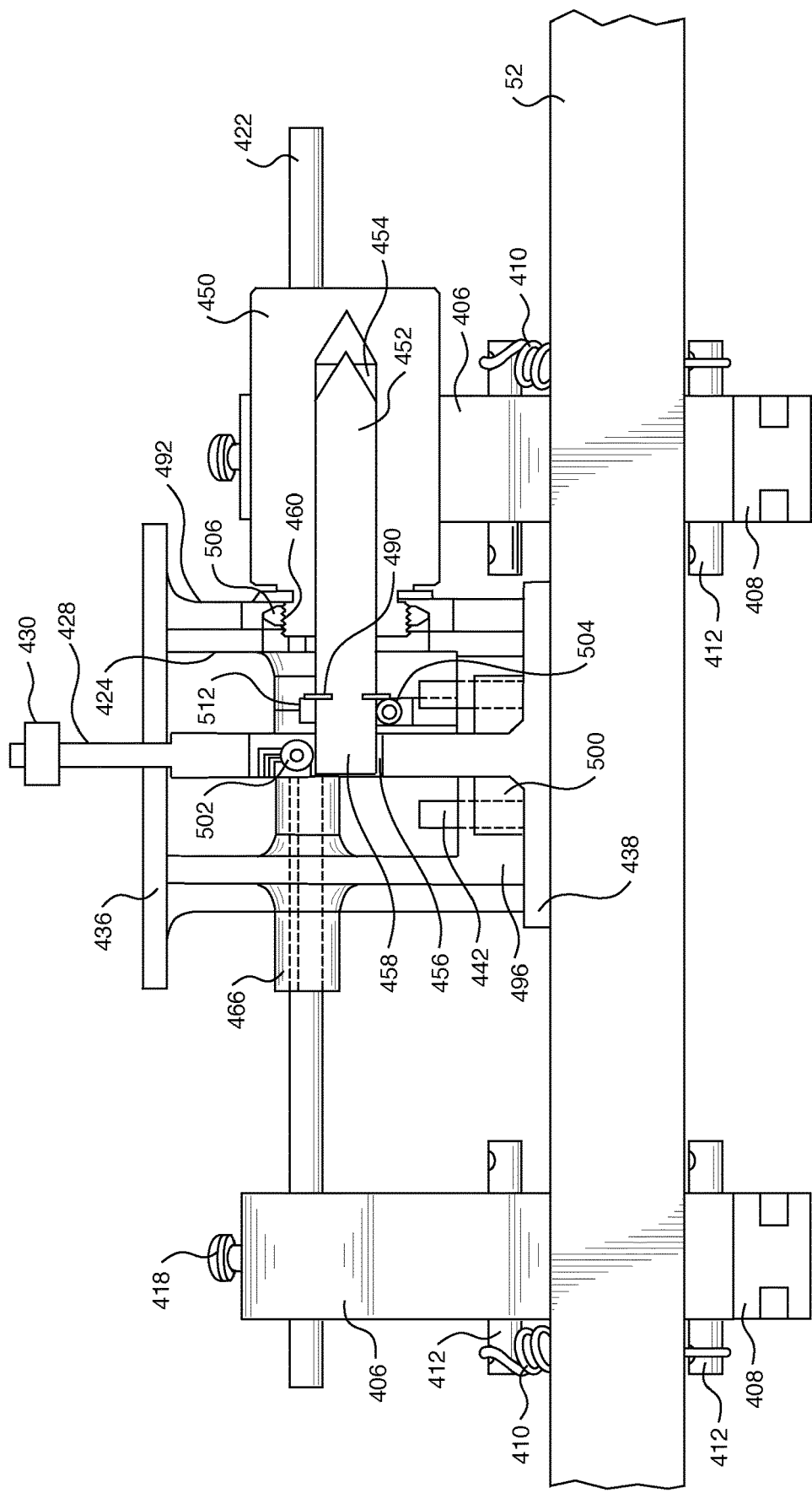
FIG. 27 is a section view of a portion of the gripper of FIGS. 25 E and F showing the plunger partially withdrawn from the solenoid chamber and the gripper in the locked position.
Figure 28:
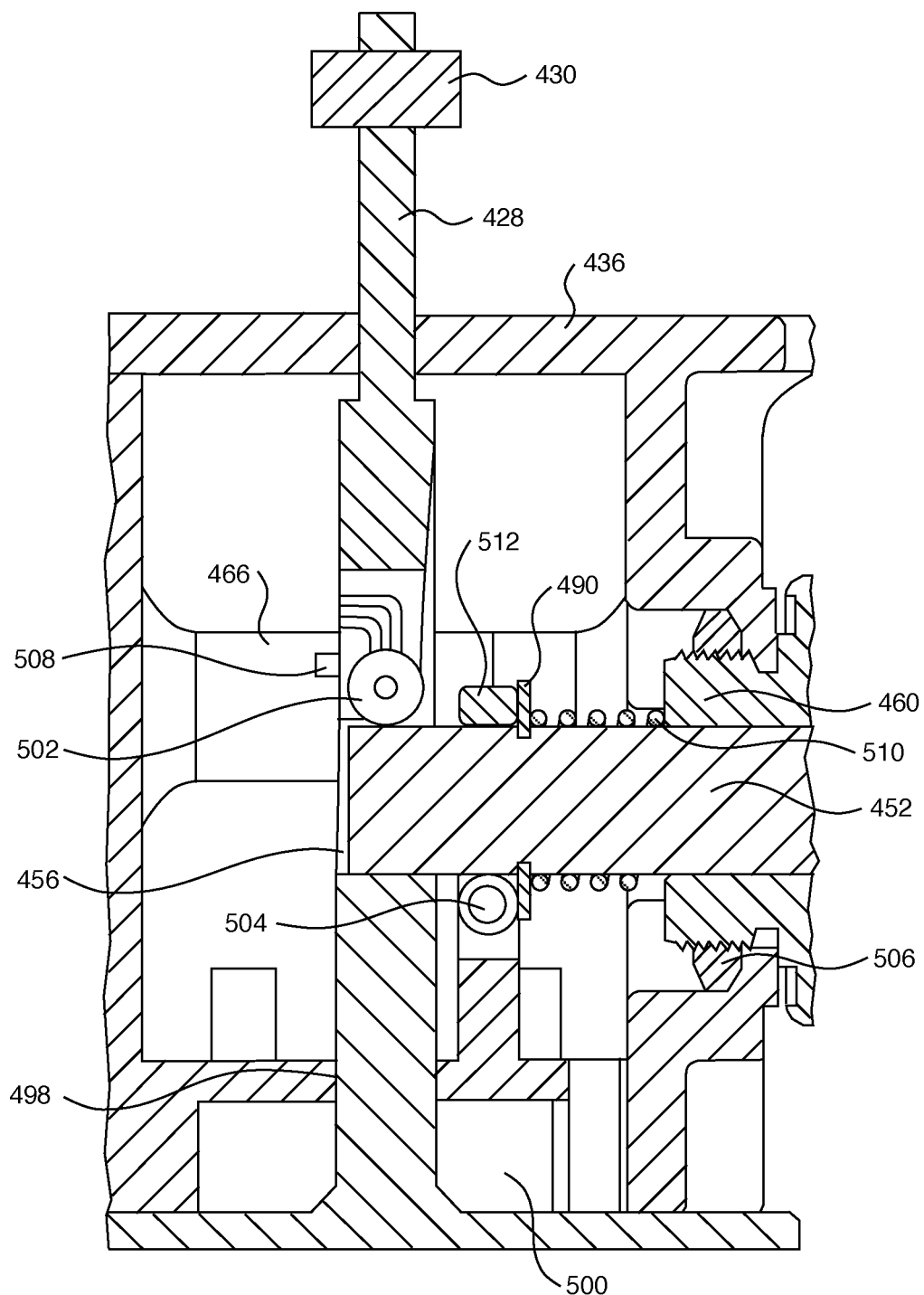
FIG. 28 is an enlarged partial view of a portion of FIG. 27 showing the plunger in the locked position.
Figure 29:
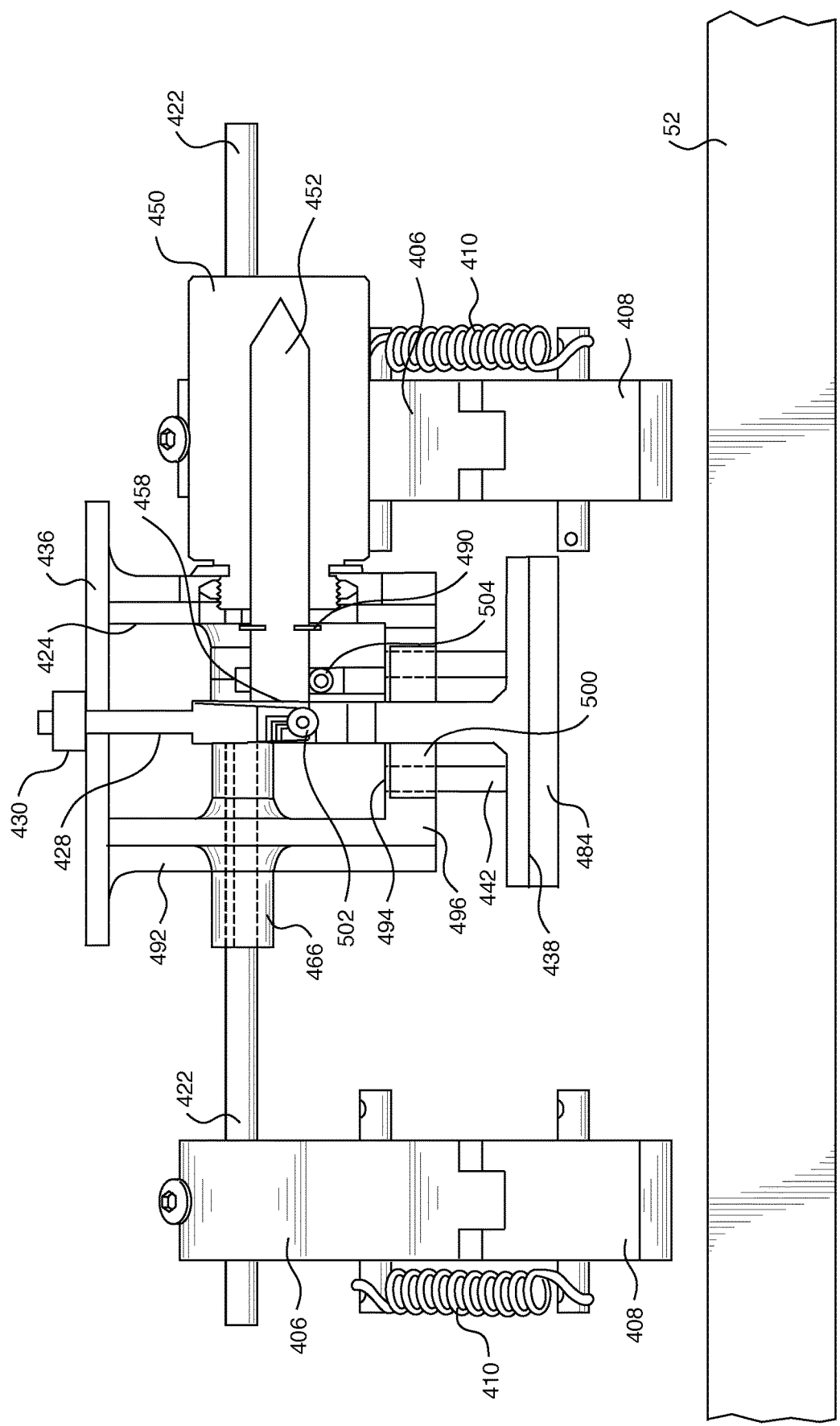
FIG. 29 is a partial section view of the plunger position of gripper the of FIG. 25 G in an unlocked position, releasing the object.
Figure 30:
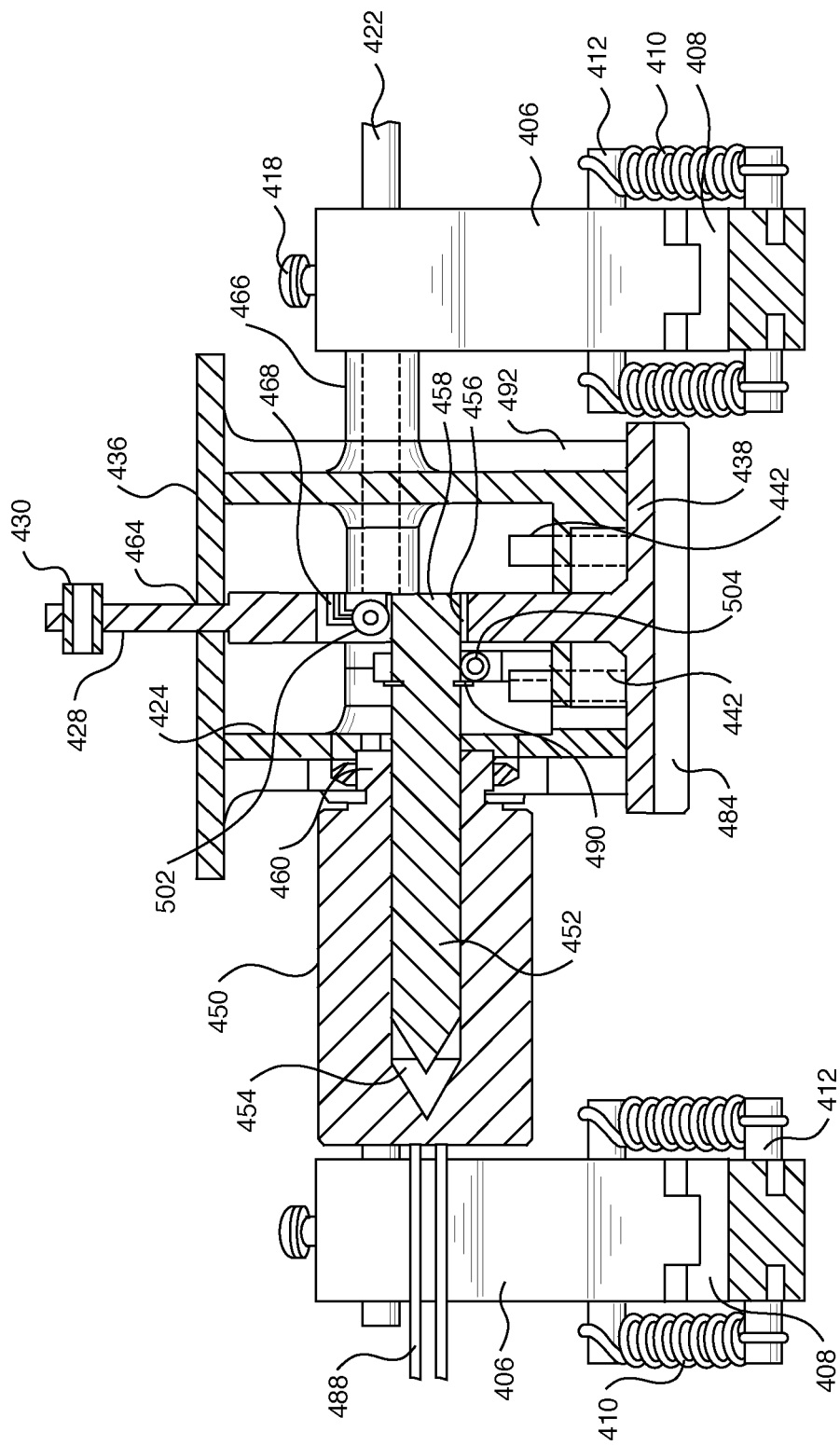
FIG. 30 is a partial section view showing components of the gripper of FIGS. 20 and 25-26.

Referring to FIGS. 25 A and B, as the base plate 438 is forced downward onto the rebar 52, the rack 428 begins to move up through slot 464 of top cap plate 436 and rack teeth 432, meshed with gear teeth 434, turns gears 426 causing the gripper fingers 404 to begin to rotate in towards the rebar 52. As shown in FIGS. 25 C and D, when the finger flippers 408 rotate enough to come in contact with the rebar 52, the extension springs 410 stretch. The rack 428 continues to move freely extending further through slot 464 and moving lock hole 456 closer to solenoid plunger 452, as shown in FIG. 25 D, until the solenoid plunger 452 becomes aligned with the lock hole 456, as shown in FIGS. 25 E and F. When the rack 428 reaches full retraction, the lock hole 456 aligns with the solenoid pusher 452. In the locked position, the rack 428 reaches the fully closed position. The solenoid plunger 452 aligns to lock hole 456 in the rack 428. The spring 510 on the solenoid plunger 452 pushes the plunger 452 through the lock hole 456 in the rack 428 locking the mechanism. The solenoid plunger 452 is forced into the lock hole 456 and the fingers 404 are now locked in the "closed" position, and the rebar 52 or 54 is held captive. FIGS. 27 and 28 show a side section and partial close-up side section view of the plunger 452 partially released from cavity 454 with plunger end 458 locked in lock hole 456.

Once the rebar 52 or 54 is in position to be released, the apparatus 10 signals to the solenoid 450, for example, through wires 488, to unlock the grippers 402. When the solenoid 450 is activated, the plunger 452 is retracted from the lock hole 456. When the plunger 452 is clear of the lock hole 456 in the rack 428, the mechanism is free to open, allowing the rack 428 to withdraw back into the housing. As rack 428 is retracted, rack teeth 432 cause gear teeth 434 to rotate the gears 426 inwardly to cause the fingers 404 of grippers 402 to rotate outwardly, releasing the rebar 52 or 54 to fall into the pre-planned position on the work site 12.

Those skilled in the art will recognize that other methods may be used to open and close the gripper fingers. For example, alternate designs may include, instead of a solenoid, use of an electromagnet to lock the rack 428. Alternatively, a ratchet/pawl mechanism may be used to engage with the rack 428 or the gears 426. In another alternative arrangement, a cam-lock that is either electrically, pneumatically, or hydraulically actuated may be used.

Figure 26A:
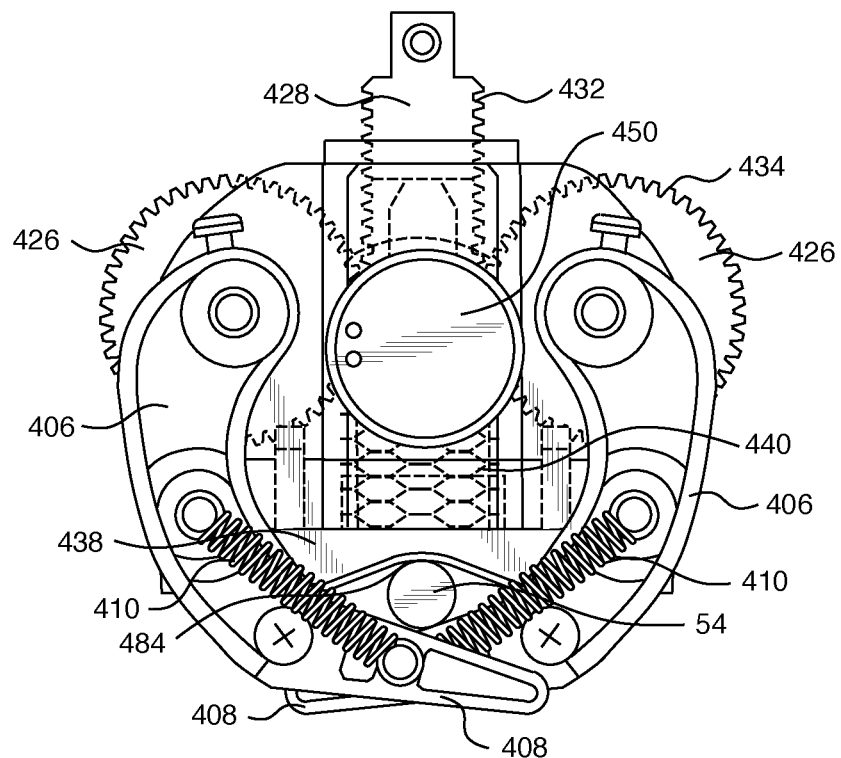
FIGS. 26 A and B show front (A) and back (B) views of the gripper of FIG. 20 holding an object having a smaller diameter than the object shown in FIGS. 25 A-G.
Figure 26B:
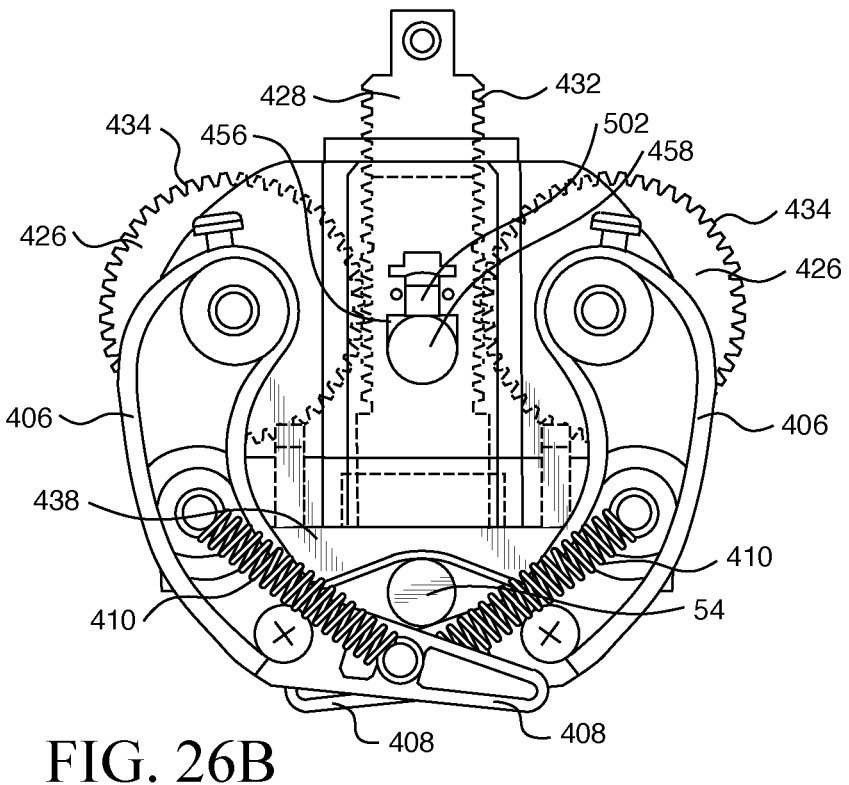

Referring to FIGS. 26 A and B, the extension spring 410 on fingers 404 enable engagement with different sizes of rebar. For smaller diameter rebar, the springs 410 hold the finger 404 closed. For larger diameter rebar, the force applied against the rebar forces the fingers 404 open to provide more room for the larger diameter rebar. Otherwise, the locking and unlocking mechanism works in the same manner as described above.

The Gantry Subassembly

Figure 9:
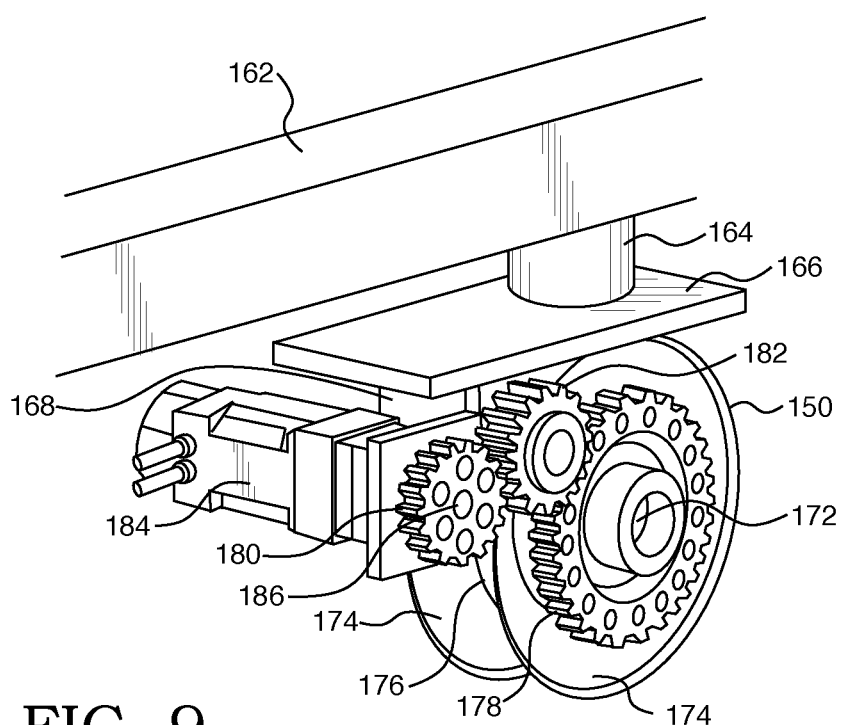
FIG. 9 is a view of the drive wheel and drive motor of the gantry subassembly of the apparatus of FIG. 1 for effecting linear or non-linear travel of the apparatus in a longitudinal direction.
Figure 10:
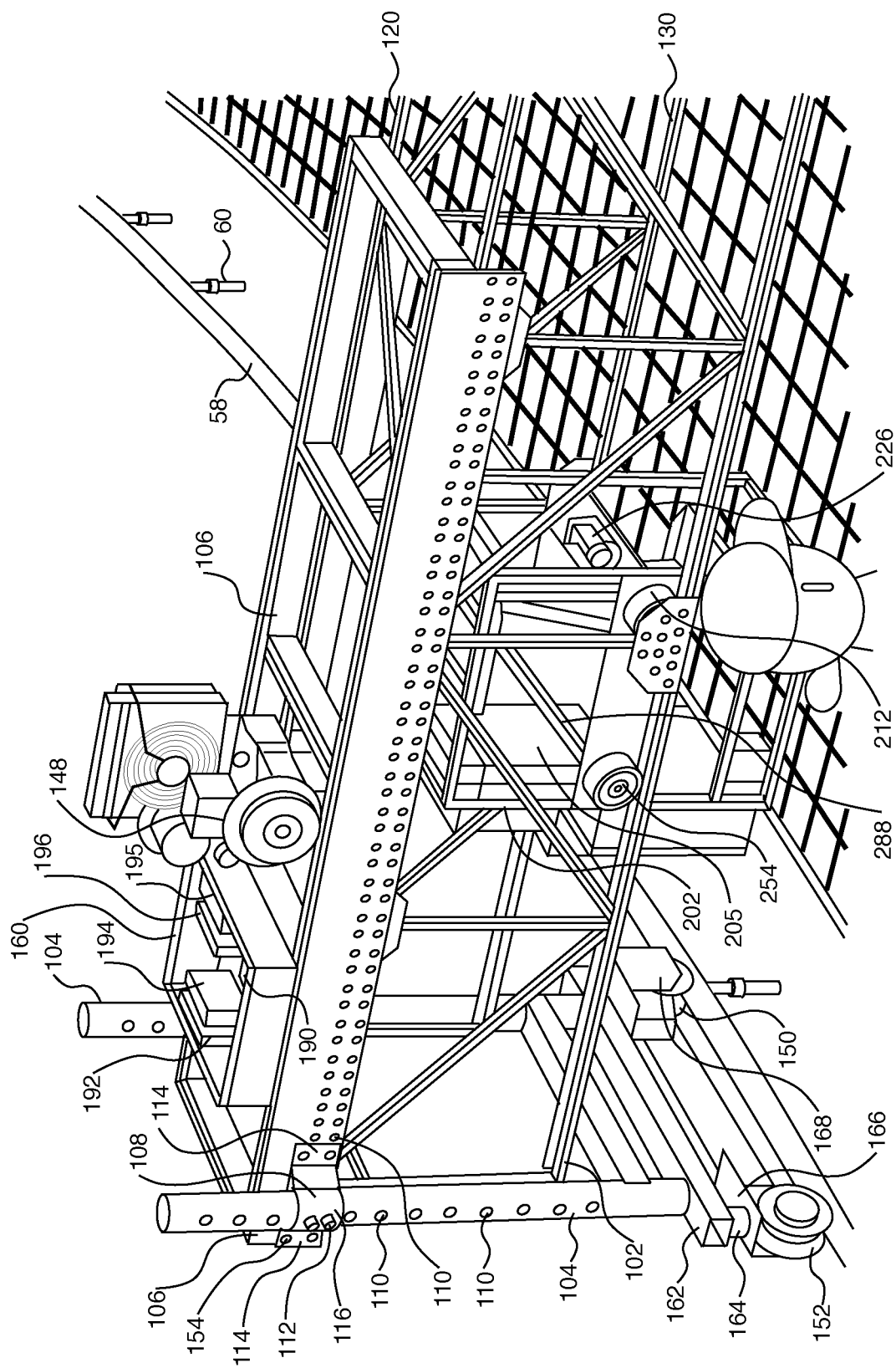
FIG. 10 is a partial perspective view of the apparatus of FIG. 1.

The gantry axis subassembly 100 is the prime mover and moves the apparatus 10 along a first path, which in various aspects, follows the longitudinal path of the roadway or bridge deck under construction. The gantry axis subassembly 100 is comprised of a truss or bridge structure 102 that in various aspects may be formed from modules 118 joined together to span the width of a work site, such as a road way or bridge deck (i.e. in a direction transverse to the first path). The gantry axis subassembly 100 may, in various aspects, be supported on conventional steel pipe screed rails 58 typically used in concrete road and bridge deck formation. In alternative embodiments, the gantry axis subassembly 100 may be structured with wheels, rollers, treads, or tracks like those used in a tank, for riding along the ground. Referring to FIGS. 9 and 10, the gantry axis subassembly 100 contains a power source, such as a generator 148, to power the gantry axis components, a secondary electronics box 160 for system control, and a feedback controlled drive system, including drive motor 184 to self-propel longitudinally along the rails 58 or ground in either continuous or step-&-settle motions.

The gantry axis subassembly 100 in various aspects, may include at least two, and preferably four legs 104, with at least one, and preferably two at each end, an adjustable support frame 106 on each end to which the legs 104 are mounted, and a bridge member, such as truss 102, that spans the width of the work site. The bridge member is attached at each end thereof to one of the support frames 106. The bridge member may be constructed from modules 118 so that the length of the bridge member may be extended on the job site to conform the lateral dimension of any given work site. Extension members may be provided so that the width of the bridge member may be increased as needed at the job site. Although not limited to the structural components described herein, the bridge member will be described as a truss 102, like that shown in FIGS. 5-7. Those skilled in the art will recognize that other structures that can bridge the span of a given work site and carry the tram and actuation subassembly components may suffice.

FIG. 10, for example, shows the legs 104 of gantry axis subassembly 100 to include pre-drilled holes 110. Brackets 108 and pins 112, or any other suitable connectors, connect support frame 106 at a desired elevation on legs 104 to permit the frame 106 and truss 102 to be raised or lowered to an elevation that suits the particular job site. Each bracket 108 has at least one frame connector portion 114 and a leg connector portion 116, each portion having pre-drilled holes 154 that align respectively with pre-drilled holes 110 in the frame 106 and legs 104. Pins 112 pass through the aligned holes to connect the frame 106 to the frame portion 114 of bracket 108 and the legs 104 to the leg portion 116 of bracket 108. Each of the legs 104 and the support frame 106 may have multiple holes 110 so that the frame 106 can be adjusted up or down (i.e., for example, along a Z-axis, or vertically as shown in the Figure) or forward or backward (i.e., along an X-axis, or horizontally in a lateral direction as shown in the Figure) on the legs 104. Additional locking fasteners, such as a screw and nut, may be used to secure the frame 106 and legs 104.

Figure 5:
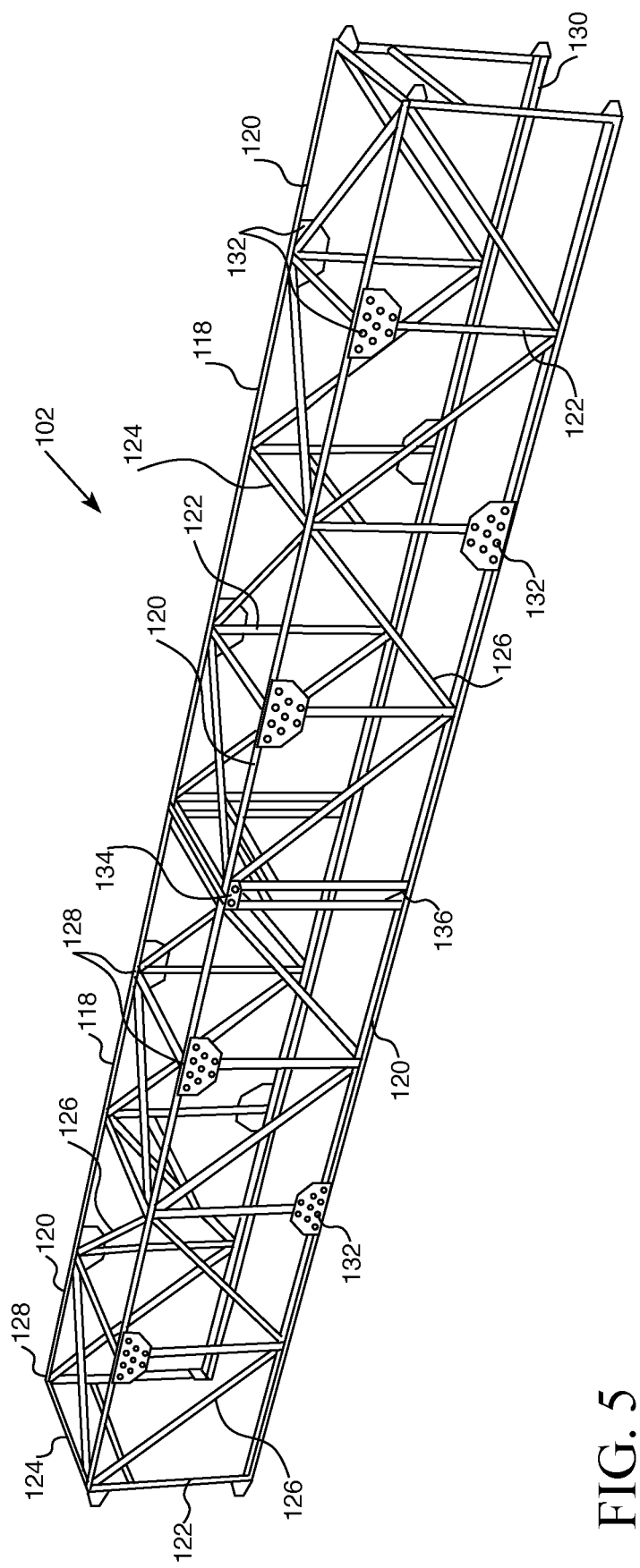
FIG. 5 is a perspective view of an embodiment of the gantry of the transport and placement apparatus comprised of modules.
Figure 6:
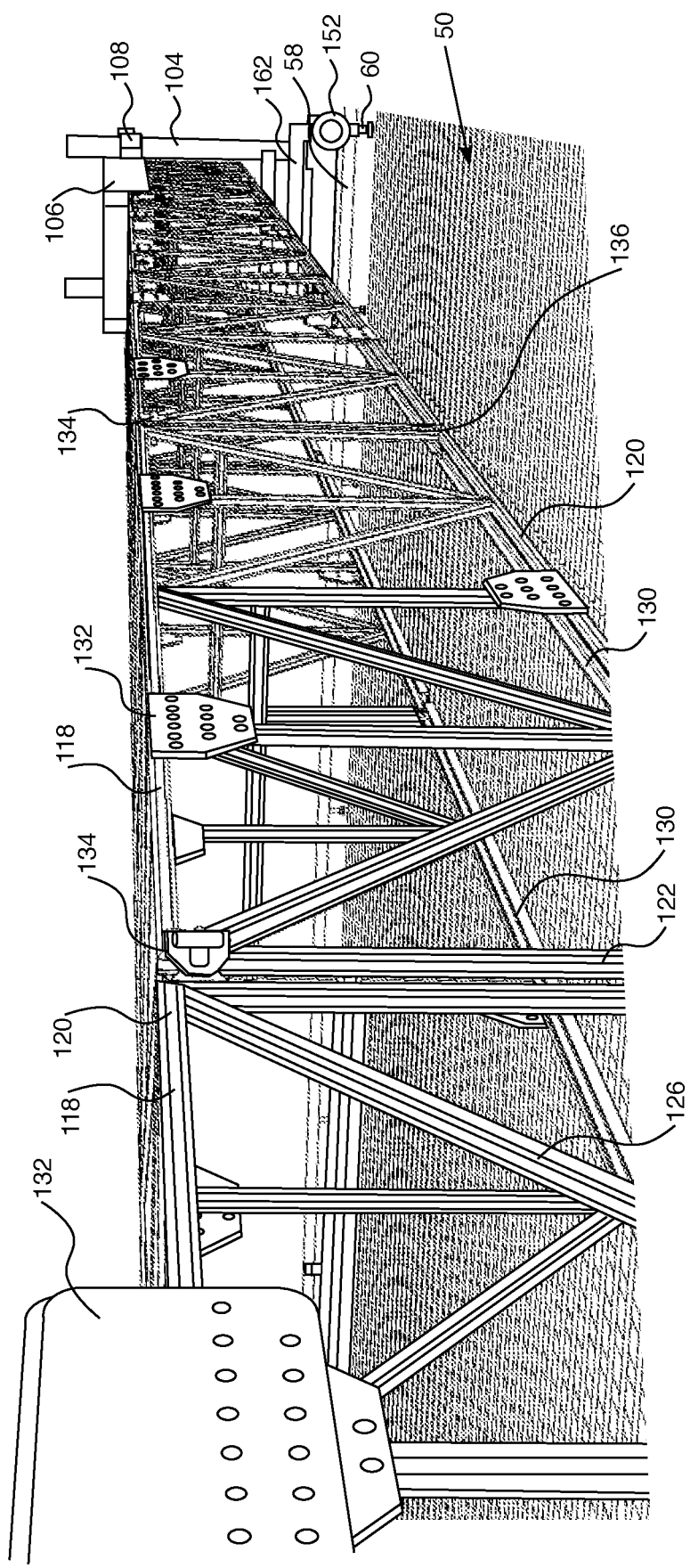
FIG. 6 is a view of one end of the gantry portion of the transport and placement apparatus, showing exemplary connectors between modules.
Figure 7:
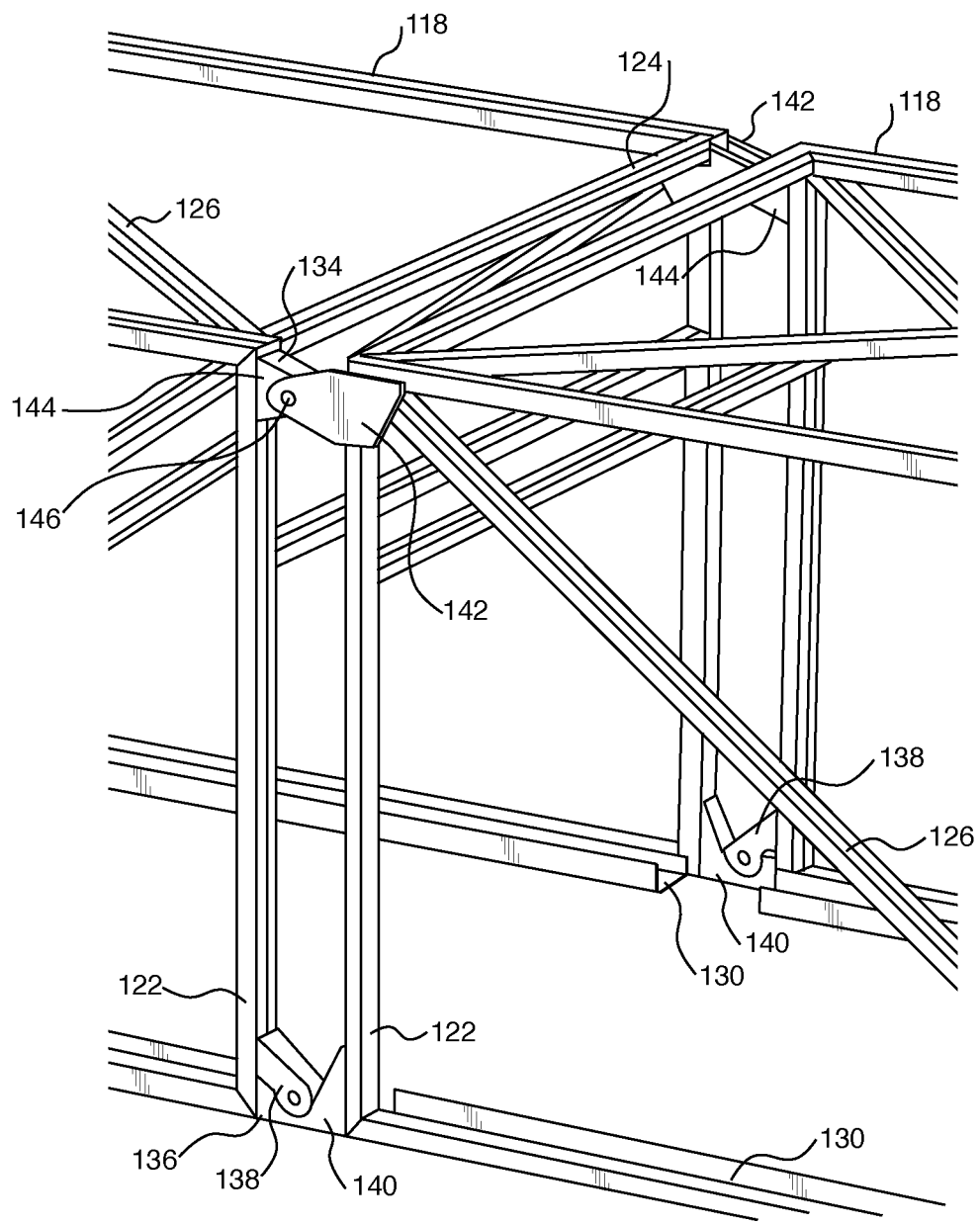
FIG. 7 is a closer view of the connectors between the modules of FIG. 6.

The truss 102 is suspended at each end from one of the two support frames 106, as shown in FIGS. 6 and 10. Referring to FIGS. 5-7, truss 102 may, in various aspects, be constructed of upper and lower lateral beams 120, rectangular or square frame members having upper cross-bars 124 and forward and backward upright bars 122, and diagonal bars 126. Upper lateral beams 120 may be welded to support frame 106 or connected by any suitable fastener, such as bolts or screws. Stiffeners 132 may be mounted at joints 128 between the beam 120 and frame members 124, 122, and 126.

Referring to FIG. 7, the truss modules 118 may be described herein as having a leading or forward end and a trailing or backwards end, wherein the leading and trailing ends of modules 118 may be structured to have formed therein or attached thereto features for connecting to each other to thereby connect adjacent modules 118. In various embodiments, the truss modules 118 may be joined by first connectors 136 comprised, for example, of a lower grooved member 140 attached on one long side of truss 102 to a lower edge of the upright bar 122 of the leading end of module 118 and a cylinder-like member 138 attached on the same side of truss 102 at a lower edge of the upright bar 122 of the trailing end of the adjacent module 118. Cylinder members 138 rests in the groove of the grooved member 140. A ramped surface on grooved member 140 allows movement of cylinder member 138 as the adjacent modules are connected. The opposite long side of truss 102 may, as shown in FIG. 7, have the grooved member 140 and cylinder member 138 reversed so that the cylinder member 138 is on the leading end and the grooved member 140 is on the trailing end. Alternatively, both types of connector members may be on the same leading or trailing end. Second connectors 134 may, for example, be positioned along the upper end of the upright bars 122 of the module 118 and in various aspects, comprise an upper pin joint having a forked member 142 attached to an upper edge of the leading end (and on the opposite long side of truss 102, to the trailing end) of the upright bars 122 and an eye member 144 attached at an upper edge of the trailing end (and on the opposite long side of truss 102, to the leading end) of the upright bars 122 of the adjacent module 118. Eye member 144 fits within the opposing faces of the forked member 142. A pin 146 connects the eye member 144 to the faces of the forked member 142 to lock the leading and trailing ends of the adjacent modules 118 together. Alternatively, both types of connector members may be on the same leading or trailing end.

The pin 146 through the pin joint constrains motion in the plane of the pin on the top corner of the module 118. To assemble adjacent modules 118, the cylinder 138 rotates in the groove 140 until the pin holes in the pin joint (142, 144) line up for insertion of pin 146. The cylinder 138, grooved member 140, eye member 144, and forked member 142 may be welded at their respective positions to the upright frame bars 122 on opposing ends of adjacent modules 118, or securely connected by any suitable known means, such as bolts or an equivalent fastener.

In various aspects, rails 130 run along the inside of the lower lateral beams 120 of each side of a frame member (e.g., formed by bars 122, 124, 126). The rails 130 may be welded to lower lateral beams 120 or connected with suitably strong fasteners, such as bolts or screws. Alternatively, rails 130 may be formed as an integral part of the lower beams 120 during manufacture as L shaped beams. The arrangement described provides a kinematic interface to line up the modules 118 of the gantry truss 102. Alternatively, the rails 130 may have diagonal cuts between adjacent rails on adjacent modules 118 so that the wheels 212 of the tram subsystem 200 can ride smoothly across the gantry modules 118 and will not bump at the end edges of each module. Those skilled in the art will appreciate that alternative wheel and rail arrangements may be employed.

Figure 8:
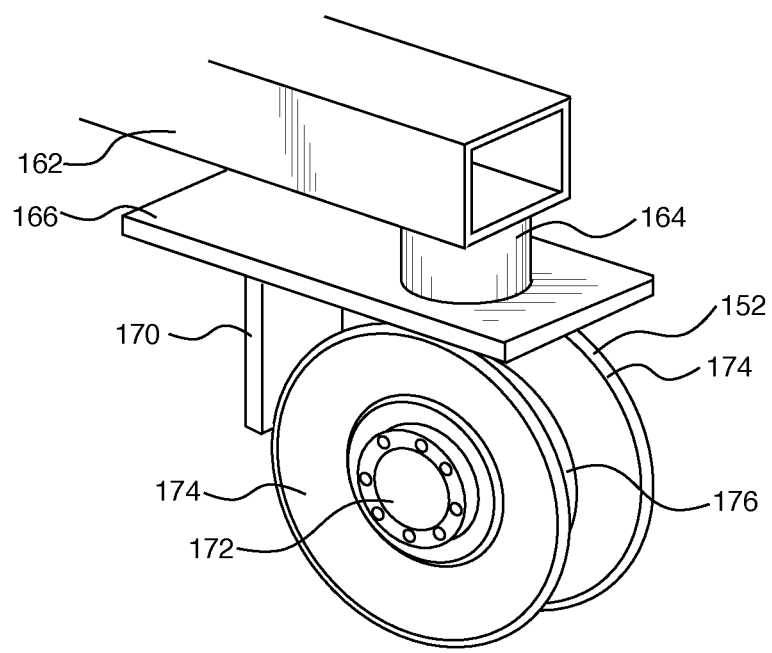
FIG. 8 is a view of an idler wheel of the gantry subassembly of the transport and placement apparatus of FIG. 1.

Referring to FIGS. 8-10, each leg 104 of the gantry subsystem 100 rests on, and is rigidly connected to a cross-brace 162. Extending down from the underside of the cross-brace 162 are rotational effectors, such as swivel axis posts 164, which are attached to a top plate 166. The swivel axis posts rotate in clock-wise and counter-clockwise directions to allow the wheels 150 and 152 to rotate relative to the legs 104 so as to adjust position of the wheels 150, 152 to follow the curvature of the screed rail 58 as the wheels move along the rails. Extending down from each top plate 166 is a side plate 168. An axle 172 extends perpendicularly from the side plate 168 under and generally parallel to the top plate 166.

A gear driven wheel 150 is mounted on at least one axle on each side of the truss 102, and may be positioned on either the leading end or the trailing end. The gantry subsystem 100 may travel both forward and backwards along the first path, so the position of leading and trailing ends will change depending on the direction of travel. The driven wheel 150 is in various aspects, structured like the wheel of a train, having at least one and in various aspects, two flanges 174 on each side of the cylindrical or conical wheel 176, which is configured to engage the screed rail 58 on the edges of the work site 12. The cylinder may therefore, be concave in cross-section to seat properly and with minimal friction on the cylindrical shape of the screed rail. If the screed rail 58 has a rectangular or squared profile, then the profile of cylinder on the wheel 176 will be similarly shaped to ensure a smooth rolling engagement as the gantry moves along the screed rail.

The driven wheel 150 includes a gear 178 on one side of a flange 174 operatively mounted on the axle 172. The teeth of gear 178 engage the teeth of a driven gear 182 which in turn engage the teeth of drive gear 180. Drive gear 180 is mounted on a drive rod 186 driven by motor 184. Motor 184 may be an electric motor, a gas powered motor, or, in certain aspects, may be a hydraulic motor. Two quadrature encoders are positioned on each side of the truss 102, one on each idler wheel 152 and one on each drive wheel 150 for feedback to one of the gantry computers 190 or a tram computer, described below.

A power source is provided. The power source may be a generator 148, such as a diesel electric generator, a gasoline, natural gas, or battery powered generator. The power source may be hydraulic. The generator 148 may, for example, be used to provide the power output required by the gantry drive motors 184 and the tram drive motors in addition to the power required by other gantry axis electronics. Generator 148 may provide the power necessary for the entire apparatus 10. In various aspects, the drive system may typically operate on 96V DC power to drive the motors 184 (one on each drive wheel) at a high rpm and maintain high electrical efficiency. Motors 184 may be any suitable motor, such as AC motors or hydraulic motors when a hydraulic power plant is used. Suitable electric generators include, without limitation, off-the-shelf 2 kW class AC generators and off-the-shelf marine grade DC generators.

In various aspects, generator 148, as shown in FIG. 10, may be electrically connected to an electric power source in the electronics box 160. Referring to FIGS. 8, 9, and 10, the rotation of the drive rod 186 by motor 184 is translated by gears 180, 182 and 178 into forward or backward motion of the drive wheel 150, and through axle 172's connection through plates 168 and 166 to swivel axis posts 164, cross-bar 162, and legs 104 to support frame 106 and truss 102, thereby moving the gantry subsystem 100 along the length of the screed rail 58 on the first path. The wheels may be made of steel or another suitably strong and weather tolerant material. A safety bumper (not shown), made for example, of rubber, may be added to block access to the drive assembly components during operation.

An additional idler or follower wheel 152 is, in various aspects, positioned generally under one of the legs 104 on each side of the truss 102 in those embodiments where there is only one driven wheel per side. As shown in FIGS. 8 and 10, idler wheel 152 is structured in the same manner as driven wheel 150 except that it has no gears and is not connected to a motor. Idler wheel 152 includes at least one and preferably two flanges 174 surrounding the wheel 176 whose shape, like the shape of drive wheel 152, will be configured to smoothly engage with as little friction as possible, the screed rail 58. Idler wheel 152 is operatively connected to one of the legs 104 on each side of truss 102 by its connection through axle 172 to side plate 168 which extends downwardly from top plate 166 and through swivel axis post 164 to cross-bar 162 on which the legs 104 are mounted. Idler wheel 152 may be equipped with an encoder (not shown) to measure drive wheel slip along the rails. In addition, rail curvature sensors (not shown) may be integrated into the swivel axis pivot posts 164 mounting the drive wheel and the idler wheel to the legs 104. An end plate 170 or mud flap may extend from top plate 166 on one or both of the leading or trailing ends of idler and drive wheels 152, 150 to guard the wheel components from debris during operation.

The gantry electronics comprises one or more electronics housings or boxes 160 mounted for example, on support frame 106. The electronics box 160 may house a central processor unit (e.g., a computer 190) acting as slave to the tram axis subassembly 200 tram computer, described more fully below, drive axis motion controllers 192, gantry side safety watchdog timer (not shown), power relay 194, sensor interface electronics 196, actuator interface relays (not shown), and power conversion electronics 195. The gantry computer 190 commands the gantry axis motion controllers 192 and the remote starting of the power generator. The gantry computer 190 may also log safety video from incident cameras (not shown), process rail curvature sensor 164 inputs, and process safety proximity sensor inputs (not shown). All of the electronics components for the gantry electronics are well known, commercially available components and need not be described in detail herein. Those skilled in the art know or can readily ascertain their functions and structures from the literature.

In various aspects, safety features may be included in the apparatus 10. For example, attached to the legs 104 and electronics box or boxes 160, there may be robot status warning lights (e.g., stack lights) and manual emergency stop buttons (not shown). In addition, optional low resolution video cameras (not shown) capable of recording video of the area near the legs 104 to capture a record of any safety related incidents may be provided. Proximity sensors (not shown) may also be provided to be able to trigger a motion control fault when an object or obstacle approaches a gantry subassembly leg 104 from the direction of motion.

Electrical wiring between the gantry subsystem 100 power source, electronic box or boxes 160, sensors, and motion controllers may be in pre-wired sections of cable in each section of the gantry And connected end to end as the truss sections are connected. Alternatively, signals between the gantry subsystem slave computer 190 and the tram subassembly master computer (housed in power box or electronics box 204 or 205) may be carried via a wireless link, such as a radio frequency (RF) link or an optical link. In another alternative arrangement, the electronic communication may be carried via a dynamic, self-retracting cable reel.

The Tram Subassembly

The tram subassembly 200, shown in FIGS. 10-15, may include a rigid frame or tram 202 that is comprised of upper frame bars 216, side frame bars 218 and lower frame bars 220, which may be welded to each other, or otherwise connected by any suitable means, to form a box-like structure. However, any suitable shape that allows carriage of the subassembly components will suffice. In the structure shown, brace bars 238 may additionally be provided to add structural stability to tram 202.

Tram subassembly 200 includes a drive system for moving the tram 202 along the second path, laterally across the work site 12, along the X axis. The tram drive system, as shown in FIGS. 11-14, includes a drive motor 226 mounted to the tram 202 or to a tram frame member such as another brace bar 238 (not shown), drive rod 232 extending from motor 226, a drive gear 228, and a driven gear 230. Driven gear 230 is mounted on drive wheel axle 224. In various aspects, a gear chain 278 operatively connects drive gear 228 to driven gear 230. Rotation of drive rod 232 rotates drive gear 228 which is transferred to driven gear 230 by chain 278, and to axle 224.

Side members 236 are positioned on each side of tram 202, mounted for example, on frame bars 218 or 220. Each end of drive axle 224 extends through an appropriately sized hole in side members 236 to connect to a drive wheel 212 through sleeve 264.

Figure 16:
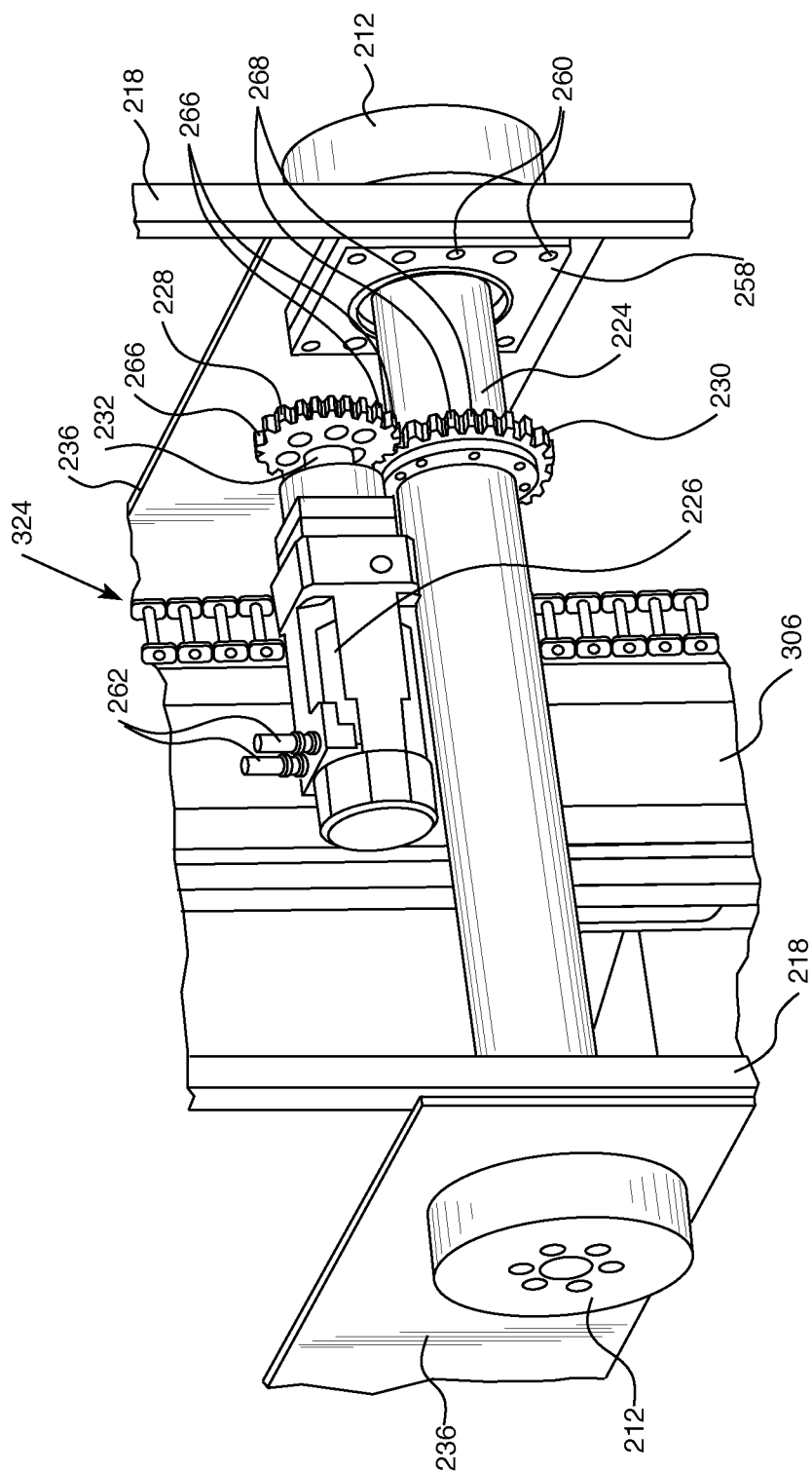
FIG. 16 is a partial view of an alternative gear arrangement for the drive system for the tram subassembly, showing the drive wheels, drive motor, and gears for effecting transverse movement of the tram subassembly across the truss portion of the gantry subassembly.

In various aspects, as shown in FIG. 16, the drive gear 228 and driven gear 230 of the tram drive system may be in direct contact and not connected by gear chain 278. The teeth 266 of drive gear 228 mesh with the teeth 268 of driven gear 230. Motion of drive gear 228 moves driven gear 230, which in turn, causes axle 224 to rotate, thereby turning drive wheels 212. Electrical wires 262 (shown in part in FIG. 16 for ease of illustration) are electrically connected to a tram power source, which may in various aspects be a second generator, such as a diesel electric generator, a gasoline, natural gas, or battery powered generator. Power from the generator powers the drive motor 226, turning drive gear 228 via drive rod 232. Power from the generator powers the drive motor 226, turning drive gear 228 via drive rod 232. In various aspects, the power source may be hydraulic.

Figure 11:
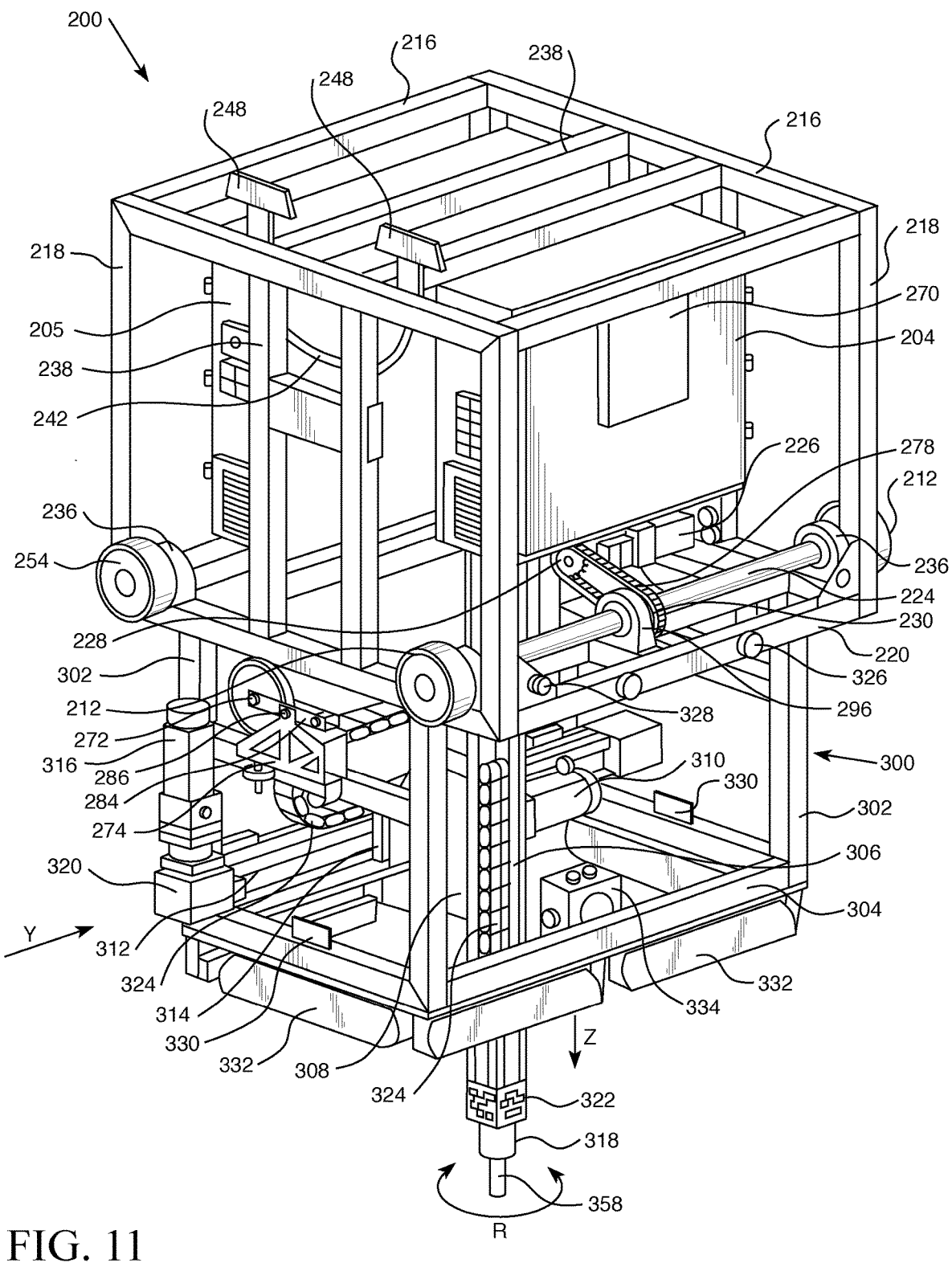
FIG. 11 is perspective view of an embodiment of the tram and actuator subassemblies of the apparatus of FIG. 1.
Figure 12:
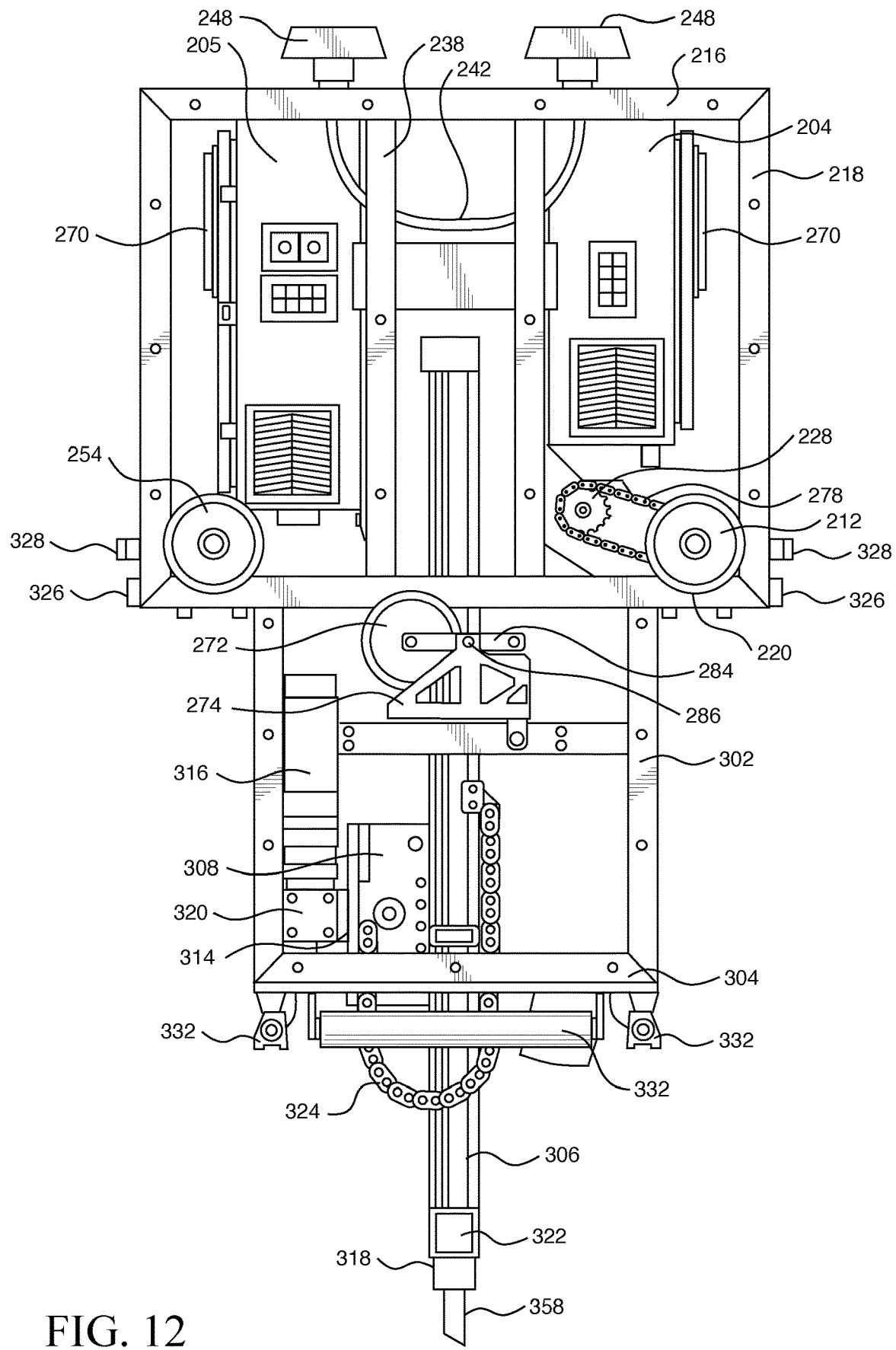
FIG. 12 is a side view of the tram and actuator subassemblies of FIG. 11.
Figure 13:
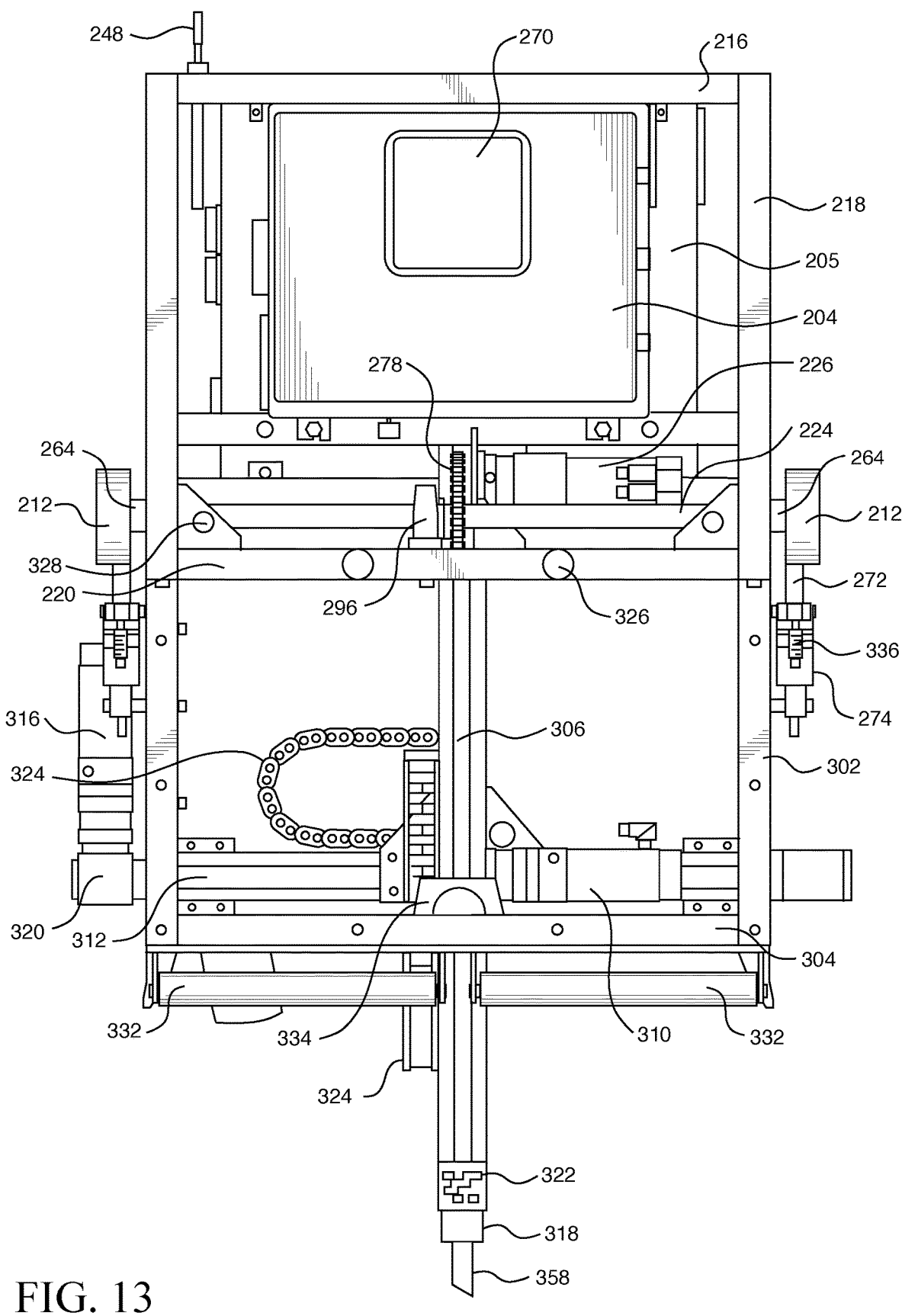
FIG. 13 is a front view of one side of the tram and actuator subassemblies of FIG. 11.
Figure 14:
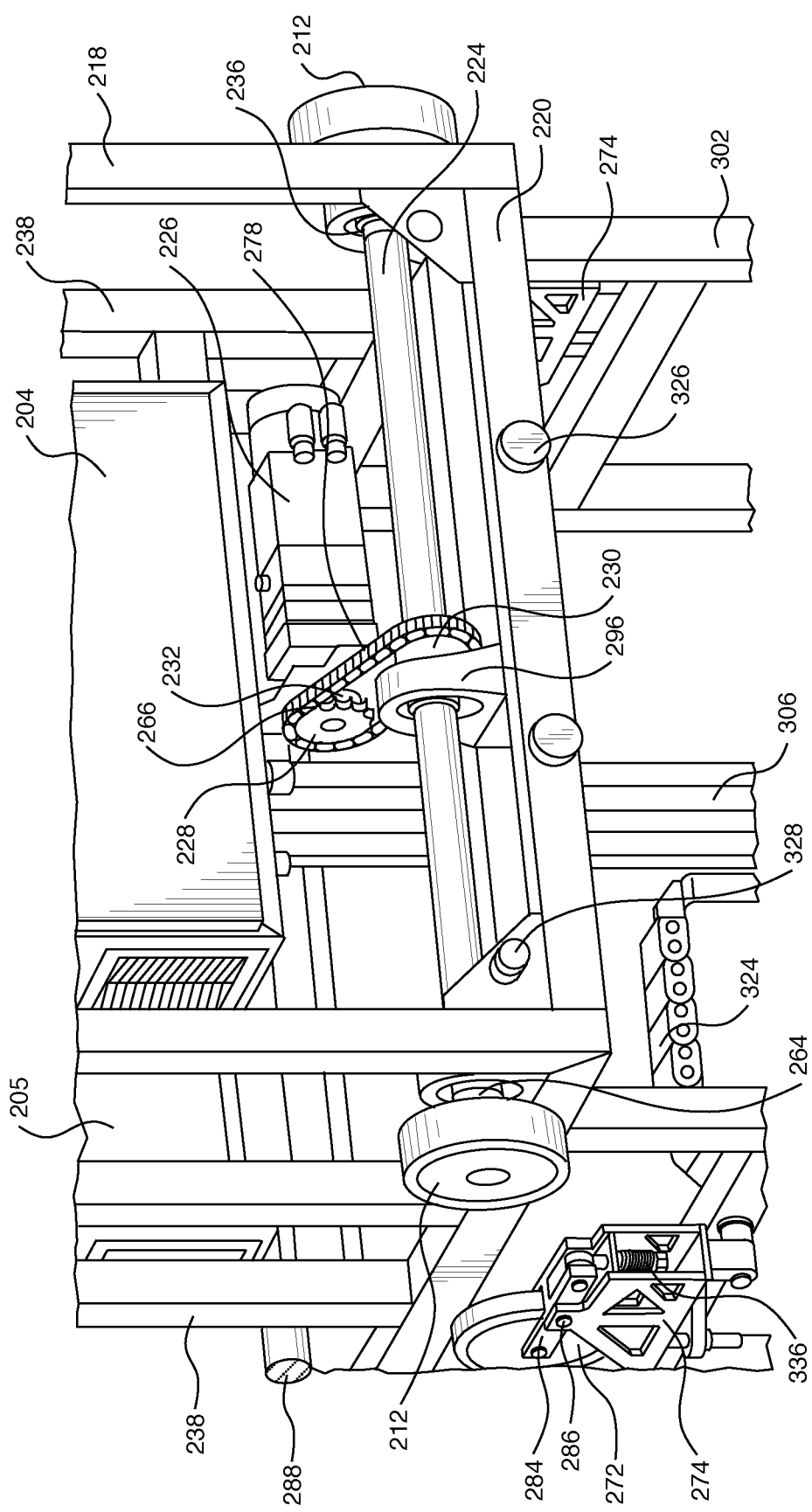
FIG. 14 is a partial perspective view of an embodiment of the gear arrangement for the drive system for the tram subassembly, showing the drive wheels, drive motor, and gears for effecting transverse movement of the tram subassembly across the truss portion of the gantry subassembly.

Alternatively, power may be delivered to the tram 202 from the gantry main power source through a sliding conductors 248, shown in FIGS. 11-13. Sliding conductors 248 extend upwardly from tram 202 from bar 216 and slide along rails formed in or on truss upper lateral beams 120 and pick up power from the upper beam rails. The power is transferred by wire 242 to drive system components in power box 205.

The tram subassembly drive wheels 212 are preferably made of steel and are positioned to ride on the truss 102 rails 130 on the lower lateral bars 120 of gantry subassembly 100. The rails 130 may also be made of steel to maximize friction and minimize both slip and racking forces. In various aspects, as shown in FIGS. 10-15, two tram support wheels 254 may be mounted on connecting rod 288 through sleeves 264. Support wheels 254 are follower wheels, similar to gantry subassembly wheels 152. One support wheel 254 is positioned on each side of tram 202 and together with drive wheels 212, the support wheels 254 support the tram subassembly 200 components on rails 130 as the tram 202 and its components move laterally across the truss 102, along the second X-axis path of motion, powered by the drive system 206. In various aspects, the support wheels 254 may be encoded to serve as idler feedback, tracking any accumulated slip or racking over time to enable active software correction if needed.

A tension wheel 272 may also be provided, one being positioned on each side of tram 202 to align with the underside of truss rails 130. Tension wheel 272 is connected at its center to one end of a pivot bar 284. Pivot bar 284 is mounted at pivot pin 286 to a bracket 274, which in turn is mounted to a section of the frame for actuation subassembly 300. A spring 336 or other biasing member is housed in each bracket 274 and contacts the top of bracket 274 to bias wheel 272 in contact with rail 130. The spring and pivot components allow tension wheels 272 to self-adjust as the wheels 272 travel along the underside of rails 130. Tension wheels 272 prevents tram 202 from skipping the rails 130.

The tram electronics may include one or more electronics housings or boxes 204 and 205 containing the electronics and processors necessary for operation of apparatus 10. In the embodiment of tram 202 shown, boxes 204 and 205 are spaced from each other to provide room for movement of the Z axis actuator 306, to be described in more detail below, to freely move along a Y axis of tram 202.

In various aspects, box 204 may include conventional components such as a central processor unit or tram computer acting as master to the gantry subassembly computer 190 and radio or other receivers and communication components, and power conversion electronics for the tram computer and sensors, an Ethernet switch, and sensor interface electronics. Box 205 may contain drive component electronics, power conversion electronics for the gripper subassembly, power conversion electronics for the motor drive power supplies, a power distribution bus bar, and relays for timers and actuator interfaces. Antennas 270 are mounted on each of electronics and power boxes 204 and 205. In various aspects, there may be one drive power supply for each axis of motion. The power conversion electronics take in alternating current (AC) and convert it to direct current (DC), which is fed to motion control amplifiers for motion control and relay of smaller power supplies to apply a higher current, as needed. For example, motion control amplifiers may read encoder feedback from drive wheel motor and idler wheel encoders to determine the distance traveled by the tram 202 and the power needed. The current to the motor can be adjusted to achieve either a desired speed or potential output. The motion control amplifiers determine how much current the motor needs and adjusts the current output accordingly in response to input from idler and drive wheel motor encoders and Hall-effect sensors. Motion control amplifiers are commercially available and any suitable amplifier will suffice. The various electronics and power components identified above are commercially available. Although not shown, those skilled in the art will understand the various electronics and power components identified herein, as well as others, that may be used to power the apparatus 10 and will understand further that the components may be arranged in boxes 204 and 205 in any suitable manner for efficient operation or ease of construction and may be housed in a single electronics box.

Bumper pads 326 are positioned on each end of tram 202 on lower frame bar 220 to protect tram 202 and its components in the event that tram 202 hits the end of the truss 102. Additional safety is provided by proximity sensors 328 or travel limit switches on opposing ends of tram 202. Proximity sensors 328 may, for example, be mounted on brackets at the corners of frame bars 220 and 218. The sensors sense when tram 202 is close to the end of truss 102 and send a signal to tram electronics box 204 to stop further lateral movement of tram 202.

The tram subsystem 200 further includes perception sensors. In various aspects, the perception sensor may be any suitable three dimensional perception sensor that utilizes stereo vision, laser scanning, laser time-of-flight, or any other mean of generating data to perceive and communicate a scene in three dimensions. The perception sensor may include, for example, a pair of stereo vision cameras 342. For purposes of this detailed description, the perception sensors will be described and shown as stereo vision cameras 342, but those skilled in the art will appreciate that other three dimensional sensors may be substituted.

In various aspects, there may be at least one and preferably two or more stereo vision cameras 342, such as MultiSense S7 cameras. An exemplary stereo camera system is disclosed in pending U.S. published Patent Application, US2016/0227193.

Figure 34:
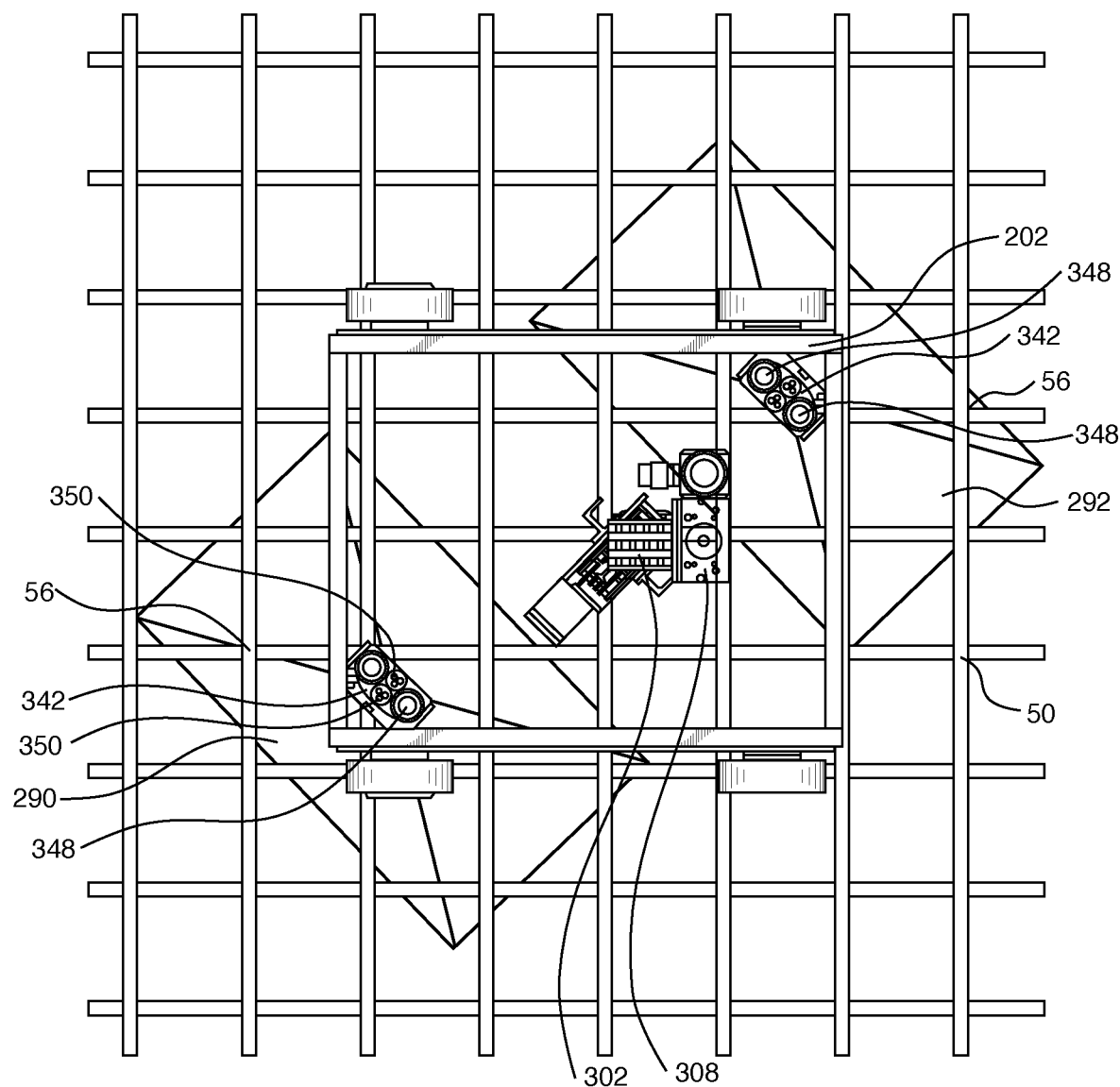
FIG. 34 is a top plan view of a non-overlapping pattern of the field of view of the stereo cameras of FIG. 33.

Referring to FIG. 34, each camera 342 is shown as having two imagers with fixed focal length lenses 348 and lights 350, each light preferably having multiple light sources, such as bulbs or light emitting diodes (LED), to provide light across a wide area. Additionally or alternatively, wide area lighting may be mounted on the gantry subassembly 100 or the tram subassembly 200. The perception sensor power is received from one of the power conversion electronics.

Figure 33:
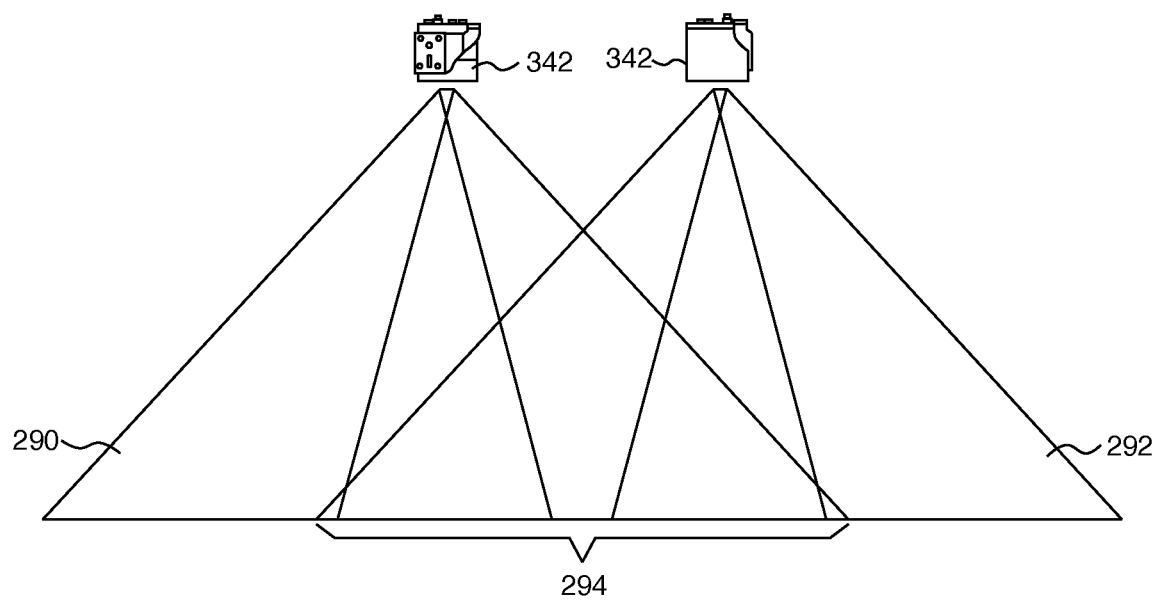
FIG. 33 is a view of an overlapping pattern of the field of view of an embodiment of a stereo camera which may be used with the apparatus of FIG. 1.

The perception system may also include the ability to sense color. The addition of color sensing enables the software objective to identify different types of rebar (for example, green or blue epoxied rebar 52, 54). As shown in FIGS. 33-34, the addition of a second perception sensor, such as a second stereo camera 342, expands the fields of view 290 and 292 and in various aspects as shown in FIG. 33, may allow for an overlapping field 294 for enhancing rebar identification symmetrically. This arrangement enables viewing of each target site of operation for the gripper assembly immediately before use as the tram 202 travels in either lateral direction back and forth across the width of the work site 12. The use of two cameras 342 increases the fields of view 290 and 292, increases location accuracy and decreases sensitivity to rebar motion during operation. Having more than one camera 342 increases system reliability through lower risk perception and path planning. In addition, intensity variable lighting may be added to the tram 202 to enable optional night time operation.

The Actuation Subassembly

The tram 202 carries the actuation subassembly 300. The actuation subassembly 300, as shown for example in FIGS. 11-13 and 15, may include a Z axis motion actuator, which may be in the form of a linear motion actuator, a delta actuator, or a parallel kinematic actuator. Exemplary linear motion actuators include those based on belt drive systems, hydraulic cylinders, or gear mechanisms well known in the art. Those skilled in the art will appreciate that any suitable known linear actuator may be used to guide the motion of the actuator along the third path, generally along a Z axis, shown in the figures as being substantially vertical in orientation. In various aspects, the actuator subassembly 300 may also be able to travel along the Y axis relative to tram 202. This provides a finer resolution for positioning the grippers on the Y axis of the work site 12 than can be achieved with moving along the gantry Y axis alone. The gripper arm and grippers may also rotate about the Z axis in a rotational motion, designated R in FIG. 11.

Actuator subassembly 300 includes a frame comprised of vertical frame members 302 and lower horizontal frame members 304. The tops of vertical frame members 302 may be welded to frame members 220 of tram 202, or connected by any suitable fastener or other connector to rigidly join the actuation subassembly frame to tram 202. Linear movement along the Z axis may be achieved by any suitable known means, such as a belt drive actuator with a motor and gear box coupled to a pulley, or a ball and screw linear actuator. As shown, a sliding rail member 306 is mounted to a fixed Z axis member 308. A Z axis motor 310 mounted on fixed Z axis member 308 powers movement of slide rail member 306 up and down along the third path, along the Z axis.

In various aspects, the actuator subassembly 300 may include a tram Y axis motion actuator. A fixed rail 312 is mounted on and spans two vertical frame members 302. A sliding plate 314 mounted on Z axis fixed member 308 is configured to slide in a complementary track on fixed rail 312. A Y axis motor 316 is mounted on one end of Y axis fixed rail 312 at an end cap 320. Motor 316 powers the Y axis motion of sliding plate 314 and fixed Z axis member 308 along rail 312. Because Z axis sliding rail 306 is connected to fixed member 308, movement of plate 314 and fixed member 308 along rail 312 back and forth on the tram Y axis moves Z axis rail 306 back and forth on the tram Y axis. The space between electronics boxes 204 and 205 in tram 202 provides free space for the Z axis rail to travel on the tram Y axis.

Rotational (Z Yaw) motion R (see FIG. 11) may in various aspects, be provided by a rotational motor 318 mounted on the lower end 322 of sliding rail 306. A post 358 may connect the gripper subassembly 400 to the lower end 322 of Z axis sliding rail 306. Alternatively, Z axis sliding rail 306 may have a cavity in the lower end 322 thereof for receiving a connector 358 to connect gripper subassembly 400 to actuator subassembly 300. In either configuration, as Z axis sliding rail 306 moves up and down on the Z axis or back and forth on the tram Y axis or as post or connector 358 is rotated about the Z axis, or any combination of those motions, the gripper arm 470 moves in the same direction. The lower end 322 of Z axis sliding rail 306 may include fiducial markers.

Lights 332 may be mounted on the lower frame bars 304 to provide focused light on the site where rebar is being placed. A distribution box 334 for housing wires for lights 332 is shown in FIGS. 11 and 13.

Figure 49:
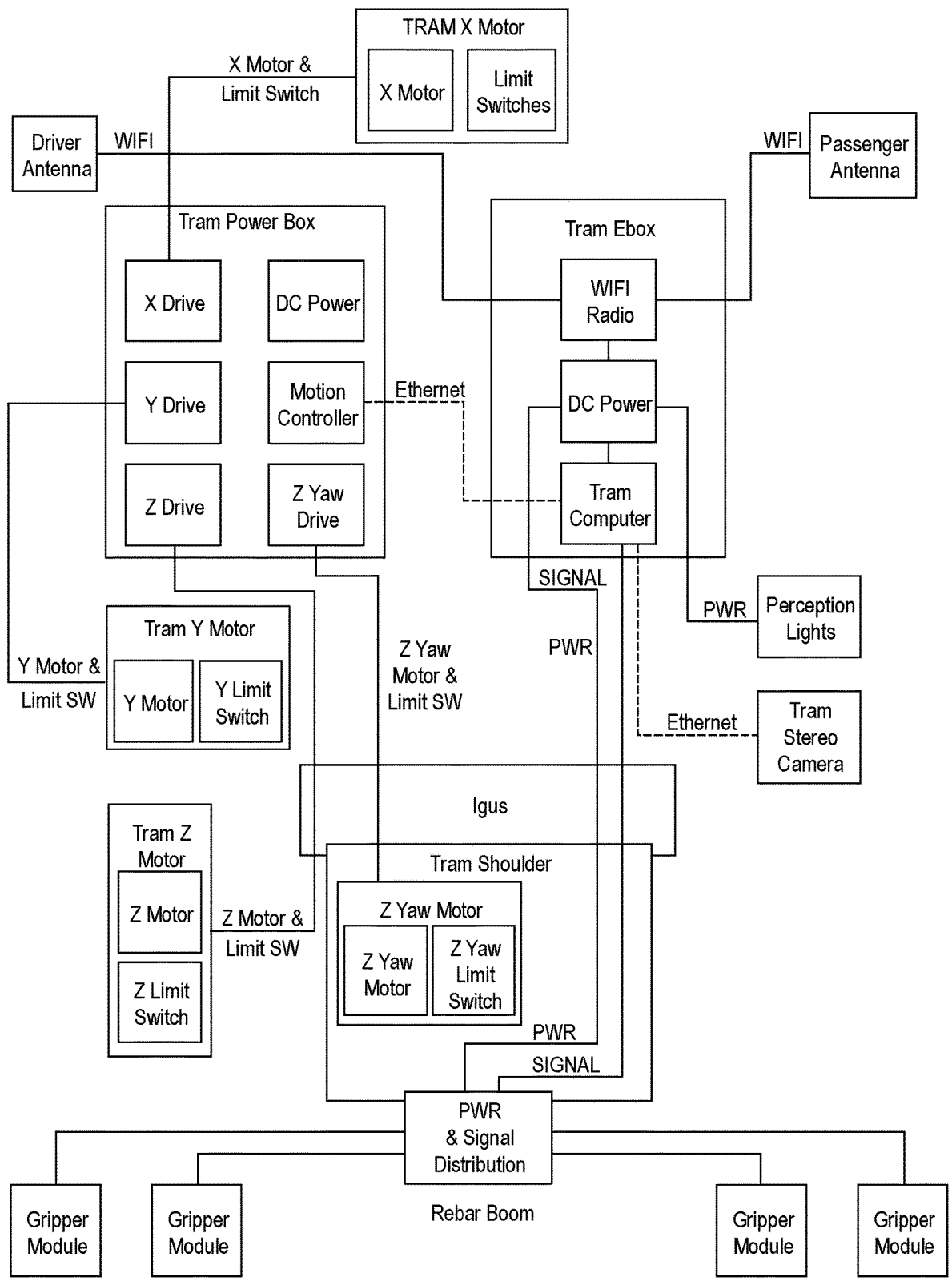
FIG. 49 is a block diagram of the exemplary features of an embodiment of the apparatus shown in FIG. 1.

An exemplary arrangement for connection of the power and communication sources to the various components of apparatus 10 is shown in the block diagram of FIG. 49. The tram subassembly processor or computer receives sensor data through, for example, Ethernet connections to the cameras 342 and encoders. The tram computer uses that sensor data to generate motion commands which are sent back to the motion controller, which coordinates actions between the gantry subassembly motor or motors 184, the tram subassembly motor or motors 226, and the actuation subassembly motor or motors 310, 316, 318 to effect movement in the gantry Y, Tram Y, X, Z, and Z Yaw paths, respectively, to appropriately position the apparatus 10. The tram computer also generates motion commands which are signaled to the gripper subassembly receiver, for example, by an Ethernet connection or by a controller area network (CAN) bus, or digital signal, to effect the unlocking of the solenoid 450.

The tram 202 includes hardware for communication with the gantry and/or a second tram 202. This may be accomplished with the Wi-Fi radio and antennas 270 as shown in FIG. 49 or through some other wired or wireless communications such as CAN. The tram computer directly communicates with the perception stereo camera and the motion controller via Ethernet. The motion controller communicates the motion commands to the individual axis drives for X, Y, Z, Y tram, and Z Yaw motor control. Power and control signals to the gripper modules are distributed from the electronics enclosures through cabling along the axis to the gripper arm. For example, in various aspects, power cables may be carried in cable way management guides 324.

Remote Controller

Figure 36:
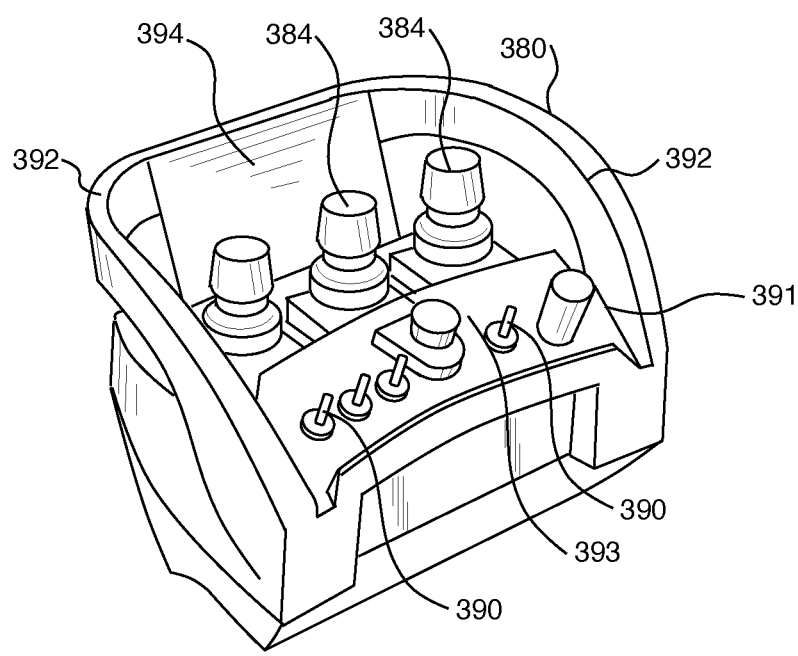
FIG. 36 shows an embodiment of a remote controller for use by an operator of a semi-autonomous transport and placement apparatus.

The on-site operator may control the apparatus 10 and the subassemblies 100, 200, 300, and 400 remotely using any suitable commercially available or specifically designed controller 380, such as a safety rated radio controller selected from a large market of outdoor, industrial and construction radio controllers. An exemplary controller 380 is shown in FIG. 36. The controller 380 includes hand grips 392 and multiple joy sticks 384 for controlling the gantry and tram subassembly motion and toggle switches 390 for targeted control of power to the end-effector and the tool. A screen 394 may be provided for display of data or other information relayed by the computer. The controller 380 may be used to trigger limited manual control of any of the subassemblies or to trigger automatic operation of the apparatus 10 through mode selection knob 391. The apparatus may be stopped quickly by activation of emergency stop button 393.

Figure 35:
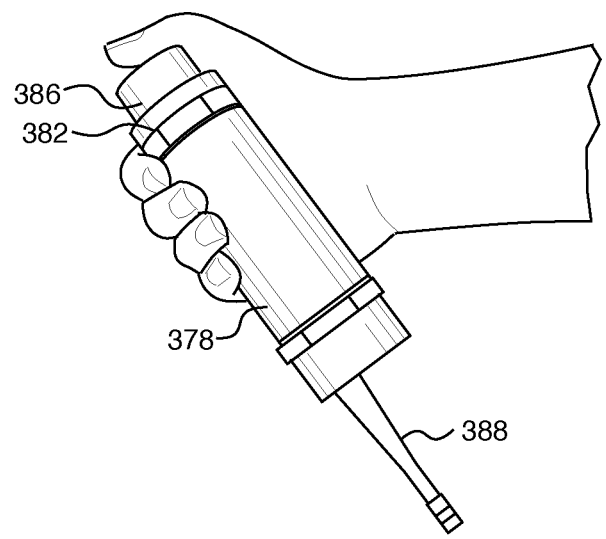
FIG. 35 shows an embodiment of an emergency stop remote controller for use by an operator of a semi-autonomous transport and placement apparatus.

The controller 380 may be non-tethered (i.e. wireless) and battery operated. The controller 380 may include a remote emergency-stop function, manual robot mode control (i.e. manual or autonomous mode), manual axes jog control (i.e. 3-axis joysticks, not shown), and may have the ability to display human readable status and other messages to facilitate operations. Additionally, a separate remote emergency stop controller 382, as shown in FIG. 35, may be manned by a secondary worker on the work site 12, such as an operator or supervisor. Emergency stop controller 382 may include an antenna 388, a single emergency stop push button 386, and combination body and hand grip 378.

Figure 4:
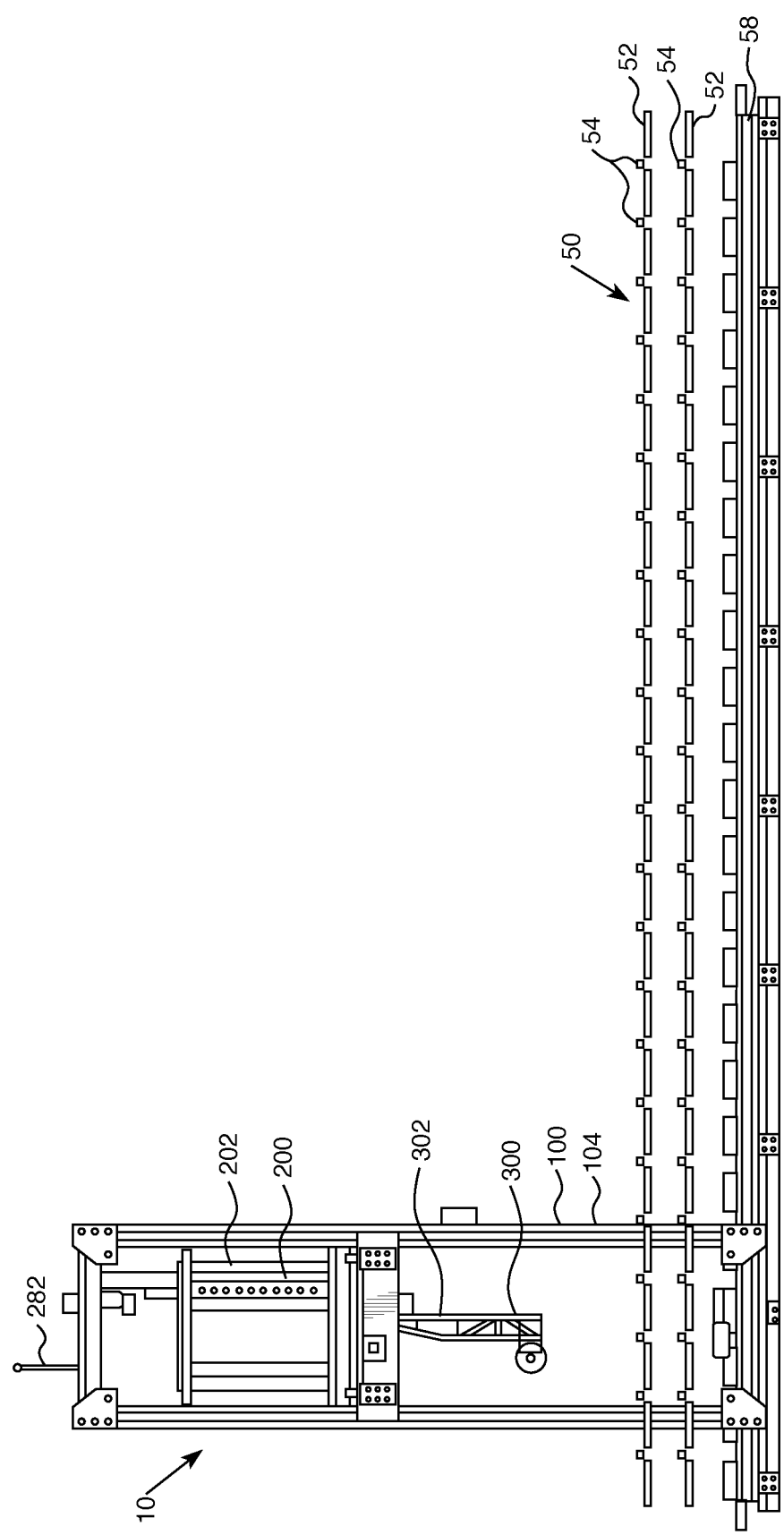
FIG. 4 is a schematic side elevation view of the gantry and tram subassemblies of an embodiment of a semi-autonomous apparatus showing a rebar mat.

An antenna 282 (see for example, FIG. 4) on one of the electronics boxes 160 or 204 sends and receives signals to and from controllers 380 and 382. The antenna 282 is wired into one or both the slave computer 190 and tram computer to read and react to manual control signals from controller 380 and motion stop signals from the controller 382, and to send status data back to the controller 380 for display on screen 394 in human readable form.

Software Systems

Figure 45:
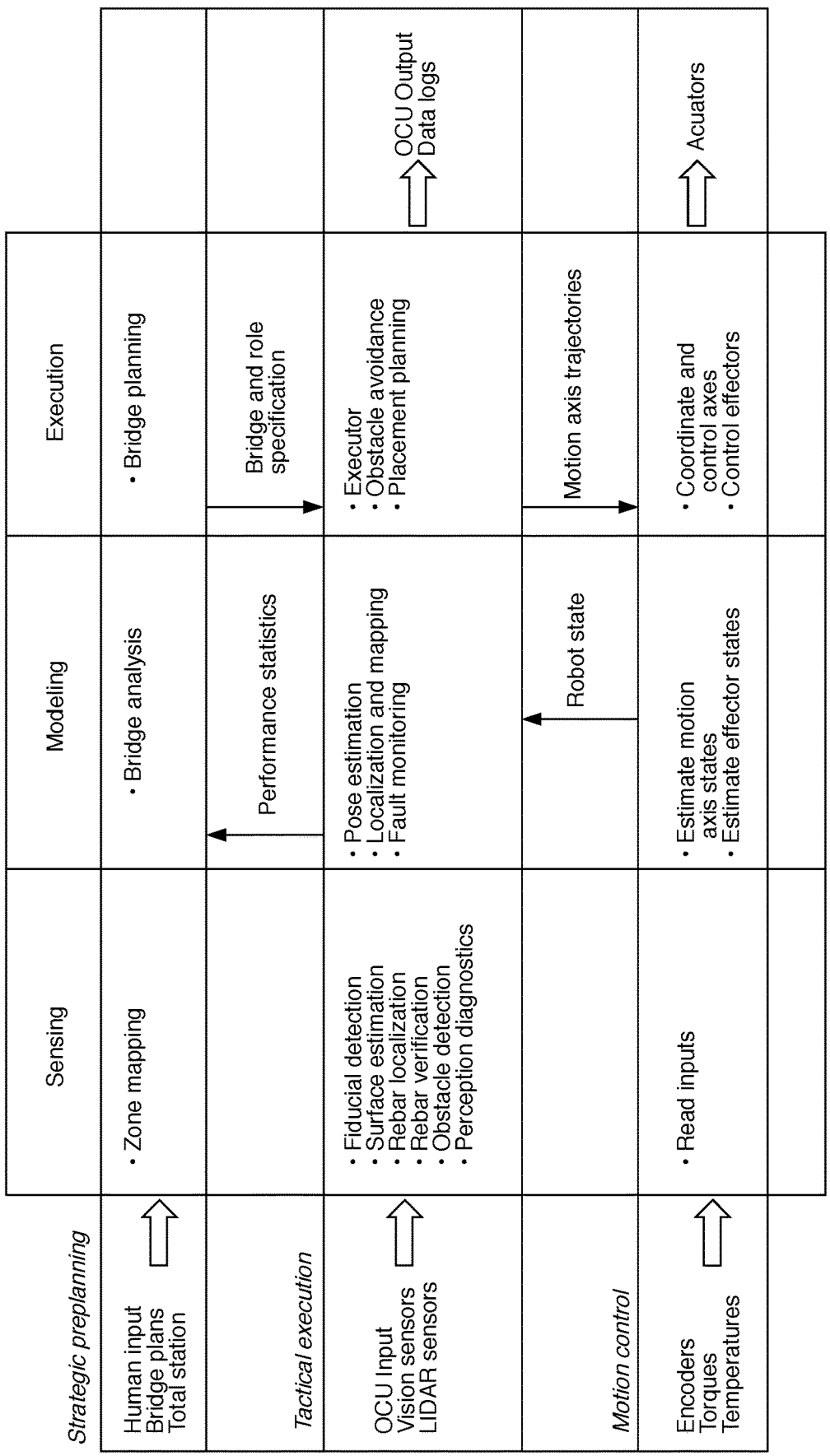
FIG. 45 is a flow chart showing the software component diagram for an embodiment of the semi-autonomous transport and placement apparatus.

The apparatus 10 in various aspects may include software systems for operational control of subassembly functions. Referring to FIG. 45, the software components diagram is presented in a 3×3 grid. Each layer of the grid represents a difference in time scales, and in various aspects, even a difference in platform. Each layer can have external inputs (such as sensors, human input, or databases) and outputs (such as actuators, human readable displays, or data logs). The strategic planning layer is largely off-line, for example, WINDOWS® based, and involves turning the human readable bridge plans and surveyed measurements of fiducial markers 70 on the work site 12 into a plan the software and apparatus 10 components can handle, with breakdowns of the plans for each "role" in the performance sequence (such as carrier, placer, assistant placer, etc.) The tactical execution layer has most of the robotic components, going through a sense, model, and action cycle. Components in this layer run typically around 10 Hz. The motion control layer handles most of the high bandwidth actuator control and mostly runs on dedicated hard real-time hardware at between 50 Hz and 1000 Hz and actually moves the apparatus 10. Since the different layers often represent different computing platforms, the information passed between the layers is typically limited and structured. For example, the tactical layer may use ROS running on a LINUX operating system and the motion control layer may be a Trio motor controller using predefined networks or interfaces for communication between the different operating systems and/or computer languages of the different layers. There are, however, no designed-in constraints on how information flows within a layer. Those skilled in software design will appreciate that any suitable method of information flow within and between layers will suffice.

In addition, the system components are represented vertically in the diagram into sensing, modeling, and execution functions. This classification is purely informational, and does not impose any restrictions or structure on the components in a layer. The "typical" data flow is from left to right, from sensing to execution. In reality, anything in a layer has the potential to communicate with anything else. There are instances that require a "back" flow of information, i.e., when sensing is cued or parameterized by the current model of the work site or the current action being executed. In addition, system modules can cross categories, e.g., a mapping module that directly processes and integrates raw sensor input while building a global model of the world.

FIG. 45 illustrates, from left to right, the information input into the system ending with the output from the system. FIG. 45 also illustrates the concepts embodied in each function to be performed by the system listed the real world movements of the apparatus components summarized at the bottom of the grid. Initially, human input is needed, for example, to develop the construction plan based on known engineering requirements for road, bridge deck or other surface construction (strategic preplanning), survey the work site 12 to place and/or measure the distance between markers (such as the fiducial markers 70 shown in FIG. 43) (sensing), correlate the measurements with the construction plan (modeling), and input the plan into the apparatus 10 system software in any suitable known manner, such as with a USB drive or down-loading from another electronic source. The output of this layer is a set of strategic goals and role assignments for the various tactical components to fulfill in the operation of the apparatus 10 (execution). The strategic layer provides tools for the user to monitor the progress of the apparatus 10 (at a very low bandwidth) and allows the user to issue new, adjusted strategic plans in the face of unexpected issues in tactical execution of the plan.

Figure 43:
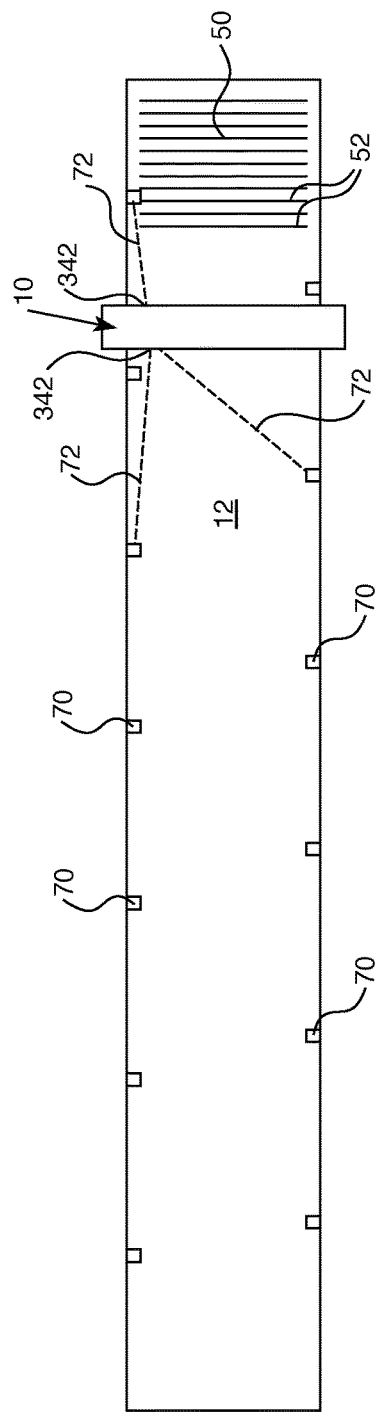
FIG. 43 schematically illustrates an exemplary placement of fiducial markers along the length of opposing sides of a work site and the relative field of view of cameras on an embodiment of the apparatus of FIG. 1.

In the next level, designated "tactical execution," the construction plan, together with data about the structure and expected positions and orientation (i.e., pose) of the components of the apparatus 10 relative to each other has been input into the system and delivered to the software system. In various aspects, there may be additional input from the apparatus sensors, such as human operator control unit input, input from visual sensors and input from LIDAR sensors. LIDAR sensors are commercially available sensors that use light in the form of a pulsed laser to measure variable distances. Combined with other data, the pulses generate precise, three-dimensional information about surface characteristics. The sensing function may, for example, use the cameras 342 or other image data sources to find the fiducial markers 70 positioned at the work site 12 and on portions of the apparatus components, such as the bottom 322 of the sliding rail 306, and use the data for surface estimation, to locate and verify rebar positions, to detect obstacles and for perception diagnostics. The sensing data may be used for modeling functions such as localization and mapping, estimating the pose of the various components of the apparatus 10, such as the grippers 402 and gripper arms 470, tram 202 and gantry truss 102 relative to the work site 12, and fault monitoring to detect breakage or obstacles observed that differ from what was expected in view of the saved structure of the components and site plan. For example, perception sensors, such as stereo cameras 342 described above, perceive the rebar mat 50 (or other work site of interest) and the fiducial markers 70 to calculate location. As illustrated in FIG. 43, the cameras may receive location signals 72 from the markers 70 and communicate the image data from the cameras to the master computer to detect the magazine 14, the rebar segments 52, 54 within the magazine, the target mat 50, localize where the rebar is to be placed to maintain the desired spacing.

The behavior to be executed at any given time, such as picking up a length of rebar and transporting it to a specific location for placement in the formation of the rebar mat 50 is coordinated by an executor module. The executor module combines the sensed model of the work site and the system's sensed relationship to the work site with the strategic intentions of the plan to tactically decide exactly what the system should be doing at any particular point in time, all while maintaining safe system operation under the close supervision of a human operator interacting with the system in the field with an operator control unit (OCU). The executor module uses a variety of specialized planning components to accomplish the strategic goals. For example, a placement planning module helps the executor module determine what type of rebar is required for the next placement, and determines the optimal place to put that given the real progress in the plan. In addition, an obstacle avoidance module may be included, which uses detailed 3D maps of the environment built up by the modeling components to determine if there are obstacles protruding above the rebar mat 50. The obstacle avoidance module may change the trajectory of a given motion for any of the components of the apparatus 10, or the system may stop progression of the apparatus 10 and request human intervention via the OCU when simply changing trajectory is calculated to be insufficient to avoid the object.

The system collects performance and progress statistics that can either be analyzed after the work is complete, or which could be fed back to a human supervisor to guide modifications of the strategic bridge plan to reflect changing conditions or priorities. In addition, more detailed data logs from the tactical execution layer may be stored for later analysis.

In the motion control layer of the system, encoders, such as those on gantry idler wheels 152 and carrier idler wheels 254 and on joints, torque sensors on the gripper arms 470 and gripper joints, and temperature sensors may be used to assist with motion control. The sensing function reads the data input from the sensors, and the modeling function combines the inputs, integrates and filters the data to calculate the state of movement of each component of the apparatus on any of the axes, X, Y and Z, Y tram and Z rotational, or deviations therefrom, and to estimate the position of the end-effector, such as grippers 402 at any given time during operation. The model so created is used to coordinate and control the axes of motion for all relevant components and to control the gripper subassembly 400. Signals are output to the relevant components to move to effect the steps needed to complete the construction plan.

A gantry steering module may be utilized to enable adjustment of the gantry leg 104 drive speeds to closely follow the immediate curvature of the screed rails 58. Each side of the gantry subassembly 100 may be independently driven. This may be directed by a rail following sensor (not shown but optionally positioned on the idler wheels 152), detecting the relative curvature of each rail 58. In addition, or in the alternative, cameras may be provided directed ahead of the gantry subassembly 100 to provide advance images of the curvature of the rails 58 or other marker. The advance image data is reported to a supervisor and coordinated with a plan generator module to adjust the motion control instructions through modules and to the drive motors 184 to effect different motions for each drive motor 184. The distance of travel for the drive wheel 150 on one side of truss 102 on the outside of the curve will be greater than the distance of travel for the drive wheel 150 on the other side of truss 102 on the inside of the curve. The software is written to recognize the difference between rebar lines and the rail lines to accurately identify and calculate the curvature of the rails.

Alternatively, a time-of-flight camera may be mounted on the legs 104 or a forward facing section of the truss 102 or support frame 106 for sending out laser pulses, receiving feedback and communicating the data to the supervisor for adjustment of the motion control instructions in the manner described above.

In another alternative embodiment, rail curvature may be observed using perception sensors. The sensors, such as stereo cameras 342, communicate images within their fields of view to the perception subsystem module which, in various aspects may use the algorithm discussed herein to identify lines and angles within the field of view and compare the images to the grid map data for the longitudinal rebar 52 lines. When moving at small increments, the changing curvature can be measured. The assumption may be made that the rebar follows the screed rail so the curvature of the longitudinal rebar lines will be close to the curvature of the screed rail 58. Those changes can be used to adjust the motion instructions from the motion control subsystem modules to the drive motors 184 and drive wheels 150 on the gantry legs 104. A global positioning system (GPS) unit may be employed to adjust for the gantry truss location relative to the rebar.

In use, the stereo camera pairs 342 each capture a synchronized pair of images, one pair covering 290 and one pair covering 292, and each sends the image data through a video processor which triangulates the data to build up a three dimensional (3-D) range image of the target site and its surroundings for each stereo pair, where each row and column element of the range image measures distance from the sensor to that point. The range images are processed for two main purposes: first, to extract the 3D positions and orientations of rebar segments to guide picking from the magazine and to guide proper spacing for placement, and second to build up an elevation map of the region in view of the cameras.

The rebar segment extraction may be made, for example, by taking the range images provided by the stereo cameras, applying an appropriately tuned edge filter to them, and then using a Hough transform line finding algorithm on the resulting edge image. The Hough transform is well known to those skilled in the art and is derived from work by Paul Hough (see U.S. Pat. No. 3,069,654), expanded to identify positions of arbitrary shapes (see Duda, R. O. and P. E. Hart, "Use of the Hough Transformation to Detect Lines and Curves in Pictures," Comm. ACM, Vol. 15, pp. 11-15 (January, 1972)), and later applied to computer vision (see D. H. Ballard, "Generalizing the Hough Transform to Detect Arbitrary Shapes", Pattern Recognition, Vol. 13, No. 2, p. 111-122, 1981). In general, it is a feature extraction technique used in image analysis, computer vision, and digital image processing.

The elevation map may be built up by converting each point of the range image into an elevation at a 2D X, Y point in the world frame of reference. The elevation of each point can then be inserted into cells in a coarse 2D X-Y grid under the camera, and can perform a statistically robust analysis of those points to come up with the expected maximum height of the surface in each cell. The resulting elevation map can be used directly to determine obstacles for the system to avoid, and can also be used to establish the expected average planar surface under the camera, which in turn can be used to focus and validate the Hough transform based rebar segment extraction so that the rebar detection does not require any pre-calibration step for robust operation.

The camera image data is communicated to a computer, such as a tram master computer, where perception system software, including modules for carrying out the Hough and other suitable computer visions processing algorithms, are located. Although the Hough transform and elevation map accumulator have been described as an exemplary methods, those skilled in the art will recognize that other algorithms may be used to identify rebar segments and characterize the surface under the camera from the three dimensional input.

The raw camera age data from camera 342 is used to build a model of the actual location of the robotic components. For example, fiducial markers may be mounted on the arm 470 of gripper subassembly 400 such that they are sometimes in the view of the stereo sensors 342. When they are in view, the position and orientation of the fiducials are extracted from the images, and the relative position of the arm 470 to the camera can be established. Thus, the system can accurately track the actual pose (i.e., the position and orientation) of the arm 470 over time, and can account for installation variations and for uncontrolled mechanical compliance. In essence the system continuously self-calibrates, eliminating the need for a calibration step before operation, facilitating the swapping of gripper arms and cameras without having to explicitly recalibrate the system, and encouraging the use of mechanical, uncontrolled, compliance in joints knowing that the system will always sense the actual relationship between the effectors on the gripper arm 470, the world, and its sensors.

The system will accumulate information over time into an accurate 3D model of the world and the position of its various components in relationship to that world. The process of Simultaneous Localization and Mapping (SLAM) is well known to those skilled in the art. In this embodiment the SLAM process may combine real-time information from the stereo cameras 342, odometry from the gantry and tram, and information from the safety laser scanners mounted on gantry legs 104 to build up a relatively accurate and up-to-date 3D model of the world and system. A priori information about the geometry of the bridge combined with GPS or surveyed fiducial markers that the perception systems can sense and localize may be used to get an absolutely accurate and up-to-date 3D model of the world and the semi-autonomous apparatus 10 that can be used with the globally based strategic operational plan to execute the proper moment-to-moment tactical operations for which rebar segments to place where.

Exemplary Operation

An initial step in setting up the semi-autonomous apparatus 10 for use at a work site may be to adjust the height and span of the gantry truss 102. The height of the truss 102 over the work site 12 may be adjusted by adjusting the position of the brackets 108 on legs 104 and support frame 106. The span of the truss 102 may be adjusted manually by aligning as many truss modules 118 as needed to allow the tram 202 to traverse the full width of the mat 50 with the actuation subassembly 300 in a retracted position without impacting any obstructions on the work site 12 surface.

As described above with regard to the gripper subassembly 400, bulk stocks of rebar 52, 54 will be moved from a stockpile 30, typically by a crane 32 or other suitable equipment for lifting and moving heavy or unwieldy objects, and placed in a magazine 14 or comparable container. The magazine 14 filled with the appropriately sized rebar required for the job is moved by the apparatus 10 closer to the work site 12, as described above. A suitable position for the magazine 14 may be adjacent to the location where rebar is to be placed, with the long axis of the rebar in the magazine 14 generally parallel to the direction in which the rebar 52 or 54 is to be placed on the rebar mat 50.

Figure 2:
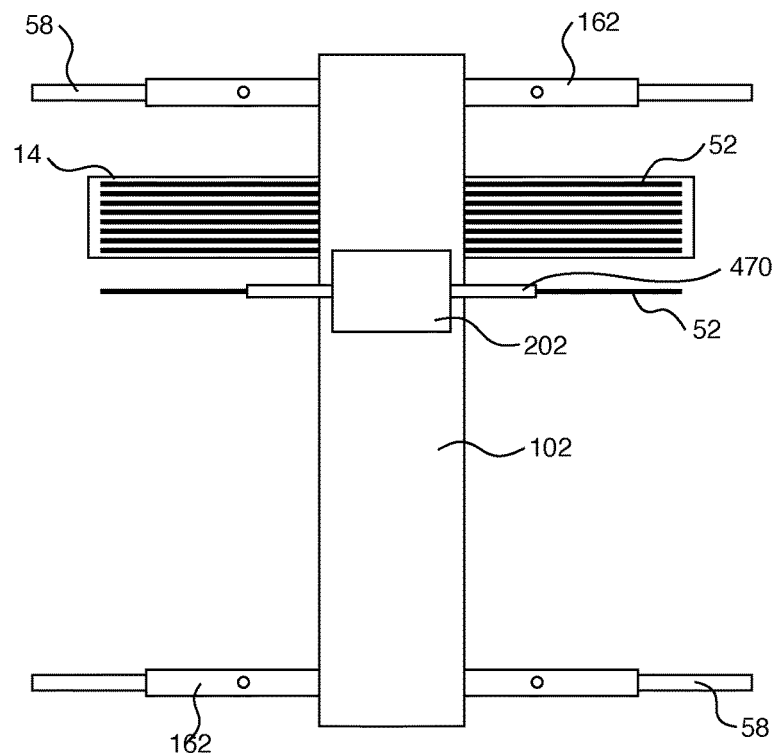
FIG. 2 is a schematic illustration of a top view of the embodiment of the semi-autonomous transport and placement apparatus of FIG. 1 moving and placing elongated objects, such as rebar, from a magazine holding the objects into position at an exemplary work site.
Figure 3:
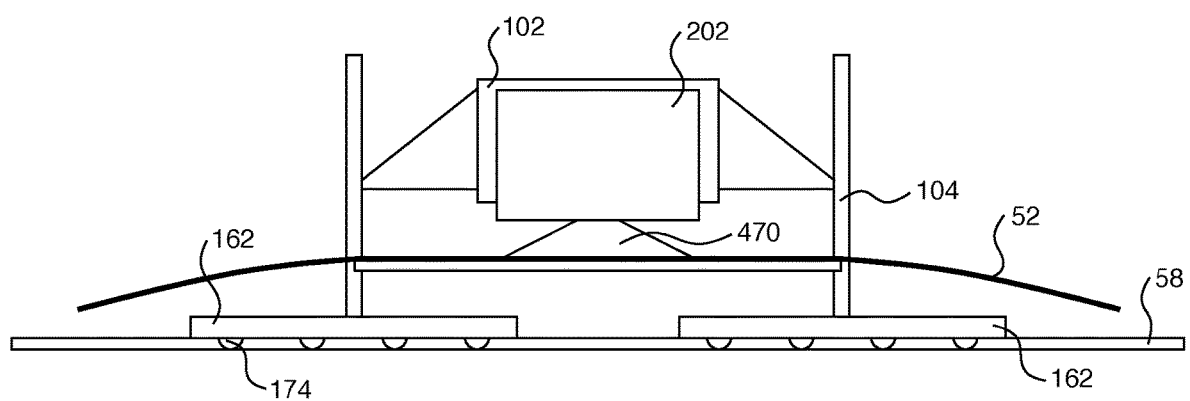
FIG. 3 is a side elevation view of the illustration of FIG. 2.
Figure 40:
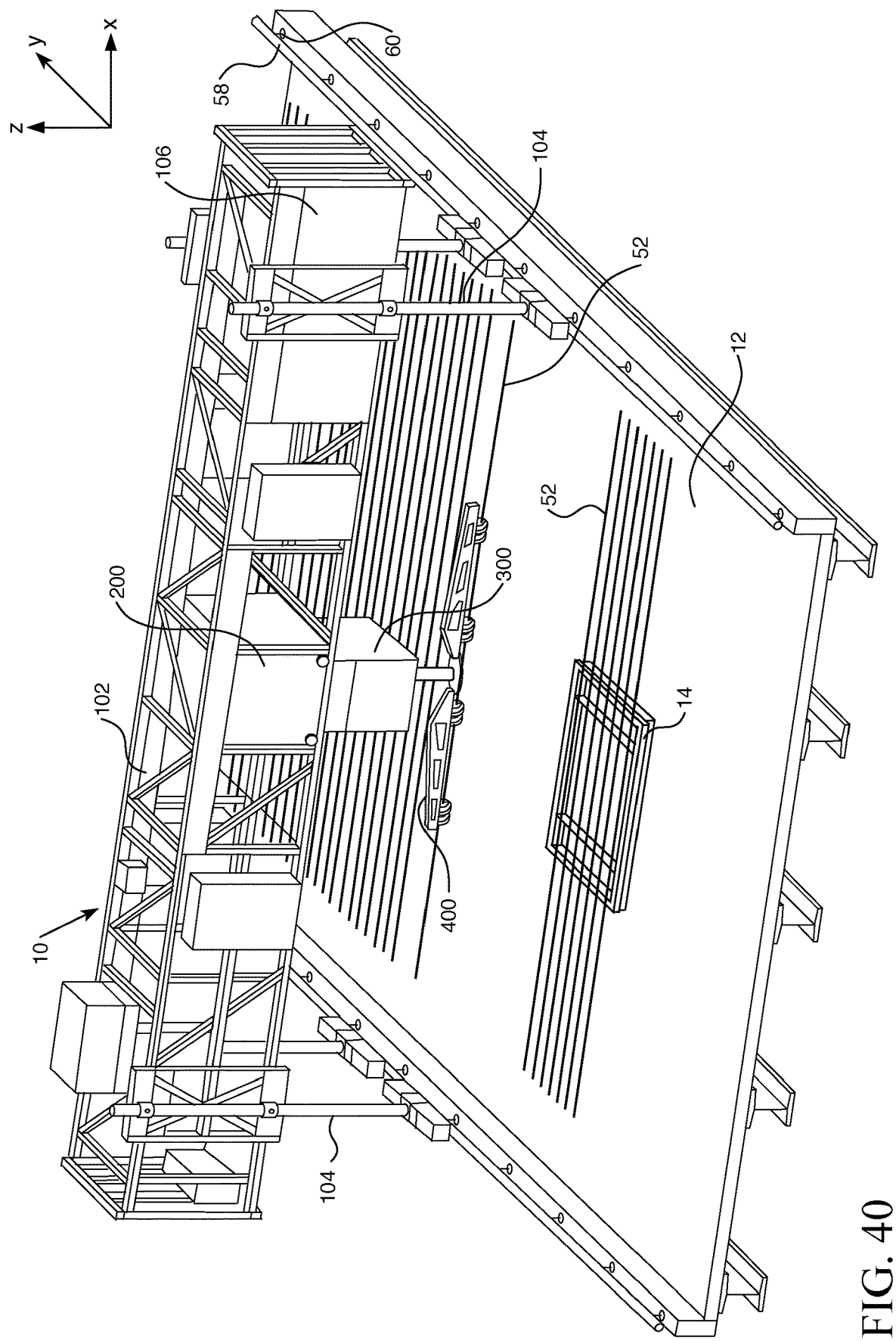
FIG. 40 illustrates an alternative arrangement of the gripper subassembly with gripper arms extending along the transverse, or X axis, of the semi-autonomous transport and placement apparatus of FIG. 1.

FIGS. 1-3 illustrate an arrangement of the apparatus 10 placing rebar 52 along the longitudinal path, along the plane of the Y axis of the work site 12. In this arrangement, the arms 470 of the gripper assembly 400 are oriented in the direction of the longitudinal path, along the plane of the Y axis. FIG. 40 illustrates a configuration wherein rebar is placed in the transverse direction, along the plane of the X axis of the work site 12. In this configuration, the arms 470 of the gripper subassembly are rotated to align the arm sections 470 and grippers 402 along the transverse axis of the apparatus 10. In either configuration, the grippers 402 are lowered to the rebar, grasp a length of rebar from magazine 14 using the gripper sequence shown in FIGS. 25 A-F, discussed above, and lift the rebar using the linear actuation of the actuation subassembly 300 discussed above, transport the selected rebar 52 or 54 to the desired location on the rebar mat 50 in accordance with the pre-installed construction plan by moving the tram 202 to the correct position along the gantry truss 102, and lowering and releasing the rebar, again by using the linear actuation of the actuation subassembly 300 and activating solenoid 450 to unlock the gripper fingers 404 to withdraw plunger 452, open fingers 404 and release the rebar 52 or 54, as shown in FIG. 25 G.

Figures 46, 47:
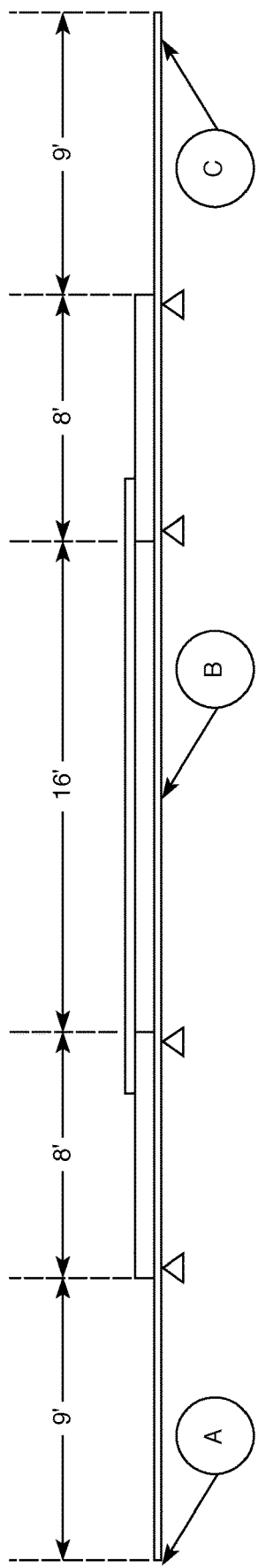
FIG. 46 represents the test set-up for sag testing of elongate rebar.
FIG. 47 shows the results of the sag testing using the test set up of FIG. 46.

Testing was conducted to determine what length of rebar could be safely carried by a single apparatus 10 and to understand the amount of droop cantilevered or suspended spans of rebar would experience in use. Referring to FIGS. 46 and 47, sag testing was performed on fifty foot long bars of sizes #4, #5, #6, #7, and #8. #4 rebar, for example, has a one half inch diameter, with each integer increase in bar size number representing an increase of ⅛ inch in diameter. Thus, #5 rebar has a ⅝ inch diameter and #8 rebar has a one inch diameter. Each bar was placed on two eight foot supporting structures spaced sixteen feet apart (B), leaving nine feet of bar overhanging from the outside ends of each support (A) and (C). The table in FIG. 47 shows the sag in inches for each bar size and section B of the test set up, and the average of sections A and C. For the #4 bar, the middle of the bar at section B sagged three inches and the average sag for each nine foot end sagged 19 inches. For #8 bar, the middle of the bar at section B sagged one inch and the average sag for each nine foot end sagged 10 inches.

For the test to determine the cantilevered droop of the bars, rebar sizes #3 through #8 with cantilevered lengths of 2-16 feet were used. Each bar was clamped to a 48 inch horizontal support to ensure the anchored end was flat. The table in FIG. 48 shows the droop in inches for each bar size and each length of bar. For example, a #3 bar with a two foot cantilevered end did not droop at all, while a #3 bar with an 8 foot cantilevered end drooped 18.75 inches. A two foot cantilevered end did not droop for most bars, except a slight droop of 0.875 inches for the #4 bar. A #8 bar with a four foot cantilevered end drooped 0.5 inches and a #8 bar with a 14 foot cantilevered end drooped 26.5 inches. The largest amount of droop was measured for the 10 foot #4 bar at 30 inches and for the 14 foot #7 bar at 30.25 inches.

Figure 37:
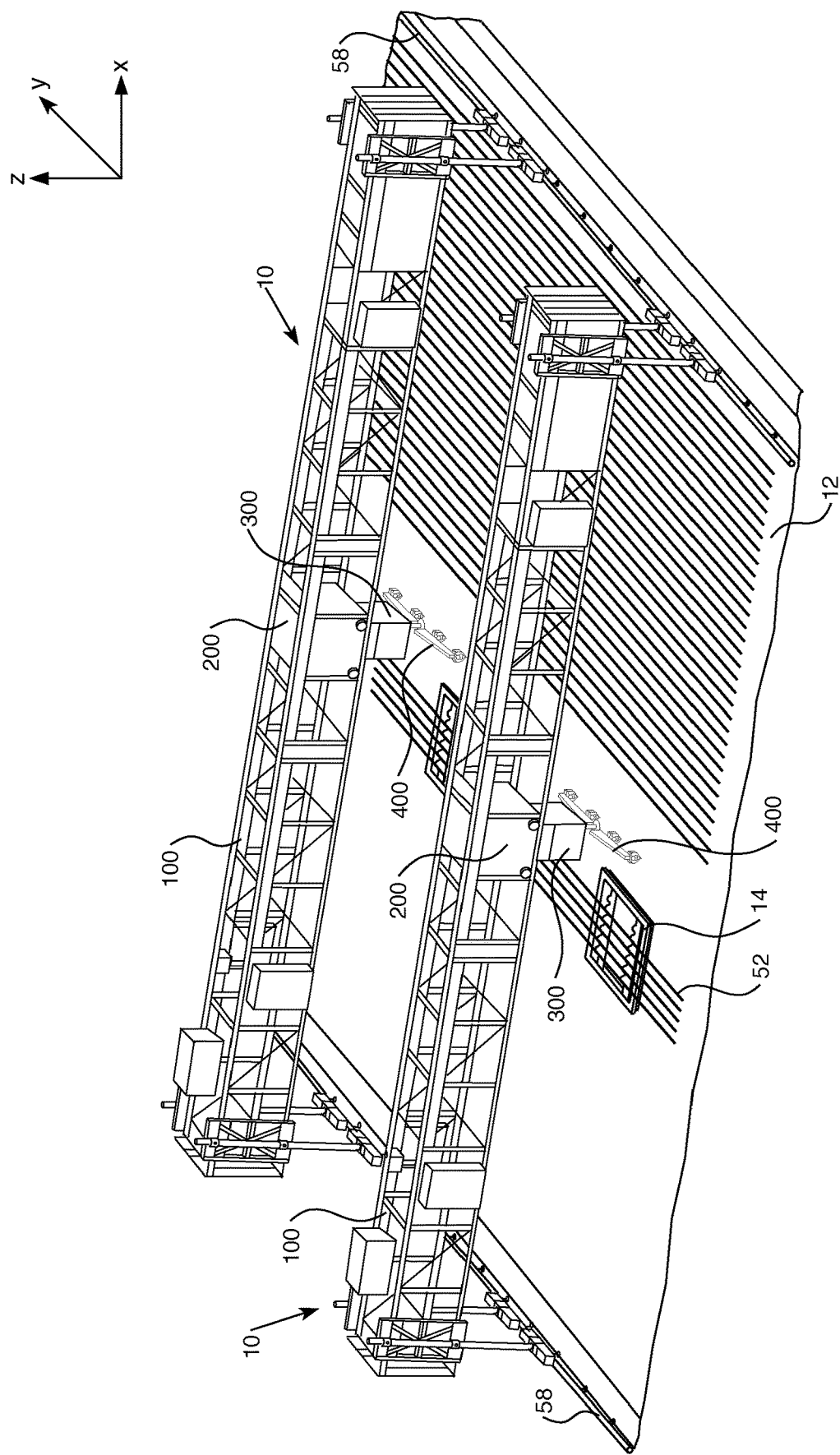
FIG. 37 illustrates two transport and placement apparatuses of FIG. 1 for use, for example, in placing long sections of rebar or another elongate object with gripper arms extending along the longitudinal (Y) axis.
Figure 38:
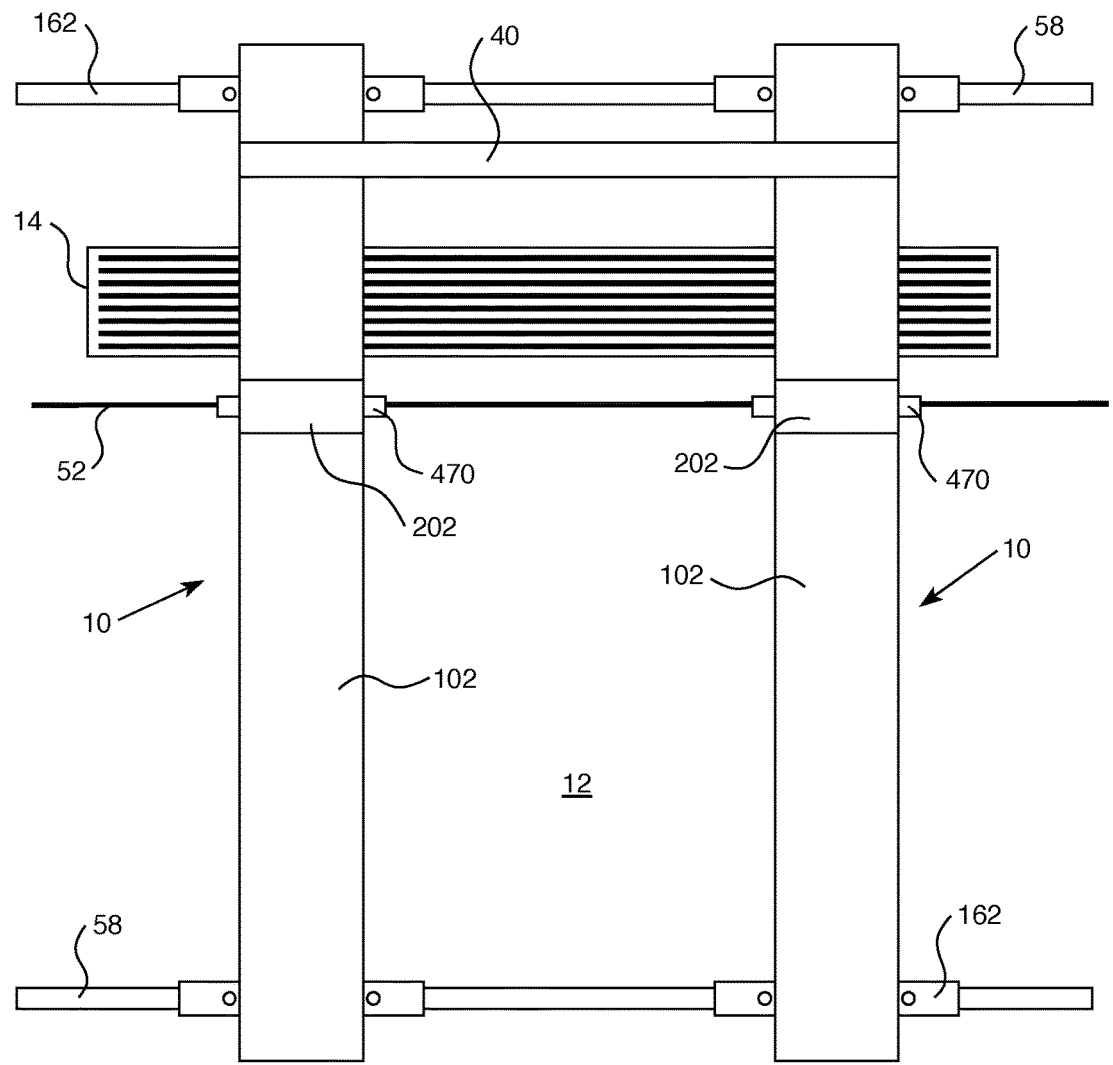
FIG. 38 is a schematic top plan view of the arrangement of the apparatuses shown in FIG. 38.
Figure 39:
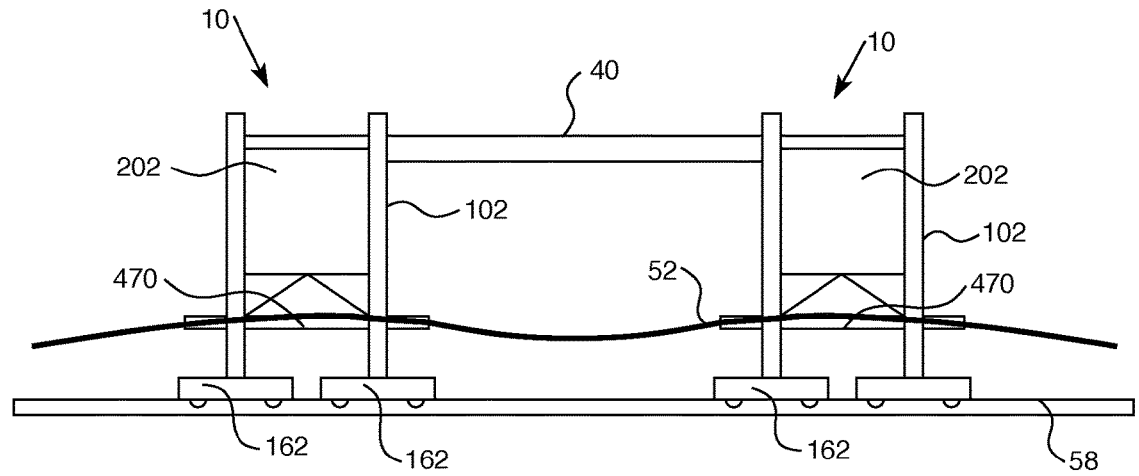
FIG. 39 is a side elevation view of the illustration of FIG. 38.

Using the sag test results, it is believed that in certain situations, either two gripper subassemblies 400 on a single apparatus 10 or two apparatuses 10 will be optimum for safely transporting and placing longer lengths of rebar. A configuration using two apparatuses 10 to place long pieces of rebar in the longitudinal orientation is shown in FIGS. 37-39. The dual gantries may be coordinated in a variety of ways: passive, where one driving gantry pushes (or pulls) a passive gantry through a mechanical linkage 40; or coordinated, where the drive motors of both gantries are linked mechanically or wirelessly. Mechanically linked gantries may include a rigid or articulated mechanical linkage 40 that connects the two gantries and aids the coordinated motion between them. In mechanically coupled gantry systems, the gantries could communicate with each other via a wired link, for example, via CAN, serial link (RS-232/485/422, etc.), Ethernet, EtherCAT, or other wired communication protocols.

Wirelessly linked gantries may include the two gantries coordinating their motion with each other via a wireless radio link. In this scenario, one primary gantry creates the motion planning commands and sends them to the secondary gantry. The primary gantry confirms the position of the secondary gantry either by observing the secondary gantry (through sensors) or by the secondary gantry reporting its position. In wirelessly coupled gantry systems, the gantries could communicate via wireless radio link (such as Wi-Fi 802.11 b/g/n or wireless CAN or other).

Each gantry will need to communicate with its tram, or trams by wireless or wired communication. Wireless communication may use Standard Wi-Fi (802.11 b/g/n), or other dedicated wireless network (such as wireless CAN). Wired communication may use RS-485 or similar through the conductor rail, or via a festooned cable.

Figure 41:
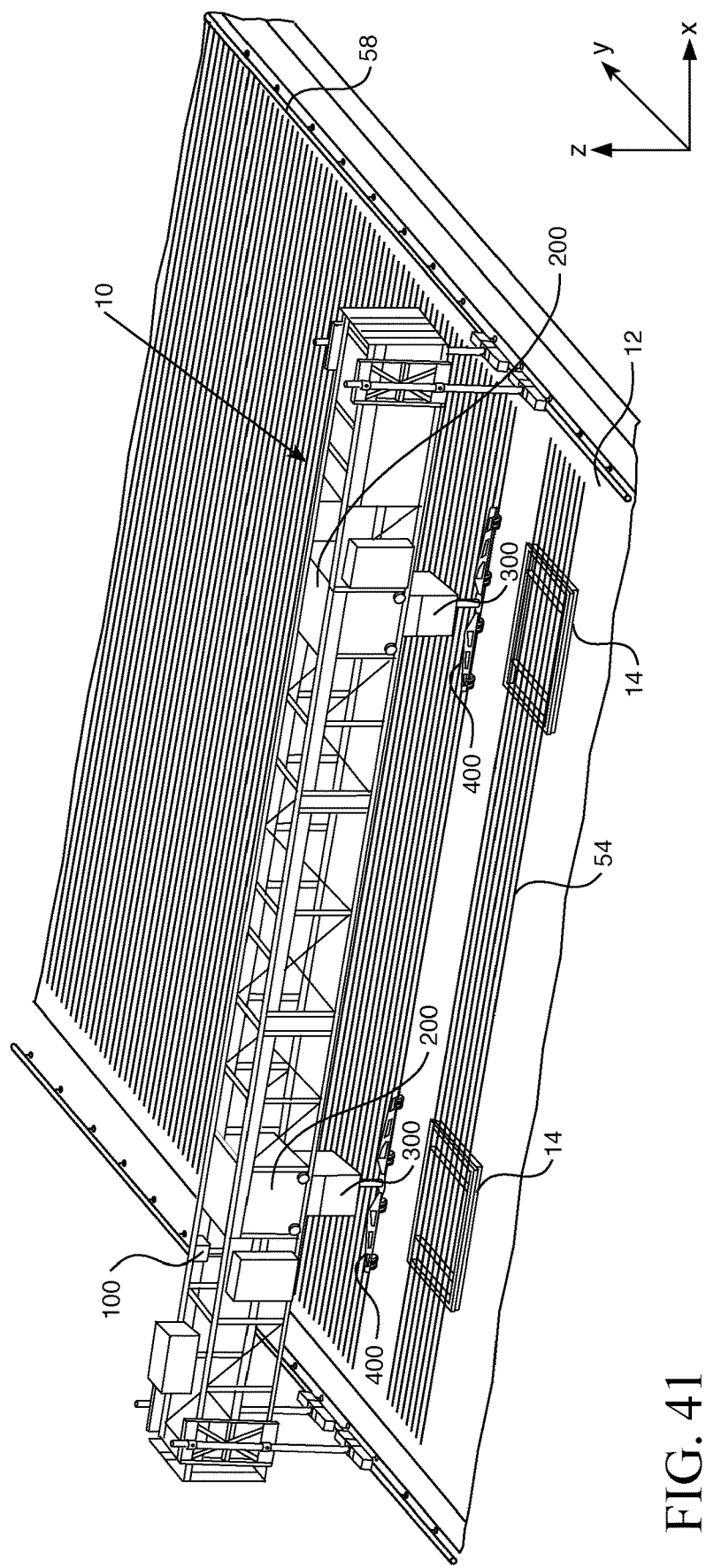
FIG. 41 illustrates an alternative arrangement of the semi-autonomous transport and placement apparatus of FIG. 40 with two gripper subassemblies carried from two trams on a single truss section for placing long sections of rebar, or another elongate object, along the transverse, or X axis.
Figure 42:
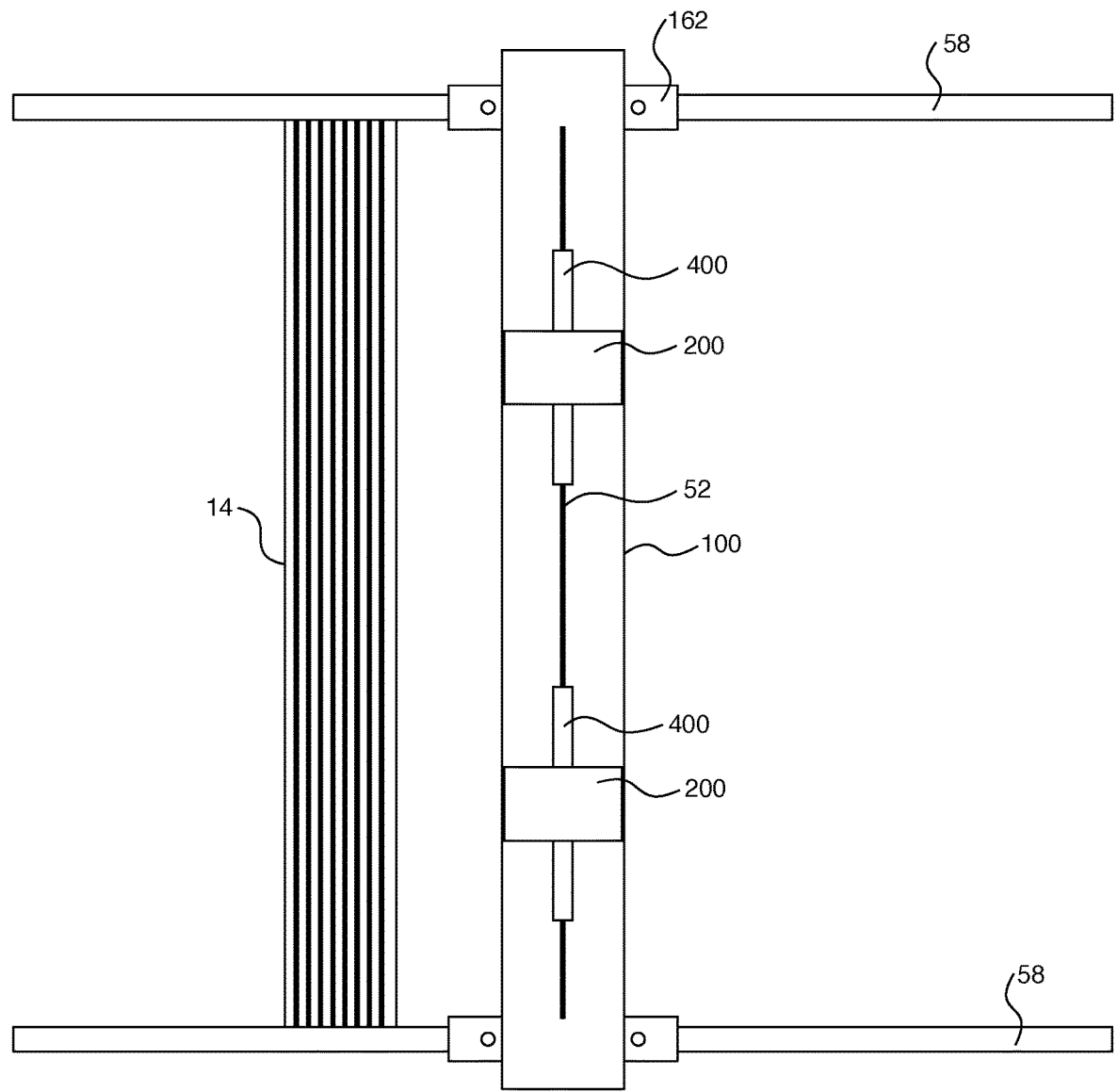
FIG. 42 is a schematic top plan view of the arrangement of the apparatuses shown in FIG. 41, with gripper arms extending along the transverse, or X axis.

A configuration of the apparatus 10 using a single apparatus 10 with two gripper subassemblies 400 suspended from separate trams 202 each riding on the rails of a single truss 102 is shown in FIGS. 41-42. In this configuration, the grippers are rotated to lift, transport and place longer lengths of rebar on the transverse path, along the plane of the X axis of the work site 12. Either one large magazine or two magazines 14 may be provided to support the longer sections of rebar.

The semi-autonomous apparatus, subassemblies, and systems and subsystems have been described in accordance with several examples, which are intended to be illustrative in all aspects rather than restrictive. Thus, the present invention is capable of many variations in detailed implementation, which may be derived from the description contained herein by a person of ordinary skill in the art.

The embodiments described herein are understood as providing illustrative features of varying detail of various embodiments of the disclosed invention; and therefore, unless otherwise specified, it is to be understood that, to the extent possible, one or more features, elements, components, constituents, structures, modules, and/or aspects of the disclosed embodiments may be combined, separated, interchanged, and/or rearranged with or relative to one or more other features, elements, components, constituents, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

What is claimed is:

1. An assembly comprising:
   a gantry subassembly, the gantry subassembly comprising (i) a bridge member for laterally spanning, in use, a selected section of a work site and (ii) a gantry drive system for effecting travel of the gantry subassembly along a first path of the selected section of the work site;
   a tram subassembly movably mounted on the gantry subassembly, the tram subassembly comprising (i) a tram and (ii) a tram drive system for effecting travel of the tram along a second path along the span of the bridge member; and,
   an actuation subassembly mounted on the tram subassembly, the actuation subassembly comprising (i) a motion actuator and (ii) an actuator drive system for effecting travel along a third path generally perpendicular to the second path;
   a gripper subassembly suspended from, and movable with, the motion actuator of the actuation subassembly, the gripper subassembly comprising at least one gripper for gripping and releasing an object; and,
   a control system comprising (i) a sensing function, (ii) a modeling function and (iii) an execution function;
   wherein the sensing function receives sensory signals and communicates the sensory signals to at least the modeling function,
   the modeling function dynamically calculates the pose of at least the at least one gripper relative to the work site, coordinates the pose calculations with a plan for placement of a plurality of the objects on the work site to generate coordination calculations, and communicates the coordination calculations to the execution function; and
   the execution function communicates motion signals to one or more of the gantry drive system, the tram drive system, and the actuator drive system for coordinated movement along one or more of the first, the second, and the third paths, respectively, to position the gripper subassembly for one or more of lifting, transporting and placing the plurality of objects.

2. The assembly recited in claim 1, wherein the actuation subassembly further comprises:
   a rotational motion actuator operatively connected to the gripper subassembly for effecting rotation of the gripper subassembly about the axis of the third path.

3. The assembly recited in claim 1, further comprising: at least one pair of stereo cameras for sensing and mapping three dimensional poses of pertinent objects in the work site in the absence of pre-measuring the work site.

4. The assembly recited in claim 1, wherein the sensing function receives sensory signals from image data sources to find markers pre-positioned at the work site and on portions of one or more of the gantry, tram, actuation and gripper subassemblies to generate the sensing data.

5. The assembly recited in claim 1, wherein there are two assemblies positioned in a substantially adjacent parallel spaced relationship relative to each other on a work site, each assembly comprising the gantry subassembly, the tram subassembly, the actuation subassembly, the gripper subassembly, and the control system, operatively linked by one of a wired or a wireless connection to synchronize the coordinated movement of each assembly along one or more of the first, second, and third paths, respectively, to position the gripper subassembly for one or more of lifting, transporting and placing the plurality of objects.

6. The assembly recited in claim 1, wherein the assembly comprises: at least two tram subassemblies mounted on the bridge member of the gantry subassembly, each tram subassembly having one actuation subassembly mounted thereon, and each actuation subassembly having one gripper subassembly suspended therefrom;
   wherein the control system (i) coordinates movement of each tram subassembly along the second path, and (ii) coordinates movement of each actuation subassembly along the third path to position each gripper subassembly for one or more of the coordinated lifting, transporting, and placing of the plurality of objects.

7. The assembly recited in claim 1, wherein the actuation subassembly further comprises:
   a second motion actuator for effecting travel of the gripper subassembly along a fourth path relative to the tram subassembly in the same direction as the direction of the second path.

8. The assembly recited in claim 7, wherein the actuation subassembly further comprises:
   a rotational motion actuator operatively connected to the gripper subassembly for effecting rotation of the gripper subassembly about the axis of the third path.

9. The assembly recited in claim 1, wherein the gripper subassembly comprises:
   an arm suspended from the motion actuator; and,
   a plurality of grippers suspended from the arm.

10. The assembly recited in claim 9, further comprising:
    a connector from which the arm is suspended from the motion actuator; and
    a motor for rotating the connector about the axis of the third path.

11. The assembly recited in claim 9, wherein each gripper comprises:
    at least one pair of articulatable fingers biased towards each other in a partially closed spaced relationship; and
    a finger actuation member for opening and closing the at least one pair of fingers.

12. The assembly recited in claim 11, wherein each finger of the pair of fingers is comprised of:
    a base portion;
    a flipper portion;

wherein the base portion and the flipper portion are pivotally connected to each other, the base portion is operatively connected to the finger actuation member, and the flipper portion has tapered ends for initial engagement with the object; and, at least one spring member for biasing the flipper portion towards the base portion.

13. The assembly recited in claim 11, wherein the finger actuation member comprises:

a base plate having an upper surface and a lower surface, the lower surface configured for contact with the object;

a set of driven gears operatively connected to the pair of fingers such that movement of the set of driven gears in a first direction closes the pair of fingers and movement of the set of driven gears in a second direction opens the pair of fingers;

a driving gear operatively connected to the set of driven gears such that movement of the driving gear is translated to movement of the set of driven gears, the driving gear having a bottom portion connected to the upper surface of the base plate, a top portion, and a locking portion positioned between the top and bottom portions of the driving gear, the driving gear biased toward an unlocked position in which the pair of fingers are open; and, an actuator having a locking member biased for passive locking engagement with the locking portion of the driving gear upon application of force in the direction of the third path against the lower surface of the base plate sufficient to move the locking portion of the driving gear into alignment with the locking member of the actuator, and a locked position in which the pair of fingers are closed, the actuator being responsive to signals from the control system to actively withdraw the locking member from engagement with the locking portion to free the driving gear to move towards the unlocked position.

14. The assembly recited in claim 13, wherein the actuator is a solenoid having a cavity, and the locking member is a plunger slidably mounted in the cavity, and the locking portion of the driving gear is an opening for receiving the plunger.

15. The assembly recited in claim 13, further comprising:

a gear case for housing the set of driven gears and at least the locking portion of the driving gear, the gear case having a top plate having a passage through which the top portion of the driving gear passes as the locking portion of the driving gear is moved into alignment with the locking member of the actuator; and a stop for limiting the distance the driving gear can travel out of the gear case.

16. The assembly recited in claim 13, further comprising:

a first shaft and a second shaft in a parallel spaced relationship relative to each other;

a first gear of the set of driven gears mounted on the first shaft and a second gear of the set of driven gears mounted on the second shaft;

a first finger of the at least one pair of fingers mounted on the first shaft and a second finger of the at least one pair of fingers mounted on the second shaft;

the driving gear having a first edge in movable engagement with the first gear and a second edge in movable engagement with the second gear;

wherein upward movement of the driving gear in the plane of third path rotates the first and second gears and the first and second shafts in the first direction to close the first and second fingers of the pair and downward movement of the driving gear in the plane of third path rotates the first and second gears and the first and second shafts in the second direction to open the first and second fingers.

17. The assembly recited in claim 16, wherein there are two pair of fingers, each pair having a first finger mounted on the first shaft on opposite sides of the driving gear and the first driven gear, and a second finger mounted on the second shaft on opposite sides of the driving gear and the second driven gear.

18. The assembly recited in claim 1, wherein the motion actuator of the actuation subassembly has an axle operatively connected to the actuator drive system for effecting movement of the axle relative to the third path; and, the gripper subassembly further comprises: a connector mounted to the axle, two arm sections extending laterally from opposite sides of the connector plate, and at least one gripper suspended from each arm section.

19. The assembly recited in claim 18, wherein each gripper comprises:

at least one pair of articulatable fingers biased towards each other in a partially closed spaced relationship; and a finger actuation member for opening and closing the at least one pair of fingers.

20. The assembly recited in claim 19, wherein the finger actuation member comprises:

a base plate having an upper surface and a lower surface, the lower surface configured for contact with the object;

a set of driven gears operatively connected to the pair of fingers such that movement of the set of driven gears in a first direction closes the pair of fingers, and movement of the set of driven gears in a second direction opens the pair of fingers;

a driving gear operatively connected to the set of driven gears such that movement of the driving gear is translated to movement of the set of driven gears, the driving gear having a bottom portion connected to the upper surface of the base plate, a top portion, and a locking portion positioned between the top and bottom portions of the driving gear, the driving gear biased toward an unlocked position wherein the pair of fingers are open; and, an actuator having a locking member biased for passive locking engagement with the locking portion of the driving gear upon application of force in the direction of the third path against the lower surface of the base plate sufficient to move the locking portion of the driving gear into alignment with the locking member of the actuator, and a locked position wherein the pair of fingers are closed, the actuator being responsive to signals from the autonomous control system to actively withdraw the locking member from engagement with the locking portion to free the driving gear to move towards the unlocked position.

21. The assembly recited in claim 18, wherein the motion actuator of the actuator drive system effects linear and rotational movement of the axle.

22. The assembly recited in claim 21, wherein the axle is pivotally connected to the motion actuator for effecting one or more of linear, rotational and pivotal movement of the axle.

23. The assembly recited in claim 18, wherein the motion actuator of the actuator drive system effects linear movement of the ee-axle and the connector is mounted for rotation about the axle.

24. The assembly recited in claim 23, wherein the rotational movement is effected manually.

25. The assembly recited in claim 23, wherein the rotational movement is effected by a gripper drive motor.

26. The assembly recited in claim 1, wherein the sensing function receives sensory signals from sources selected from the group consisting of image data sources, pulsed laser sensors, human operator control inputs, and combinations thereof.

27. The assembly recited in claim 26, wherein the modeling function uses the sensing data for one or more of (i) localization and mapping to define a sensed model of the work site, (ii) estimating the pose of one or more of the grippers, gripper arm, tram, and gantry bridge member components relative to the work site, and (iii) fault monitoring to detect differences between observed obstacles from expectations based on the plan.

28. The assembly recited in claim 27, wherein the execution function comprises:
   an executor module that combines the sensed model of the work site and the sensed relationship of one or more of the grippers, gripper arm, tram, and gantry bridge member component poses to the work site with the strategic intentions of the plan to tactically determine and direct the motion signals for carrying out the plan.

29. The assembly recited in claim 28, wherein the execution function further comprises:
   a placement planning module to assist the executor module in determining the object required for successive placements and determining the optimal location for placement of the object to progress according to the plan; and,
   an obstacle avoidance module that uses three dimensional maps of the work site generated by the modeling function to detect the presence of obstacles on the work site.

30. The assembly recited in claim 29, wherein the obstacle avoidance module responds to obstacle detection by changing the trajectory of a given motion for one or more of the grippers, gripper arm, tram, and gantry bridge member components.

31. The assembly recited in claim 29, wherein the obstacle avoidance module responds to obstacle detection by stopping motion of the assembly.

32. An apparatus comprising:
   a gantry subassembly comprising:
      a bridge member for laterally spanning, in use, a selected section of a work site; and,
      a gantry drive system for effecting travel of the gantry subassembly along a first path of the selected section of the work site;
   a tram subassembly movably mounted on the gantry subassembly, said tram subassembly comprising:
      a tram; and,
      a tram drive system for effecting travel of the tram along a second path along the span of the bridge member;
   an actuation subassembly mounted on the tram subassembly comprising:
      a motion actuator; and,
      an actuator drive system for effecting travel along a third path generally perpendicular to the second path, linear movement on a path parallel to the first path, and rotational movement about an axis of the third path;
   a gripper subassembly suspended from, and movable with, the motion actuator of the actuation subassembly, the gripper subassembly comprising:
      an arm suspended from the motion actuator; and,
      a plurality of grippers suspended from the arm for gripping and releasing the object, each gripper comprising at least one pair of articulatable fingers biased towards each other in a partially closed spaced relationship and a finger actuation member for opening and closing the at least one pair of fingers; and,
   an autonomous control system comprising:
      a sensing function;
      a modeling function; and,
      an execution function;
      the sensing function having receivers for receiving sensory signals and communicating the sensory signals to at least the modeling function,
      the modeling function dynamically calculating the position of at least the at least one gripper relative to the work site, coordinating the position calculations with a preplanned map for placement of a plurality of objects on the work site to generate coordination calculations, and communicating the coordination calculations to the execution function, and
      the execution function communicating motion signals to one or more of the gantry drive system, the tram drive system, and the actuator drive system for coordinated movement along one or more of the first path, the second path, the third path, the parallel path, and the rotational axis, respectively, to position the gripper subassembly for one or more of lifting, transporting and placing the plurality of objects.

33. The apparatus recited in claim 32, further comprising a perception sensor mounted to one of the tram or gantry and connected for communication to a computer, the perception sensor being positioned for taking and communicating image data of the work site to the computer for processing.

34. The apparatus recited in claim 32, further comprising a remote controller for wireless communication to the control system for selecting one of manual or automatic control of one or more of the gantry, tram, actuation and gripper subassemblies.

35. The apparatus recited in claim 32, wherein the first path is one or both of linear and non-linear.

36. The apparatus recited in claim 35, wherein the motion actuator is selected from the group consisting of a linear motion actuator, a delta actuator, a parallel kinematic actuator, and combinations thereof.

37. The apparatus recited in claim 36, wherein the linear motion actuator is selected from the group consisting of belt drive systems, hydraulic cylinders, pneumatic systems, electromagnetic systems, geared mechanisms, and combinations thereof.

* * * * *